US012759909B2

(12) United States Patent
Boehme et al.

(10) Patent No.: US 12,759,909 B2
(45) **Date of Patent: *Oct. 13, 2026**

(54) FARADIC POROSITY CELL

(71) Applicant: PowerTech Water, Inc., Lexington, KY (US)

(72) Inventors: Lindsay Boehme, Iowa City, IA (US); Cameron Lippert, Lexington, KY (US); James Richardson Landon, Lexington, KY (US); Alan Rassoolkhani, Lexington, KY (US); Jeffrey Rentschler, Lexington, KY (US)

(73) Assignee: PowerTech Water, Inc., Lexington, KY (US)

( * ) Notice: Subject to any disclaimer, the term of this patent is extended or adjusted under 35 U.S.C. 154(b) by 999 days.

This patent is subject to a terminal disclaimer.

(21) Appl. No.: 17/932,488

(22) Filed: Sep. 15, 2022

(65) Prior Publication Data

US 2023/0031927 A1 Feb. 2, 2023

Related U.S. Application Data

(63) Continuation-in-part of application No. 17/369,346, filed on Jul. 7, 2021, now Pat. No. 12,421,616, which (Continued)

(51) Int. Cl.

*C02F 1/469* (2023.01)
*B01D 61/42* (2006.01)

(Continued)

(52) U.S. Cl.

CPC .......... *C02F 1/4691* (2013.01); *B01D 61/428* (2022.08); *C02F 1/46109* (2013.01); *C02F 2001/46161* (2013.01); *C02F 2101/22* (2013.01)

(58) Field of Classification Search

CPC ......... C02F 1/4691; C02F 2001/46161; B01D 61/428

See application file for complete search history.

(56) References Cited

U.S. PATENT DOCUMENTS 883,170 A 3/1908 Christy
4,072,596 A 2/1978 Moeglich (Continued)

FOREIGN PATENT DOCUMENTS

CN 101289242 A 10/2008
CN 101634035 B 11/2010

(Continued)

OTHER PUBLICATIONS

Barcelos et al. "Efficient and stable operation of capacitive deionization assessed by electrode and membrane asymmetry" Electrochimica Acta 388 (2021) 138631 (Year: 2021).*

(Continued)

*Primary Examiner* — Luan V Van
*Assistant Examiner* — Alexander R. Parent
(74) *Attorney, Agent, or Firm* — Fitch, Even, Tabin & Flannery LLP

(57) ABSTRACT

An electrochemical device for removing or reducing a target ionic species from an aqueous solution using faradic immobilization includes a first electrode and a second electrode with different void fraction and surface area properties. During operation, due to differences in void fraction (also referred to as void ratio) of the first and the second electrode, water flows through an electrode with a high porosity, while the aqueous solution does not flow through an electrode with a low porosity. Accordingly, the asymmetry of the electrodes provides a desired voltage distribution across the device, (Continued)

which equates to a different voltage at each electrode, to control the speciation of the target ionic species at the anode and the cathode.

37 Claims, 46 Drawing Sheets

Related U.S. Application Data is a continuation-in-part of application No. 16/520,340, filed on Jul. 23, 2019, now Pat. No. 11,117,818, which is a continuation-in-part of application No. 16/417,574, filed on May 20, 2019, now abandoned, which is a continuation-in-part of application No. 15/984,290, filed on May 18, 2018, now abandoned.

(60) Provisional application No. 62/758,433, filed on Nov. 9, 2018, provisional application No. 62/702,286, filed on Jul. 23, 2018, provisional application No. 62/508,351, filed on May 18, 2017.

(51) Int. Cl.
*C02F 1/461* (2023.01)
*C02F 101/22* (2006.01)

(56) References Cited

U.S. PATENT DOCUMENTS 4,131,526 A 12/1978 Moeglich
4,226,685 A 10/1980 Portal et al.
4,445,990 A 5/1984 Kim
5,376,240 A 12/1994 Kaczur et al.
5,489,370 A 2/1996 Lomasney
5,599,437 A 2/1997 Taylor et al.
5,932,111 A 8/1999 Christensen
5,954,937 A 9/1999 Farmer
5,968,338 A 10/1999 Hulme
6,086,733 A 7/2000 Carey
6,096,222 A 8/2000 Wurzburger
6,217,743 B1 4/2001 Moulton
6,224,744 B1 5/2001 Casado Gimenez et al.
6,297,293 B1 10/2001 Bell et al.
6,309,532 B1 10/2001 Tran
6,325,916 B1 12/2001 Lambert
6,358,398 B1 3/2002 Halldorson
6,544,648 B1 4/2003 Nesbitt et al.
6,778,378 B1 8/2004 Andelman
6,802,981 B2 10/2004 Ryazanova
7,048,862 B2 5/2006 Fukui
7,294,270 B2 11/2007 Miyazaki
7,381,328 B2 6/2008 Schrive
7,566,403 B2 7/2009 Weibeta
7,611,611 B2 11/2009 Belt
7,682,815 B2 3/2010 Guiot
7,708,958 B2 5/2010 Namespetra
7,767,168 B2 8/2010 Namespetra
7,854,851 B2 12/2010 Schrive
7,871,508 B2 1/2011 Carson
7,892,515 B2 2/2011 Hu et al.
7,959,872 B2 6/2011 Namespetra
8,142,898 B2 3/2012 Carlson
8,828,533 B2 9/2014 Dai et al.
8,968,575 B2 3/2015 Zolotarsky
9,028,689 B1 5/2015 Fraim
9,199,867 B2 12/2015 Botte
9,365,425 B2 6/2016 Niksa
9,370,590 B2 6/2016 Peters et al.
9,409,800 B2 8/2016 Fraim
9,425,000 B2 8/2016 Lin et al.
9,809,479 B2 11/2017 Prior
9,827,517 B2 11/2017 Vecitis et al.
10,407,332 B2 9/2019 Prior
11,117,818 B2 9/2021 Boehme et al.
12,421,616 B2* 9/2025 Boehme .................... C25C 7/02
2004/0095706 A1* 5/2004 Faris ..................... C02F 1/4691 361/303
2005/0036270 A1 2/2005 Faris et al.
2005/0103634 A1* 5/2005 Andelman ............ C02F 1/4695 204/648
2008/0251461 A1 10/2008 Parker
2011/0042205 A1 2/2011 Kim et al.
2012/0202033 A1 8/2012 Chang et al.
2012/0234695 A1 9/2012 Mayes et al.
2013/0112601 A1 5/2013 Silver et al.
2014/0118884 A1 5/2014 Lin et al.
2014/0367262 A1 12/2014 Cho et al.
2014/0377131 A1 12/2014 Peters
2015/0008139 A1 1/2015 Saffron et al.
2015/0017089 A1 1/2015 Kuntke et al.
2015/0203366 A1 7/2015 Delpeux-Ouldriane et al.
2016/0167984 A1 6/2016 Gao et al.
2016/0221844 A1 8/2016 Gao et al.
2017/0015559 A1 1/2017 Costantino et al.
2018/0162752 A1 6/2018 Van Der Wal et al.
2018/0318843 A1 11/2018 O'Connor et al.
2018/0334396 A1 11/2018 Lippert et al.
2019/0248682 A1 8/2019 Pashley et al.
2019/0270654 A1 9/2019 Lippert et al.
2019/0326067 A1* 10/2019 Doyen .................. C02F 1/4691
2020/0024158 A1 1/2020 Boehme et al.
2020/0087174 A1 3/2020 Rajic
2021/0002136 A1 1/2021 Huang
2021/0107810 A1* 4/2021 Wyatt ................... C02F 1/4691
2021/0163319 A1 6/2021 Kwak
2023/0009842 A1 1/2023 Boehme et al.
2023/0031927 A1 2/2023 Boehme et al.
2023/0183103 A1 6/2023 Rassoolkhani
2024/0132380 A1 4/2024 Landon
2026/0001790 A1 1/2026 Boehme

FOREIGN PATENT DOCUMENTS

CN 102616925 B 2/2014
CN 104250827 A 12/2014
CN 112543671 A 3/2021
DE 4328242 A1 3/1995
EP 0562747 B1 7/1998
EP 2204233 A1 7/2010
EP 3546435 A1 10/2019
JP H-11-505463 A 5/1999
JP 2005-152743 A 6/2005
JP 2015-099856 A 5/2015
KR 10-2005-0031201 A 4/2005
KR 20150131654 A 11/2015
WO WO 2006080702 A1 8/2006
WO WO-2017-038220 A1 3/2017
WO WO2019222747 A1 11/2019
WO WO 2020023565 A1 1/2020
WO WO 2023283215 A1 1/2023
WO 2024059171 A1 3/2024

OTHER PUBLICATIONS

Chemical Abstract Services "Substance Detail 9004-32-4" 2025 (Year: 2025).*
Extended European Search Report in EP 24185554.3-1014, issued Nov. 7, 2024, 14 pages, European Patent Office, The Hague, Munich, Germany.
Laxman, Karthik et al, "Capacitive Deionization with Asymetric Electrodes: Electrode Capacitance vs Electrode Surface Area," Electrochimica Acta, vol. 176, Sep. 1, 2015, pp. 420-425, Amsterdam, NL.
International Preliminary Report on Patentability and Written Opinion for PCT/US2023/032692, issued Mar. 1, 2025, 13 pages, The International Bureau of WIPO, Geneva, Switzerland.
Notice of Reasons for Refusal, Japanese Patent Application No. 2021-501035, Apr. 25, 2023, Japan Patent Office.
International Search Report, Written Opinion and Notification of Transmittal of the International Search Report and the Written

(56) References Cited

OTHER PUBLICATIONS

Opinion of the International Searching Authority, or the Declaration issued in PCT/US2023/032692, Feb. 2024, 19 pages, ISA/EP, European Patent Office, NL.
Elisadiki, Joyce et al., 'Highly porous biomass-based, capacitive deionization electrodes for water defluoridation,' (2020), Ionics, 26, pp. 2477-2492, Springer-Verlag GmbH, Germany.
Li, Qian et al, 'Faradaic Electrodes Open a New Era for Capacitive Deionization,' 2020, 52 pages, The Authors, Wiley-VCH GmbH, John Wiley & Sons, Inc., Hoboken, New Jersey, USA.
Partial European Search Report issued in EP 24185554.3-1014, Sep. 13, 2024, 13 pages, European Patent Office, Germany.
Volfkovich, Yu M: "Capacitive Deionization of Water (A Review)", Russian Journal of Electrochemistry, Maik Nauka-Interperiodica Publishing, Moscow, RU, vol. 56, No. 1, Jan. 1, 2020 pp. 18-51.
U.S. Appl. No. 62/508,351 filed May 18, 2017, Lippert et al.
U.S. Appl. No. 62/702,286 filed Jul. 23, 2018, Lippert et al.
U.S. Appl. No. 62/758,433 filed Nov. 9, 2018, Boehme et al.
Office Action and Search Report issued in Chinese Application No. 201980049343.8, Apr. 24, 2022, China National Intellectual Property Administration, CN, translation provided with original, 15 pages.
Office Action issued in Chinese Application No. 201980049343.8, Oct. 10, 2022, China National Intellectual Property Administration, CN, Global Dossier machine translation provided with original, 7 pages.
Notification to Go Through Formalities of Registration and Notification to Grant Patent Right for Invention, Jan. 11, 2023, China National Intellectual Property Administration, CN, Translation provided with original, 4 pages.
Supplementary European Search Report and European Search Opinion issued in EP 19840364.4, Mar. 14, 2022, European Patent Office, EP, 9 pages.
Examination Report issued in IN 202137001834, Jun. 17, 2022, Indian Patent Office, IN, 7 pages.
Hearing Notice issued in IN 202137001834, Feb. 17, 2023, Indian Patent Office, IN, 2 pages.
International Search Report and Written Opinion issued in PCT International Application No. PCT/US2019/033144, Sep. 20, 2019, ISA/US United States Patent and Trademark Office, 8 pages.
International Search Report and Written Opinion issued in PCT International Application No. PCT/US2019/043129, Nov. 7, 2019, ISA/US United States Patent and Trademark Office, 12 pages.
International Search Report and Written Opinion issued in PCT International Application No. PCT/US2022/036177, Dec. 19, 2022, ISA/EP European Patent Office, 19 pages.
Akshay, P., "Water Treatment Systems (PoE) Market by Technology (Water Softeners, Filtration Methods, Reverse Osmosis, Distillation Systems, Disinfection Methods and Others), by Application (Residential and Non-Residential)—Global Forecast to 2020," Markets and Markets Report, Jan. 19, 2018, 5 pages, Retrieved on Jan. 19, 2023 from MarketsandMarkets Database.
"Aluminum E-pH (Pourbaix) Diagram," 7 pages, retrieved Mar. 15, 2023 from https://corrosion-doctors.org/Corrosion-Thermodynamics/Potential-pH-diagram-aluminum.htm.
Am, El-Wakil, et al., "Removal of Lead from Aqueous Solution on Activated Carbon and Modified Activated Carbon Prepared from Dried Water Hyacinth Plant," Journal of Analytical and Bioanalytical Techniques, Mar. 31, 2014, 14 pages, vol. 5, No. 2, OMICS Publishing Group, Hyderabad, IN.
Avraham, E., et al., "Limitations of Charge Efficiency in Capacitive Deionization, II. On the Behavior of CDI Cells Comprising Two Activated Carbon Electrodes," Journal of the Electrochemical Society, Aug. 13, 2009, pp. 157-162, vol. 10, Electrochemical Society, US.
Avraham, E., et al., "The Feasibility of Boron Removal from Water by Capacitive Deionization," *Electrochimica Acta*, May 19, 2011, pp. 6312-6317, vol. 56, Elsevier, Amsterdam, NL.
Bouhadana, Y., et al., "Capacitive Deionization of NaCl Solutions at Non-Steady-State Conditions: Inversion Functionality of the Carbon Electrodes," The Journal of Physical Chemistry, Jul. 19, 2011, pp. 16567-16573, vol. 115, ACS Publications, US.
Brown, R., et al., "Controlling Lead in Drinking Water," Water Research Foundation, 2015, 56 pages, Web Report #4409, Water Research Foundation, Denver, CO, US.
"Carbon Cloth CC4 Plain Description," Fuel Cell Earth, 4 pages, Aug. 14, 2020, https://www.fuelcellearth.com/fuel-cell-products/carbon-cloth-cc4-plain/, Retrieved on Mar. 16, 2023 from Wayback Machine https://web.archive.org/web/20200814200356/https://www.fuelcell.earth.com/fuel-cell-products/carbon-cloth-cc4-plain/#tab-description.
"Carbon Cloth CC4 Plain Technical Details," Fuel Cell Earth, 4 pages, Aug. 14, 2020, https://www.fuelcellearth.com/fuel-cell-products/carbon-cloth-cc4-plain/, Retrieved on Mar. 16, 2023 from Wayback Machine http://web.archive.org/web/20200814200356/https://www.fuelcellearth.com/fuel-cell-products/carbon-cloth-cc4-plain/#tab-description.
CBS San Francisco, "High Lead Levels Found in Water Fountains at Berkeley Schools," CBS News Bay Area, Jan. 2, 2018, 3 pages, Retrieved on Jan. 20, 2023 from: http://sanfrancisco.cbslocal.com/2018/0I/25/lead-found-in-drinking-water-at-berkeley-schools.
Chae, J.H., and Chen, G.Z., "1.9V Aqueous Carbon-Carbon Supercapacitors with Unequal Electrode Capacitances," Electrochimica Acta, Jul. 20, 2012, pp. 248-254, vol. 86, Elsevier, Amsterdam, NL.
Chai, S.-H., et al., "'Brick-and-mortar' Synthesis of Free-Standing Mesoporous Carbon Nanocomposite Membranes as Supports of Room Temperature Ionic Liquids for CO2—N2 Separation," Journal of Membrane Science, Jun. 2, 2014, pp. 73-80, vol. 468, Elsevier, Amsterdam, NL.
Cohen, I., "Long Term Stability of Capacitive De-Ionization Processes for Water Deslination: The Challenge of Positive Electrodes Corrosion," Electrochimica Acta, May 18, 2013, pp. 91-100, vol. 106, Elsevier, Amsterdam, NL.
Ciesielczyk, F., et al., "Adsorption of Ni(II) from model solutions using co-precipitated inorganic oxides," Adsorption, Jan. 8, 2013, pp. 423-434, vol. 19, Springer Science + Business Media, Berline, DE.
"Convert Potentials to Another Reference Electrode," Gamry Instruments, 4 pages, Retrieved on Mar. 15, 2023 from www.gamry.com/resources-2/electrochemical-calculators-tools/convert-potentials-to-another-reference-electrode/.
"Cu-pourbaix-diagram.svg", Wikimedia Commons, 4 pages, Retrieved on Mar. 15, 2023 from commons.wikimedia.org/wiki/File:Cu-pourbaix-diagram.svg.
Debiemme-Chouvy, C., et al., "Electrochemical Treatments using Tin Oxide Anode to Prevent Biofouling," Electrochimica Acta, Mar. 17, 2011, pp. 10364-10370, vol. 56, Elsevier, Amsterdam, NL.
Dai, Z., et al., "Cell Voltage Versus Electrode Potential Range in Aqueous Supercapacitors," Scientific Reports, Apr. 21, 2015, 8 pages, Nature Portfolio, UK.
Dermentzis, K., et al., "Copper Removal from Industiral Wastewaters by Means of Electrostatic Shielding Driven Electrodeionization," Journal of Engineering Science and Technology Review, 2009, pp. 131-136, vol. 2, Issue 1.
Dinesh, T., "Point-of-Entry Water Treatment Systems Market by Product Type (Water Softening, Filtration, Reverse Osmosis, Disinfection, and Others), Application (Residential, Commercial, and Industrial), and End Use (Hotel, Commercial, Household, Hospital, Academic, and Others): Global Opportunity Analysis and Industry Forecast, 2022-2031," Allied Market Research Database, Feb. 2022, 7 pages, Retrieved on Jan. 19, 2023.
Edwards, M., and McNeill, L.S., "Effect of Phosphate Inhibitors on Lead Release from Pipes," Journal American Water Works Association, Jan. 2002, pp. 79-90, vol. 94, No. 1, Wiley, Hoboken, NJ, US.
Edwards, M., and Dudi, A., "Role of Chlorine and Chloramine in Corrosion of Lead-Bearing Plumbing Materials," Journal American Water Works Association, Oct. 2004, pp. 69-81, vol. 96, No. 10, Wiley, Hoboken, NJ, US.
"Effluent Guidelines," U.S. Environmental Protection Agency, 7 pages, Retrieved on Mar. 15, 2023 from www.epa.gov/eg.

(56) References Cited

OTHER PUBLICATIONS

Elisadiki, J., et al., "Highly porous biomass-based capacitive deionization electrodes for water defluoridation," *Ionics*, Dec. 9, 2019, pp. 2477-2492, vol. 26, No. 5, Springer, Kiel, DE.
"Examples of a Pourbaix Diagram," University of Cambridge, 1 page, Retrieved Mar. 15, 2023 from www.doitpoms.ac.uk/tlplib/pourbaix/pourbaix example.php.
"Fuel Cell Earth," 3 pages, 2021, Retrieved on Jan. 29, 2021 from https//www.fuelcellearth.com.
Gaikwad, M.S., and Balomajumder, C., "Tea Waste Biomass Activated Carbon Electrodes for Simultaneous Removal of Cr(VI) and Fluoride by Capacitive Deionizaiton," Chemosphere, Jun. 19, 2017, pp. 1141-1149, vol. 184, Elsevier, Amsterdam, NL.
Ganim, S., "5,300 U.S. Water Systems Are in Violation of Lead Rules," CNN, Jun. 29, 2016, 5 pages.
Gao, X., et al., "Dependence of the Capacitive Deionization Performance on Potential of Zero Charge Shifting of Carbon Xerogel Electodes During Long-Term Operation," Journal of the Electrochemical Society, pp. E159-E166, vol. 161, No. 12, The Electrochemical Society, US.
Gao, X., et al., "Surface Charge Enhanced Carbon Electrode for Stable and Efficient Capacitive Deionziation Using Inverted Adsorption-Description Behavior," Energy and Environmental Science, Jan. 22, 2015, 13 pages, Royal Society of Chemistry, UK.
Gao, X., et al., "Voltage-Based Stabilization of Microporous Carbon Electrodes for Inverted Capacitive Deionization," The Journal of Physical Chemistry, Dec. 21, 2017, pp. 1158-1168, vol. 122, No. 2, American Chemical Society, US, Just Accepted Manuscript Submitted.
Garcia, E.M., et al., "Electrodeposition of Cobalt from Spent Li-ion Battery Cathodes by the Electrochemistry Quartz Crystal Microbalance Technique," Journal of Power Sources, Jul. 17, 2008, pp. 549-553, vol. 185, Elsevier, Amsterdam, NL.
Girardi, L., "Elevated lead levels found at some Geneva school water fountains," Chicago Tribune, Dec. 13, 2017, 9 pages, Retrieved from: http://www.chicagotribune.com/suburbs/aurora-beacon-news/news/ct-abn-geneva-water-st-1214-20171213-story.html.
Han, L., et al., "Exploring the Impact of Pore Size Distribution on the Performance of Carbon Electrodes for Capacitive Deionization," Journal of Colloid and Interface Science, May 24, 2014, pp. 93-99, vol. 430, Elsevier, Amsterdam, NL.
Holubowitch, N., et al., "Quasi-Steady State Polarization Reveals the Interplay of Capacitive and Faradaic Processes in Capacitive Deionization," ChemElectroChem, May 11, 2017, 13 pages, pp. 2404-2413, vol. 4, No. 9, Wiley, Hoboken, NJ, US, Accepted Manuscript Submitted.
Huang, S.-H., et al., "Electro-Enhanced Removal of Copper Ions from Aqueous Solutions by Capacitive Deionization," Journal of Hazardous Materials, May 24, 2014, pp. 8-15, vol. 278, Elsevier, Amsterdam, NL.
Huang, C.-C., et al., "Removal of Copper Ions from Wastewater by Adsorption/Electrosoption on Modified Activated Carbon Cloths," Oct. 15, 2009, pp. 477-483, vol. 175, Elsevier, Amsterdam, NL.
Iftekhar, S., et al., "Removal of Ni(II) Using Multi-Walled Carbon Nanotubes Electrodes: Relation Between Operating Parameters and Capacitive Deionization Performance," Aug. 25, 2016, Arab Journal of Science and Engineering, 7 pages.
Ji, Q., et al., "Electric Double-Layer Effect Induce Separation of Aqueous Metal Ions," ACS Nano, Oct. 19, 2015, pp. 10922-10930, vol. 9, No. 11, American Chemical Society, US.
Jusko, T.A., et al., "Blood Lead Concentrations < µg/dL and Child Intelligence at 6 Years of Age," *Environmental Health Perspectives*, Feb. 2008, pp. 243-248, vol. 116, No. 2, National Institute of Environmental Health Sciences, US.
Kim, B.M, and Weininger, J.L., "Electrolytic Removal of Heavy Metals from Wastewaters," Environmental Progress, 1982-05, pp. 121-125, vol. 1, No. 2.
Kortenaar, M.V., et al., "Electroless Silver Deposition in 100 nm Silicon Structures," Journal of the Electrochemical Society, Jan. 2001, C28-C33, vol. 148, No. 1, Electrochemical Society, Pennington, NJ, US.
"Kynol," 1 page, 2012, Retrieved on Jan. 29, 2021 from www.kynol.de/products.html.
Landon, J., et al., "Impact of Pore Size Characteristics on the Electrosorption Capacity of Carbon Xerogel Electrodes for Capacitive Deionization," Journal of the Electrochemical Society, Sep. 17, 2012, pp. A1861-A1866, vol. 159, No. 11, Electrochemical Society, US.
Levin, R., et al., "Lead Exposures in U.S. Children, 2008: Implications for Prevention," Environmental Health Perspectives, Oct. 2008, pp. 1285-1293, vol. 116, No. 10, National Institute of Environmental Health Sciences, US.
"Mn pourbaix diagram.png" Retrieved on Mar. 15, 2023 from https://commons.wikimedia.org/wiki/File:Mn pourbaix diagram.png, 3 pages.
"National Primary Drinking Water Regulations," U.S. Environmental Protection Agency, 28 pages, Retrieved on Mar. 15, 2023 from www.epa.gov/ground-water-and-drinking-water/national-primary-drinking-water-regulations.
O'Connor, M.P., et al., "Electrochemical Deposition for the Separation and Recovery of Metals Using Carbon Nanotube-Enabled Filters," Environmental Science Water Research + Nanotechnology, Oct. 16, 2017, pp. 58-66, vol. 4, Royal Society of Chemistry, UK.
Olson, E.D., and Fedinick, K.P., "What's in Your Water? Flint and Beyond," Natural Resources Defense Council, Jun. 28, 2016, 5 pages, Retrieved on Jan. 12, 2023 from https://www.nrdc.org/resources/whats-your-water-flint-and-beyond.
Pattani, A., "NYC Lags in Reinstating Public School Water Foundatins After Finding Lead," WNYC News, Mar. 6, 2018, Retrieved on Jan. 12, 2023 from https://www.wnyc.org/story/nyc-lags-repairing-water-fountains-lead-public-schools.
Pell, M.B., and Schneyer, J., "Reuters finds 3,810 U.S. areas with lead poisoning double Flint's," Reuters, Nov. 14, 2017, 8 pages, Retrieved on Jan. 12, 2023 from https://www.reuters.com/article/us-usa-lead-map/reuters-finds-3810-u-s-areas-with-lead-poisoning-double-flints-idUSKBNIDEIH2.
Pletcher, D., et al., "Reticulated Vitreous Carbon Cathodes for Metal Ion Removal from Process Streams Part I: Mass Transport Studies," Journal of Applied Electrochemistry, 1991-08, pp. 659-666, vol. 21, Chapman and Hall Ltd., UK.
"Point of Use Water Treatment Systems Market Report: Statement of Work," 2023, 12 pages, Retrieved on Mar. 2, 2023.
"Point of Use Water Treatment Systems Market Size, Share & Trends Analysis Report by Technology (RO Systems, Distillation Systems), by Application, by Device, by Region, and Segment Forecasts, 2022-2030, Free Sample Report," 7 pages, Retrieved on Mar. 3, 2023 from www.grandviewresearch.com/industry-analysis/point-of-use-water-treatment-systems-market.
Porada, S.., et al., "Effect of Electrode Thickness Variation on Operation of Capacitive Deionization," Electrochimica Acta, Apr. 28, 2012, pp. 148-156, vol. 75, Elsevier, Amsterdam, NL.
"Pourbaix-hg.png", Wikimedia Commons, 3 pages, Retrieved on Mar. 15, 2023 from commons.wikimedia.org/wiki/File:Pourbaix-hg.png.
Pourbaix, M.J.N., et al., "Electrochemical Properties of the Platinum Metals, A New Approach to Studies of Corrosion Resistance and Cathodic Protection," Platinum Metals Review, Apr. 1959, pp. 47-53, vol. 3, Issue 2, Johnson Matthey, London, UK.
Pourbaix, M.J.N., et al., "Electrochemical Properties of the Platinum Metals," Platinum Metals Review, 1959-07, pp. 100-106, vol. 3, Issue 3, Johnson Matthey, London, UK.
"Pourbaix Diagram of Iron.svg," Wikimedia Commons, Retrieved Mar. 15, 2023 from commons.wikimedia.org/wiki/File:Pourbaix_Diagram_of_Iron.svg 6 pages.
Seewer, J., "Hundreds of Water Fixtures in Ohio Schools Found with Lead," Associated Press, Jan. 5, 2018, 2 pages.
Simaioforidou, A, et al., "Surface Chemical Modification of Macroporous and Mesoporous Carbon Materials": Effect in their

(56) References Cited

OTHER PUBLICATIONS

Textural and Catalytic Properties, Microporous and Mesoporous Materials, Jan. 6, 2019, pp. 334-344, vol. 279, Elsevier, Amsterdam, NL.
"Redox Chemistry of Chlorine and Cholramine Disinfectants," Retrieved Mar. 15, 2023 from www.sedimentaryores.net/Pipe-Scales/Chlorine-chloramine.html, 4 pages.
Schock, M.R., et al., "Occurrence of Contaminant Accumulation in Lead Pipe Scales from Domestic Drinking-Water Distribution Systems," Environmental Science & Technology, Jan. 23, 2008, pp. 4285-4291, vol. 42, No. 12, Americal Chemical Society, Washington, DC, US.
Shekinah, P., et al., "Adsorption of lead(II) from Aqueous Solution by Activated Carbon prepared from *Eichhornia*," Journal of Chemical Technolgy and Biotechnology, Apr. 2002, pp. 458-464, vol. 77, Issue 4, Society of Chemical Industry, London, UK.
Siegel, J., "Pruitt asks Cabinet to help him with 'war on lead' in drinking water," Washington Examiner, Feb. 5, 2018, Retrieved on Jan. 12, 2023 from http://www. washingtonexaminer.com/pruitt-asks-cabinet-to-help-him-with-war-on-lead-in-drniking-water/article/264815 8.
Suss, M.E., et al., "Capacitive Desalination with Flow-Through Electrodes," Energy & Environmental Science, Oct. 18, 2012, pp. 9511-9519, vol. 5, Issue 11, The Royal Society of Chemistry, London , UK.
Swiatkowski, A., et al., "Influence of the Surface Chemistry of Modified Activated Carbon on its Electrochemical Behavior in the Presence of Lead(II) Ions," Carbon, Sep. 12, 2004, pp. 3057-3069, vol. 42, Elsevier, Amsterdam, NL.
Suh, R., "Our Drinking-Water Crisis Goes Far Beyond Flint," Natural Resources Defense Council, Jun. 28, 2016, Retrieved on Jan. 12, 2023 from: https://www.nrdc.org/experts/rhea-suh/our-drinking-water-crisis-goes-far-beyond-flint.
Tang, W., et al., "Comparison of Faradaic Reactions in Capacitive Deionization (CDI) and Membrane Capacitive Deionization (MCDI) Water Treatment Processes," Water Research, Sep. 1, 2017, pp. 229-237, vol. 120, Elsevier, Amsterdam, NL, Accepted Manuscript Submitted (Revised and Submitted May 2017).
"Test Your School's Drinking Water for Lead,"Tap Water Watch, 2022, Retrieved on Jan. 12, 2023 from www.tapwater.watch.com/school-drinking-water/.
Torrice, M., "A 'war on lead' may be on the horizon," Chemical and Engineering News, Jan. 15, 2018, Retrieved on Jan. 19, 2023 from: https://cen.acs.org/articles/96/i3/us-policy-outlook-for-2018.html.
"Lead and Copper Rule," U.S. Environmental Protection Agency, Nov. 20, 2022, Retrieved on Jan. 12, 2023 from https://www.epa.gov/dwreginfo/lead-and-copper-rule.
"Lead and Copper Rule Revisions White Paper," U.S. Environmental Protection Agency, Office of Water, Washington, DC, 20460, Oct. 2016, 18 pages.
White, J., "Nearly 4,000 US communities have higher rates of lead poisoning than Flint," World Socialist Web Site, Nov. 16, 2017, Retrieved on Jan. 12, 2023 from: https://www.wsws.org/en/articles/20I 7/II/16/lead-nl6.html.
Xie, Y., "Dissolution, Formation, and Transformation of the Lead Corrosion Product PbO2: Rates and Mechanisms of Reactions that Control Lead Release in Drinking Water Distribution Systems," Jan. 2010, PhD Thesis, Washington University in St. Louis, St. Louis, Missouri.
Yeh, C.-L., et al., "Improved Performance in Capacitive Deionization of Activated Carbon Electrodes with a Tunable Mesospore and Micropore Ratio," Desalination, Mar. 25, 2015, pp. 60-68, vol. 367, Elsevier, Amsterdam, NL.
Zhang, X.F., et al., "Three-Dimensional Honeycomb-Like Porous Carbon Derivaed from Corncob for the Removal of Heavy Metals from Water by Capacitive Deionization," RSC Advances, Jan. 4, 2018, pp. 1159-1167, vol. 8, Issue 3, Royal society of Chemistry, UK.
"Zn-pourbaix.diagram.svg" Retrieved on Mar. 15, 2023 from commons.wikimedia.org/wiki/File:Zn-pourbaix-diagram.svg, 4 pages.
U.S. Appl. No. 62/508,351, filed May 18, 2017, Expired.
U.S. Appl. No. 62/702,286, filed Jul. 23, 2018, Expired.
U.S. Appl. No. 62/758,433, filed Nov. 9, 2018, Expired.
U.S. Appl. No. 15/984,290, US-2018-0334396-A1, May 18, 2018, Nov. 22, 2018, Alexander W. Keeling, Pending.
U.S. Appl. No. 16/417,574, US-2019-0270654-A1, May 20, 2019, Sep. 5, 2019, Alexander W. Keeling, Abandoned.
U.S. Appl. No. 16/520,340, US-2020-0024158-A1, U.S. Pat. No. 11,117,818, Jul. 23, 2019, Jan. 23, 2020, Sep. 14, 2021, Salil Jain, Issued.
U.S. Appl. No. 17/369,346, US-2023-0009842-A1, Jul. 7, 2021, Jan. 12, 2023, Docket Central, Pending.
U.S. Appl. No. 17/932,488, US-2023-0031927-A1, Sep. 15, 2022, Feb. 2, 2023, Docket Central, Pending.
Astom Corporation, Jan. 29, 2020, 5 pages, retrieved on Apr. 11, 2023, via Wayback Machine from www.astom-corp.jp.
Bertazzoli, R., et al., "Electrolytic Removal of Metals Using a Flow-Through Cell with a Reticulated Vitreous Carbon Cathode." Journal of the Brazilian Chemical Society, May 8, 1997, pp. 487-493, vol. 8, No. 5, Sociedade Brasileira de Quimica, Brazil.
Calgon Carbon, Dec. 4, 2020, 4 pages, retrieved on Apr. 11, 2023 via Wayback Machine from www.calgoncarbon.com/products/.
Co-pending Intl. Appl. No. PCT/US23/32698 filed Sep. 14, 2023.
Co-pending U.S. Appl. No. 15/984,290, filed May 18, 2018.
Co-pending U.S. Appl. No. 16/417,574, filed May 20, 2019.
Co-pending U.S. Appl. No. 16/520,340, filed Jul. 23, 2019.
Co-pending U.S. Appl. No. 17/369,346, filed Jul. 7, 2021.
Communication pursuant to article 94(3) EPC on Oct. 15, 2025 for application 22941864.5.
Cotillas, S., et al., "Use of carbon felt cathodes for the electrochemical reclamation of urban treated wastewaters." Applied Catalysis B: Environmental, Jul. 8, 2014, pp. 252-259, vol. 162, Elsevier, Amsterdam, NL.
Drogui, P. et al., "Hydrogen peroxide Production by water electrolysis: Application to disinfection." Journal of Applied Electrochemistry, Aug. 2001, pp. 877-882, vol. 31, Kluwer Academic Publishers, NL.
European Patent Specification EP 0562747B1, application 9..01899.6, Mar. 12, 1993.
Figure 20. Pourbaix diagram for Mn. (https://commons.wikimedia.org/wiki/File:Mn_pourbaix_ diagram.png).
Figure 21. Pourbaix diagram for Al. (https://corrosion-doctors.org/Corrosion-Thermodynamic s/Potential-pH-diagram-aluminum.htm).
Figure 22. Pourbaix diagram for Zn. (https://commons.wikimedia.org/wiki/File:Zn-pourbaix-diagram.svg).
Fumasep FAS-50, Nov. 28, 2020, 6 pages, retrieved Apr. 12, 2023 via Wayback Machine from www.fuelcellstore.com/fumasep-fas-50.
Glavaski, O.S., et al., "Electrochemical Degradation of the Pesticide Dimethenamid-P at Gold, DSA Platinum and Ruthenium Oxide Electrodes in Different Electrolytes." Electroanalysis, Jul. 30, 2014, pp. 1877-1880, vol. 26, John Wiley & Sons, Inc., Hoboken, NJ, US.
Haycarb, Dec. 5, 2020, 6 pages, retrieved Apr. 11, 2023 via Wayback Machine from www.haycarb.com.
Hubbard-Hall, Safety Data Sheet, Brite Dip Acid, Oct. 5, 2020. 6 pages.
International Preliminary Report on Patentability and Written Opinion for PCT/US2022/052340, ISA/EP, Rijswijk, NL, 9 pages.
International Search Report and Written Opinion for PCT/US2022/052341, Apr. 4, 2023, ISA/EP, Rijswijk, NL, 8 pages.
Jiang, B., et al., "Outstanding performance of electro-Fenton process for efficient decontamination of Cr(III) complexes via alkaline precipitation with No. accumulation of Cr(VI): Important roles of iron species." Applied Catalysis B: Environmental, Apr. 22, 2020, pp. 1-12, vol. 272, Elsevier, Amsterdam, NL.
Lu, J., et al., "Electrochemical removal of RRX-3B in residual dyeing liquid with typical engineered carbonaceous cathodes," Journal of Environmental Management, Nov. 21, 2020, pp. 1-9, Elsevier, Amsterdam, NL.
Ma, P., et al., "Reduction of oxygen to H2O2 at carbon felt cathode in undivided cells. Effect of the ratio between the anode and the

(56) References Cited

OTHER PUBLICATIONS cathode surfaces and of other operative parameters." Separation and Purification Technology, Jan. 8, 2019, pp. 1-7, Elsevier, Amsterdam, NL.
Nilesh R. (Jun. 2016). Point-of-Entry Water Treatment Systems Market by Technology (Water Softening, Filtration, Reverse Osmosis (RO), Disinfection, Sedimentation, Distillation) and Application (Residential, Commercial, Industrial)—Global Opportunity Analysis and Industry Forecast, 2015-2022. Allied Market Research Report. Retrieved from Allied Market Research Database. https://www.alliedmarketresearch.com/water-treatment-systems-point-of-entry-market.
Point of Use Water Treatment Systems Market Analysis, by Technology (RO, Distillation, Disinfection, Filtration), by Device (Pitchers, Faucet Filters, Countertop), by Region, and Segment Forecasts, 2018-2025. (Oct. 2017) Retrieved from: https://www.grandviewresearch.com/industry-analysis/point-of-use-water-treatment-systems-market.
Pourbaix diagram for Ni. (Ciesielczyk, F., Bartczak, P., Wieszczycka, K., Siwinska-Stefanska, K., Nowacka, M., and Jesionowski, T. (2013). Adsorption of Ni(II) from model solutions using co-precipitated inorganic oxides. Adsorption. 19, 423-434.).
Pourbaix, M., translated by Franklin, J.A., "Atlas of Electrochemical Equilibria in Aqueous Solutions," 1974, 648 pages, National Association of Corrosion Engineers, Brussels, Belgium.
Roberts et al, "Chromium removal using a porous carbon felt cathode", Journal of Applied Electrochemistry., NL, (Oct. 1, 2002), vol. 32, No. 10, doi:10.1023/A:1021282015050, ISSN 0021-891X, pp. 1091-1099, XP055570010.
Rodriguez-Valadez, Francisco et al, "Electroreduction of Cr(VI) to Cr (III) on Reticulated Vitreous Carbon Electrodes in a Parallel-Plate Reactor with Recirculation," Environmental Science & Technology, 2005, 5 pages, vol. 39, No. 6.
Sigracell Specialty Graphites for Lithium-Ion Batteries, Sep. 28, 2020, 4 pages, retrieved on Apr. 12, 2023 via Wayback Machine from www.sglcarbon.com/en/markets-solutions/materials.
Smith, A. (Dec. 13, 2014). Health Problems Associated with Impure Tap Water. Retrieved from: http://www.macrohealth.net/health-problems-associated-with-impur••tap-water/.
Sopaj, F., et al., "Influence of the anode materials on the electrochemical oxidation efficiency. Application to oxidative degradation of the pharmaceutical amoxicillin." Chemical Engineering Journal, Oct. 5, 2014, pp. 286-294, vol. 262, Elsevier, Amsterdam, NL.
Subject of the Invention CN 102616925B Apr. 12, 2014.
Subject of the invention CN101634035B, Nov. 10, 2010.
U.S. Appl. No. 63/287,688, filed Dec. 9, 2021, James Landon.
U.S. Appl. No. 63/287,694, filed Dec. 9, 2021, Alan Rassoolkhani.
U.S. Appl. No. 63/375,708, filed Sep. 15, 2022, James Landon.
U.S. Appl. No. 63/375,710, filed Sep. 15, 2022, Alan Rassoolkhani.
Wu, J., et al., "Application of response surface methodology to the removal of the antibiotic tetracycline by electrochemical process using carbon-felt cathode and DSA (Ti/RuO2—IrO2) anode," Chemosphere, Feb. 17, 2012, pp. 614-620, vol. 87, Elsevier, Amsterdam, NL.
Zazou, H., et al., "Cold incineration of 1,2-dichlorobenzene in aqueous solution by electrochemical advanced oxidation using DSA/Carbon felt, Pt/Carbon felt and BDD/Carbon felt cells." Separation and Purification Technology, Jan. 8, 2019, pp. 1-30, Elsevier, Amsterdam, NL. Accepted Manuscript Submitted.

* cited by examiner

Pourbaix diagram for hypochlorite

Pourbaix diagram for hypobromite

Pourbaix diagram for mono chloramine

Cycles of applied E vs. Time in a CCC

CV scans of SC, CG, KN, CX, and HE carbon electrodes

Bench-scale capacitive coagulation device

SEM micrographs and EDX mapping

Breakthrough curves during lead removal

Pourbaix operating regions for lead removal

Pourbaix diagrams for copper

Pourbaix diagram for zinc

Deposition of copper on CCC cathode

Deposition of iron on CCC cathode

Lead precipitates on carbon cloth

EDX mapping of a Pb crystal

Schematic of a rolled cell

1 – Anode, 2 – Spacer, 3 – Cathode, 4 – Input stream, 5 – Purified Stream, 6 – Electrical Contacts.

Free chlorine removal with a Kynol EDC

Chloramine removal with a Kynol EDC

Free chloramine removal with a Calgon EDC

FARADIC POROSITY CELL

RELATED APPLICATIONS

This application is a continuation-in-part of U.S. application Ser. No. 17/369,346 by Boehme et al., entitled "Faradic Porosity Cell," filed Jul. 7, 2021, which is a continuation-in-part of U.S. application Ser. No. 16/520,340 by Boehme et al., entitled "Faradic Porosity Cell," filed on Jul. 23, 2019, now issued as U.S. Pat. No. 11,117,818, which is a continuation-in-part of U.S. application Ser. No. 16/417,574 by Lippert et al., entitled "Defined Carbon Porosity for Enhanced Capacitive Charging," filed on May 20, 2019, which is a continuation-in-part of U.S. application Ser. No. 15/984,290 by Lippert et al., entitled "Defined Carbon Porosity for Sustainable Capacitive Charging," filed on May 18, 2018; which claims the benefit of U.S. application No. 62/758,433, entitled "Capacitive Coagulation Cell," filed on Nov. 9, 2018; U.S. application No. 62/702,286, entitled "Capacitive Coagulation Cell," filed on Jul. 23, 2018; and U.S. application No. 62/508,351, entitled "Defined Carbon Porosity for Sustainable Capacitive Charging," filed on May 18, 2017, the disclosures of which are incorporated by reference herein in their entirety.

FEDERAL FUNDING

This invention was made with government support under 1R43ES028171-01 by the National Institutes of Health. The government has certain rights in the invention.

BACKGROUND OF THE INVENTION

Field of the Invention

The field of the invention is removal of metal ions, halide ions, derivatives of metals and halides, and ionic particulates from solutions, e.g., the removal of lead from water, by pairing selected faradic reactions with carbon electrode pore mouth diameter profiling.

Definitions

"Activated" means a chemical or physical process applied to a material to increase the porosity and thus the surface area. Typically it is applied to a carbon-based material, such as but not limited to bamboo, coconut husk, wood, lignite, or coal, which is then described as activated carbon. The activated carbon can be a powder, granular, felt, nonwoven, woven, etc.

"Adsorption" means attracting ions in an input stream to and retaining those ions on an electrode surface.

"Agglutination" means removing metal ions, halide ions, derivatives of metals or halides, or particulate metal from an input stream to a cell by one or more of the following: (i) physical adsorption; (ii) capacitive adsorption; (iii) electrochemical pH modulation & metal immobilization; (iv) electrochemical peroxide ($H_2O_2$) generation & metal oxidation; (v) electrodeposition or electroplating; (vi) electrochemical oxidation or reduction; (vii) precipitation; (viii) pore mouth diameter profile, (ix) electrode treatment, (x) electrode spacing, and (xi) flow-by vs. flow-through vs. carbon block cell design.

"BET surface area" means surface area determined by the Brunauer-Emmett-Teller method, which is a physical adsorption-based method using nitrogen to determine the surface area of a material.

"Breakthrough curve" means the course of an effluent adsorptive concentration at the outlet of a fixed adsorber. A breakthrough curve enables the calculation of a technically usable sorption capacity. Breakthrough curves typically plot target species concentration vs. volume treated. See, e.g., FIG. 14.

"Carbon block" is an extruded carbon material with carbon particles bound with a polymer into a bulk solid form. It is typically used for dechlorination and particle filters. In a carbon block cell design used in an FPC, each of one or more pristine carbon blocks are typically divided into two halves that are electrically isolated in an FPC; one half or each block is used as an anode and the other half of each block is used as a cathode.

"Carbon cloth" is a woven porous material consisting essentially of carbon.

'Carbon felt" is a non-woven porous material consisting essentially of carbon.

"Carbon film" is a carbon composite consisting essentially of carbon particles and polymer binder.

"Capacitive adsorption" means adsorption of an ion or other charged species on an electrode as a result of electrical attraction.

"CCC" or "capacitive coagulation cell" or "CCC device" means a purification cell that primarily uses capacitive adsorption to remove metal ions, derivatives of metals, or particulate metal from a liquid (typically aqueous) input stream and produce an output stream with a metal, metal derivative, or particulate content below a government regulated limit. For instance, the US EPA specifies a lead content of 15 ppb as the "action level" for potable or irrigation water.

"CCC Parameter" means a user-selected FPC Parameter in an CCC.

"Cell" means, in general, a plurality of electrodes exposed to an input stream (influent), with an outlet for the output stream (effluent) during operation, a short-circuit switch or power supply attached to the electrodes, a manual or computerized means of controlling the power supply and any in-stream valves, and sensors that monitor cell operation and interface with the manual or computerized means of control. A cell can optionally include a further means of controlling the input stream and the output stream, for instance to select different output stream collection vessels or other dispositions during cell operation. Unlike a capacitive deionization cell, an FPC does not regenerate (aka desorb) the electrodes to produce a waste stream of desorbed target species during operation; instead, an FPC, including CCC or an EDC, is replaced, e.g., when the concentration of a target species in the output stream exceeds a user-selected threshold; replacement criteria other than target species concentration in the output stream, e.g., cumulative volume of through stream for a given FPC, and presence of certain reaction byproducts, may be specified.

"Charging potential" means a voltage applied to a cell to perform work.

"Conductivity" means the electrical conductivity of an input stream, through stream, output stream, or a waste stream. Conductivity is a surrogate measurement for the molarity of ions in an input stream, output stream, or waste stream. Conductivity is directly proportional to molarity of ions in such streams.

"CG" means a carbon that has a predominately mesoporous structure with a nominal surface area of ~700 $m^2/g$. CG was formulated by the inventors using the pore mouth diameter profile method disclosed herein and fabricated for the inventors by Calgon Corporation (Naperville, IL). CG is sometimes recited as Calgon® or Calgon FM100 ST2 in the Tables.

"CV" means cyclic voltammogram.

"CX" means carbon xerogel. CX electrodes possess a mesoporous structure with a nominal surface area of ~200 $m^2/g$.

"Cycle" means a cycle of operation in which a sequence of positive then negative, or negative then positive, potential has been applied to an FPC electrode.

"DO" means dissolved oxygen.

"E" means a voltage, aka electrical potential; if a direct current, E has a constant polarity (positive or negative).

"Electrode" means a material, typically porous carbon, which is electrically conductive.

"EDC" means an electro-dehalidation cell disclosed in this Application. An EDC is a species of water purification cell within the genus of FPCs.

"EDC Parameter" means a user-selected FPC Parameter in an EDC.

"EDX" means Energy Dispersive X-Ray Analysis.

"$E_o$" is the potential vs. a reference electrode when the electrodes are short-circuited (i.e., $E_o$ is the potential during a short-circuit condition).

"$E_{PZC}$" or "potential of zero charge", means the potential of an electrode at which there is a minimum in ion adsorption at the surface. $E_{PZC}$ can be intentionally shifted by surface modification of a carbon electrode, or inherently relocated as a result of oxidation of an electrode surface by extended applied potential or voltage. The $E_{PZC}$ of a pristine carbon a electrode is typically between −0.1 V and +0.1 V. Shifting the $E_{PZC}$ of an electrode through surface modifications is disclosed in detail in U.S. APP 62/702,286 incorporated herein. FPC electrode $E_{PZC}$s for a given target species vary by water chemistry and are empirically determined.

"Faradic immobilization" means electron transfer to a target species in the electrolyte, or electron transfer to a species in the electrolyte, followed by a homogeneous reaction in solution with the target species of interest, after which the reaction product is adsorbed on an electrode.

"Felt" is a fabric made by rolling and pressing any suitable textile accompanied by the application of moisture or heat, which causes the constituent fibers to mat together to create a smooth surface.

"Flow-by" cell design means the through stream in an FPC flows across the surface of the electrodes in an FPC, rather than through the electrodes. Flow-by cell design can provide the following advantages compared to a flow-through cell design: lower pressure drop, higher flow rate, equal degradation of carbon electrodes, equivalent pH regions generated for each electrode pair.

"Flow rate" means the flow rate, typically in L/hr, ml/min, etc., of an input, throughput, output, or waste stream.

"Flow-through" cell design means the through stream in an FPC is forced through the electrodes in an FPC. Flow-through cell design can provide the following advantages compared to a flow-by cell design: more extreme pH regions, better control over outlet pH.

"FPC" or "faradic porosity cell" or "FPC device" means a purification cell that uses agglutination to remove metal ions, halide ions, derivatives (e.g., other species) of target metals or target halides, or particulate metal from a liquid (typically aqueous) input stream and produce an output stream with a decreased metal, halide, or particulate content. Different species of FPC can be used in series or in parallel to remove target species from an aqueous influent to a purification system. An "FPC system" means a water purification system that contains one or more FPCs and optionally other types of purification cells (see definition of "hybrid system"), such as capacitive deionization ("CDI") cells, membrane CDI cells ("MCDI"), inverted CDI ("i-CDI") cells, and non-electrochemical cells and filters. Inclusion of CDI, MCDI, i-CDI cells, or similar desorbing cells in an FPC system requires provision of a waste stream and associated cell controls in an FPC system to accommodate desorption from CDI, MCDI, i-CDI, and similar desorbing cells into the waste stream. CCCs and EDCs are species of FPCs.

"FPC Parameter" means a user-selected value in an FPC of (i) physical adsorption; (ii) capacitive adsorption; (iii) electrochemical pH modulation; (iv) electrochemical peroxide ($H_2O_2$) generation & oxidation of target species; (v) electrodeposition (e.g., electroplating, electrophoretic deposition); (vi) electrochemical oxidation or reduction; (vii) precipitation; (viii) pore mouth diameter profile, (ix) electrode treatment, (x) electrode spacing, and (xi) flow-by vs. flow-through vs. carbon block cell design. One or more FPC Parameters are selected, or "tuned", to remove a target species from a through stream, based on empirical data for a given input water chemistry.

"Halide derivative" means a molecule or compound that contains a halide.

"Haycarb" means a microporous activated carbon non-woven felt with a nominal surface area of −1200 $m^2/g$.

"HE" means a high-efficiency mesoporous carbon. Electrodes made with HE carbon possess a predominately mesoporous structure with a nominal surface area of ~380 $m^2/g$. HE has a formulation of >98% mesoporous carbon with the balance being macroporous carbon. HE is formulated using the pore mouth diameter profile method disclosed in U.S. APP 62/702,286 incorporated herein.

"Hybrid system" means a water purification system that contains at least one FPC (CCC or EDC) and at least one other type of water purification cell, e.g., a peroxidation cell, CDI, MCDI, i-CDI, or non-electrochemical cell or filter. The minimal configuration of a hybrid system is series (FPC feeding other cell type, or vice versa). Larger systems can be series only, or have series paths in parallel (to increase throughput).

"Immobilization" means adsorption of a target species on an FPC electrode without later desorption into a purified output stream.

"Input stream" means a liquid, typically water containing various ions and metals, admitted through an inlet to a cell.

"KN" means a microporous carbon marketed as Kynol® available from American Kynol, Inc (Pleasantville, NY). Electrodes made with KN carbon possess a microporous structure with a nominal surface area of ~1800 $m^2/g$. KN is sometimes recited as Kynol ACC-5092-20 in the tables.

"KR-LC" means a dense carbon film with binder with a nominal surface area of ~1400 $m^2/$.

"Maxwell" means a dense carbon film with a nominal surface area of >1200 $m^2/$.

"Metal" means a metal, metal ion, metal complex, metal particle, or toxin for which a Pourbaix diagram exists and containing a metal selected from the group comprising As, Se, Pb, Ni, Zn, Al, Sc, Ti, V, Cr, Mn, Fe, Co, Ni, Cu, Y, Zr, Nb, Mo, Tc, Ru, Rh, Pd, Ag, Cd, La, Hf, Ta, W, Re, Os, Ir, Pt, Au, Hg, Ce, Pr, Nd, Pm, Sm, Eu, Gd, Tb, Dy, Ho, Er, Tm, Yb, and Lu.

"Metal derivative" means a molecule or compound that contains a metal or metalloid.

"Metal speciation" means the different chemical forms ("species") of a metal in a given milieu. For instance, As(III) and As(V) are species of arsenic that can coexist in an aqueous solution at a given pH.

"NHE" means Normal Hydrogen Electrode.

"Nonwoven" means sheet or web structures bonded together by entangling fiber or filaments (and by perforating films) mechanically, thermally or chemically.

"Output stream" means a liquid that has passed through an FPC and contains a lower molarity of target species than in the input stream.

"Parallel system architecture" means FPCs (and optionally other types of cells and filters) connected in parallel, i.e., the outlet of each FPC (and optionally other types of cells and filters) feeds the system output. A parallel system architecture can be fixed, or can comprise multiple FPCs, a process controller, interconnecting lines, sensors, and valves disposed in the lines and cells.

"Physical adsorption" means physical entrapment of a target species in an electrode pore.

"PMD" means pore mouth diameter, which is the diameter of a pore on the surface of a carbon electrode. A pore may be a dead-end channel or a through channel within a carbon electrode, and typically has a variable channel diameter.

"Point of entry" or "POE" means the location where a water supply feeds a water distribution system in a residence, commercial/industrial building, or other structure.

"Point of use" or "POU" means the location where water is dispensed from a water distribution system to a consumer, beverage dispenser, kitchen appliance, or other end use.

"Polarity" means the polarity of a DC voltage, either positive or negative.

"Pore mouth diameter profile" means the volumetric ratio(s) among microporous, mesoporous, and macroporous carbon in an electrode fabricated according to the pore mouth diameter profile method disclosed in U.S. APP 62/702,286 and U.S. application Ser. No. 16/417,574 incorporated herein. Generally speaking, the larger the average pore mouth diameter, the longer the working lifetime of the electrode and the more permeable the electrode is to a through stream. The average pore mouth diameter is controlled by the ratio of microporous, mesoporous, and macroporous carbon used to fabricate a given carbon electrode.

"Pourbaix diagram" (aka potential/pH diagram, EH-pH diagram or a pE/pH diagram), maps out possible stable (equilibrium) phases of an aqueous electrochemical system. Predominant ion boundaries are represented by lines. As such, a Pourbaix diagram can be read much like a standard phase diagram with a different set of axes. Similar to phase diagrams, Pourbaix diagrams do not address reaction rate or kinetic effects. For soluble species, the lines in a Pourbaix diagram are usually drawn for concentrations of 1 M or $10^{-6}$ M. Sometimes additional lines are drawn for other concentrations.

"Pourbaix operating region" means relating the pH and applied E at a given electrode in an FPC to a Pourbaix diagram to select for immobilization of a target species in a given water chemistry.

"Pristine" in reference to electrodes means without surface modifications; for example, a Spectracarb™ electrode, as supplied by the manufacturer, is pristine.

"Process controller" means a computer operating a process control application that monitors sensors disposed in a system of FPCs (and optionally, other types of cells and filters) to sample input, through, and/or output streams and status of FPCs (and optionally, other types of cells and filters) in a water purification system comprising one or more FPCs and optionally one or more other types of water purification cells or filters. The process controller actuates valves in lines interconnecting a source of aqueous solution to be treated, FPCs (and optionally other cells and filters), and system outlets, thereby enabling the various FPCs (and optionally other cells and filters) to be configured in a series system architecture, series-parallel system architecture, or parallel system architecture. Based on sensor data, the process controller can dynamically adjust FPC Parameters of FPCs in the system (and optionally adjust other cells and filters in the system).

"Purify" means to remove one or more target species from a through stream. Purification includes the removal of metals for which a Pourbaix diagram exists (e.g., As, Pb, Ni, Zn, Al, Cr, Mn, Fe, and Cu), halides (e.g., Cl, Br, chloramines), organics, and biological compounds.

"Rolled cell design" means an FCP cell design in which continuous separator and porous carbon-based electrode materials are physically rolled into a spiral to create a cylinder with multiple, predominantly flow-by, through stream paths through the porous carbon electrodes. To make a rolled cell, sheets of anode material, separator material, and cathode material are stacked and then rolled up to form a cylinder. Current collectors are attached to the anode and the cathode, usually in multiple locations to reduce electrical losses.

"SC" means a microporous carbon marketed as Spectracarb™ available from Engineered Fibers Technology, LLC (Shelton, CT). Electrodes made with SC carbon possess a microporous structure with a nominal surface area of ~1900 $m^2/g$.

"SCE" means a saturated calomel electrode, a standard reference electrode commonly used as a reference electrode, e.g., in cyclic voltammetry.

"Series system architecture" means FPCs (and optionally, other types of cells and filters) connected in series, i.e., the outlet of a first FPC feeds the inlet and a second FPC, the outlet of the second FPC feeds the inlet and a third FPC, and so on. A series system architecture can be fixed, or can comprise multiple FPCs (and optionally, other types of cells and filters), a process controller, sensors, interconnecting feed lines, and valves disposed in feed lines between the outlet of one FPC and the inlet of a second FPC.

"Series-parallel system architecture" means a system in which FPCs (and optionally, other types of cells and filters) can be connected in series or in parallel. A series-parallel system architecture can be fixed, or can comprise multiple FPCs (and optionally, other types of cells and filters), a process controller, interconnecting feed lines, sensors, and valves disposed in feed lines between the outlet of one FPC and the inlet of a second FPC, which valves are actuated by the process controller. The typical series-parallel system architecture comprises multiple ranks of a given series of cells, thereby treating the through stream in the same way, but with higher throughput provided by multiple serial paths.

"SHE" means Standard Hydrogen Electrode.

"Shift" means to alter the potential (aka "location") of the EPZC of an electrode by intentional or unintentional chemical or electrochemical modification of the electrode surface (e.g., electrochemical oxidation due to an applied potential or voltage) using the methods disclosed in USAPP 62/702,286 incorporated herein.

"Sigracell" means a porous carbon felt with a nominal surface area of 0.4 $m^2/g$. Sigracell is sometimes recited as Sigracell GFD 2.5 in the tables.

"Species" means a molecule, compound, or particulate in an aqueous stream or adsorbed on a cell electrode.

"Speciation" means the distribution of an element among defined chemical species in a system or within an FPC. For instance, an uncharged metal particle, a metal ion, and a metal complex of a given metal may coexist in solution or suspension at a given pH, which distribution may change as pH changes.

"Stacked cell design" means an FCP cell design in which separate pieces of separator and porous carbon-based electrode materials are stacked layer-by-layer to create a cylinder with multiple, predominantly flow-by, through stream paths through and/or by the porous carbon electrode. Current collectors are attached to the anode and the cathode, usually in multiple locations to reduce electrical losses. FIGS. 23*a-d* shows a stacked cell design.

"Surface-charge enhanced surface" means an electrode surface that has been imparted with surface charge through chemical or electrochemical methods.

"System" is a plurality of interconnected FPCs (and optionally, other types of cells and filters) controlled manually or by a process controller.

"Target metal" means one or more species of a given metal or metal derivative to be removed using a CCC.

"Target speciation" means one of several ionic states or complexations a target species may assume in an aqueous electrochemical cell as a function of E applied to cell electrodes and pH, as shown in a Pourbaix diagram of the target species.

"Target species" means a molecule, compound, or particulate to be removed using an FPC. "Target species" includes not only the molecule, compound, or particulate as found (aka "identified as a species in a Pourbaix diagram") in the input stream to an FPC, but one or more intermediate and final reactive products created in an FPC that include that molecule, compound, or particulate.

"Through stream" means the liquid stream being treated within a cell; stated differently, the through stream means the stream within a cell and between the inlet to the cell and the outlet from the cell.

"Treat" means to feed an input stream into an operating FPC or system containing FPCs and to recover the purified output stream.

"Treated electrode" means an electrode with an electrode surface modification disclosed herein.

"TDS" means total dissolved solids. The general operational definition is that the solids must be small enough to survive filtration through a filter with two-micrometer pores.

"Untreated electrode" means an electrode without an electrode surface modification disclosed herein, i.e., a pristine carbon electrode.

"Voltage" and "potential" are synonymous herein. Voltage is direct current ("DC") unless otherwise specified.

"Waste stream" means a liquid that has passed through a CDI, MCDI, i-CDI cell, reverse osmosis, ion exchange, or other water purification cell that cycles between adsorption and desorption and contains a higher molarity of ions than in the input stream. Deionization cells, e.g., capacitive deionization cells, can be used in a system containing FPCs. An FPC does not have a waste stream: the output stream from an FPC is purified water. A system that contains deionization cells that periodically desorb molecules will have (i) a purified output stream from deionization cells operating in an adsorption state that is combined with FPC output streams, and (ii) a waste stream from deionization cells operating in a desorption state.

"Woven cloth" is any textile formed by weaving.

RELATED ART

Toxic metals, esp. lead, in drinking water and crop irrigation water are a major, worldwide health problem. The problem, and health impacts, are largely unreported until a crisis occurs, as when the water in a municipal water system becomes toxic from lead contamination. At least 18 million Americans were at risk of drinking lead-contaminated water last year. More than 5,000 community water systems violated a federal lead rule. Elevated blood lead levels in children cause irreversible neurological and behavioral disorders, and even low levels have been linked to decreased IQ and lifetime achievement. The U.S. Environmental Protection Agency ("EPA") emphasizes that there is no safe level of lead exposure. The most commonly used filters for residential point-of-use/point-of-entry (POU/POE) lead reduction, e.g., filters using zeolites and ion exchange, fall short—they have limited effective lifetimes, lack substantial lead specificity, and are expensive.

FIG. 1 shows U.S. locations with dangerously high levels of lead in municipal drinking water and the incidence of elevated blood lead levels in young children in the U.S., exposing them to a risk of permanent brain damage, seizures, coma, and even death from lead poisoning. The U.S. Natural Resources Defense Council ("NRDC") recently found 5,363 community water systems in violation of the EPA's lead and copper rule (www.epa.gov/dwreginfo/lead-and-copper-rule), a federal requirement for monitoring of lead and copper levels in water. The NRDC report also found 1,110 water systems that exceed the action level for lead (15 ppb in at least 10 percent of homes tested). These systems collectively serve nearly 4 million people. The EPA is considering revising the 1991 Lead and Copper Rule to make regulations more stringent, and an Administrator of the EPA stated that the agency is working on an ambitious 10-year strategy to "declare a war on lead" and described lead in drinking water as "one of the greatest environmental threats we face as a country".

One 2018 test of the municipal water system in Flint, Michigan, showed lead levels of 13,000 ppb, which is 866-times the EPA action level for lead in drinking water. The population is becoming more aware and increasingly concerned about the water quality at home, in schools, and in the community. Water fountains in public schools in New York, California, Ohio, and Illinois have tested well above the action level of 15 ppb. Despite corrosion prevention measures taken by public water authorities to minimize the risk of pipes leaching lead into the drinking water system from outdated infrastructure, lead concentrations in drinking water are commonly elevated nationwide. The most effective way to eliminate lead from drinking water is to replace lead lines, an effort that would cost an estimated $30 billion. A better POU/POE device for potable water would be a vastly easier and more cost-effective solution. The problem of lead contamination is underserved because the existing solutions are overwhelmed by high expense, poor efficacy, and/or short device lifetimes.

Lead removal devices currently on the market lack specificity for lead, and device lifetime is limited by the total amount of water volume filtered, regardless of lead concentration. Over time the pressure drop across the filter becomes so large that water can no longer flow through the filter, even if the adsorbent in the filter is not fully consumed, rendering it useless.

Chlorine and/or chloramines are routinely added to the US drinking water supply as disinfectants to control microbial growth. While the removal of microbes is beneficial for human consumption, chlorine and/or chloramine contributes to tap water's unpleasant taste and odor. Therefore, removing chlorine and chloramines before end use is desirable. Chlorine is more volatile than chloramine and easier to remove with a typical consumer's filter pitcher; however, to remove chloramine, specially formulated filters containing activated carbon (catalytic carbon) are required. The presence of chlorine and/or chloramines is also detrimental for water purification processes that rely on polymer membranes, such as reverse osmosis (RO). Most membranes are not resistant to these disinfectants and break down upon exposure, causing irreversible damage and replacement of expensive RO membranes. Drinking water and other water for use in heat and power plants and other industrial processes ("process water") must have chlorine, chloramines, and other halides (esp., bromine and iodine) and halide derivatives removed to reduce corrosion and fouling of process systems. A solution for the technical problem of removing both chlorine and chloramines from water sources without damaging RO membranes and with reduced use of activated carbon filters would not only reduce water purification costs, but improve drinking water and process water quality. Oxidation of water-borne contaminants, as a water purification process, is normally done with hydrogen peroxide or ozone. Oxidation of certain water-borne contaminants facilitates further degradation and ultimate destruction of the contaminants without further intervention.

The technical problem to be solved is to provide (i) a more efficient, less expensive, purification device to produce purified water, especially a device that removes soluble and insoluble lead to below 15 ppb in potable water, which purification device is (ii) easily scalable for residential, municipal, commercial, and industrial use. Applicant has developed a faradic porosity cell ("FPC") that solves the technical problem by agglutination of target species. Two genera of the FPC are disclosed herein: a first genus that uses a novel electro-dehalidation technology to remove chlorine, other halides, chloramine disinfectants, and other halide derivatives from water—called herein the electro-dehalidation cell ("EDC"); and a second genus that uses a novel capacitive coagulation technology to remove metals, metal derivatives, and particulate metal—called herein the capacitive coagulation cell ("CCC"). Applicant's faradic porosity technology is significantly more effective in water purification than commonly used processes such as chemical coagulation, ion-exchange, and adsorbents. The EDC solves the technical problem of reducing the cost, and improving the efficiency, of removing chlorine, chloramines, and other halides and halide derivatives from drinking water and from process water. The CCC solves the technical problem of reducing the cost, and improving the efficiency, of removing metal, metal derivatives, and particulate metal from drinking water and from process water.

BRIEF DESCRIPTION OF THE DRAWINGS

FIG. 11*a* shows CVs for microporous SC. After 3 hours of electrochemical oxidation, the $E_{PZC}$ has shifted to the right, indicative of the formation of covalent bonds between the oxygen-containing functional groups and the carbon surface of the carbon electrode. After 6 hours, the electrical potential of zero charge ($E_{pzc}$) is no longer present and there is a noticeable decrease in current, signifying pore collapse.

FIG. 11*b* shows CVs for microporous KN, which shows the same trend as microporous SC in FIG. 11*a*.

FIG. 11*c* shows CVs for CG, a primarily mesoporous carbon. After 3 and 6 hours of electrochemical oxidation, the EPZC has shifted to the right, but the current is maintained due to non-collapsed pores.

FIG. 11*d* shows CVs for mesoporous CX, which follows the same trend observed for CG in FIG. 11*c*.

FIG. 11*e* shows CVs for mesoporous HE, which also follows the same trend observed for CG in FIG. 11*c*, but HE exhibits more area within the CV plot at 3 h and 6 h compared with CX in FIG. 11*d* due to a higher electrochemically active surface area, which provides a larger current response; the pore size of CX in FIG. 11*d* is 10× larger than HE, which is related to stability of the electrode and ultimate lifetime; the larger pore size of CX, however, provides much less surface area than HE.

FIG. 23*a* is a cross-sectional side view of a stacked electrochemical device.

FIG. 23*b* is a cross-sectional side view of a stacked electrochemical device with a membrane on the anode.

FIG. 23*c* is a cross-sectional side view of a stacked electrochemical device with a membrane on the cathode.

FIG. 23*d* is a cross-sectional side view of a stacked electrochemical device with a membrane on the anode and a membrane on the cathode.

SUMMARY

To increase the efficiency of removal of metal and halide contaminants from water using an electrochemical device that typically operates under a constant applied potential, Applicant's combining of capacitive adsorption, faradic reactions near or on cell electrodes, and electrode pore mouth diameter profiling creates a new type of electrochemical device, the faradic porosity cell. The first consideration in a faradic porosity cell is the selection and use of carbon-based (i.e., carbonaceous) materials that can generate reactions and vary pH at both the anode (carbon oxidation with water) and the cathode (dissolved oxygen reduction) over long periods of time. Carbon materials with the right porosity and bulk materials properties can produce these reactions over extended time periods, which will enable targeted reactions with incoming constituents (target species) to be removed from an aqueous solution.

The next design consideration is spacing between the anode and the cathode. With decreased spacing, while maintaining electrical isolation between the electrodes, faster reaction rates are possible, which will limit the residence time needed for certain "reaction and immobilization" processes to be accomplished. Electrode spacing is typically less than 1 mm, and is preferably as close as possible without causing a short circuit of anode and cathode or causing an unacceptable pressure drop (the corollary of which is increased residence time and decreased flow rate) within the FPC. Preferable electrode spacing is less 1 mm, preferably less than 200 microns, more preferably less than 50 microns, and most preferably less than 20 microns.

Figure 17A:
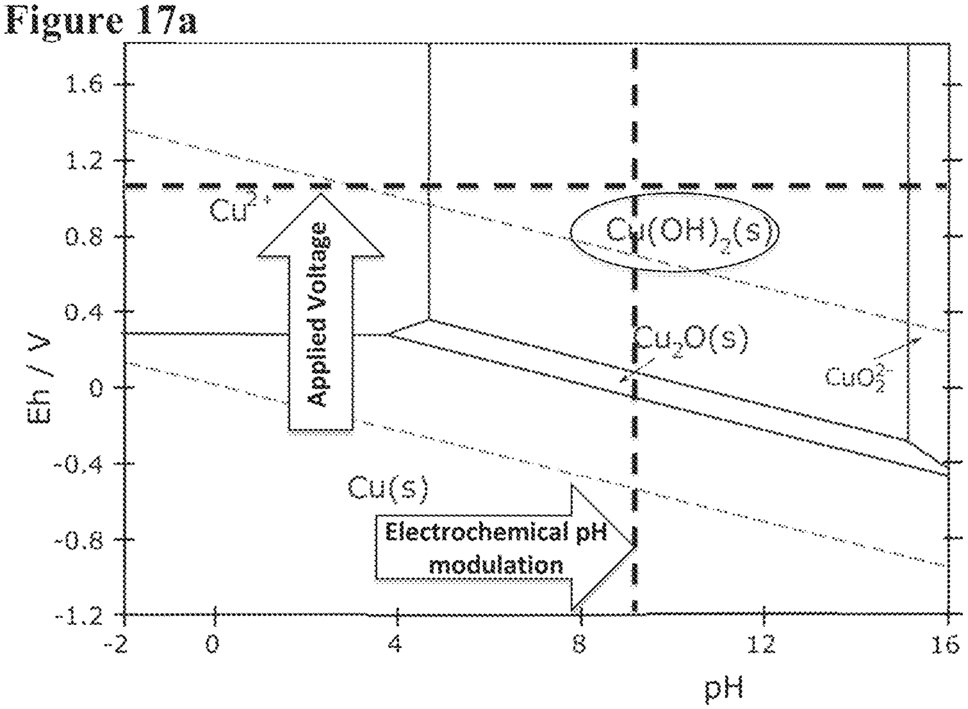
FIG. 17*a* shows a Pourbaix diagram for Cu showing methods of removal of copper hydroxide [Cu(OH)2] formation.
Figure 17B:
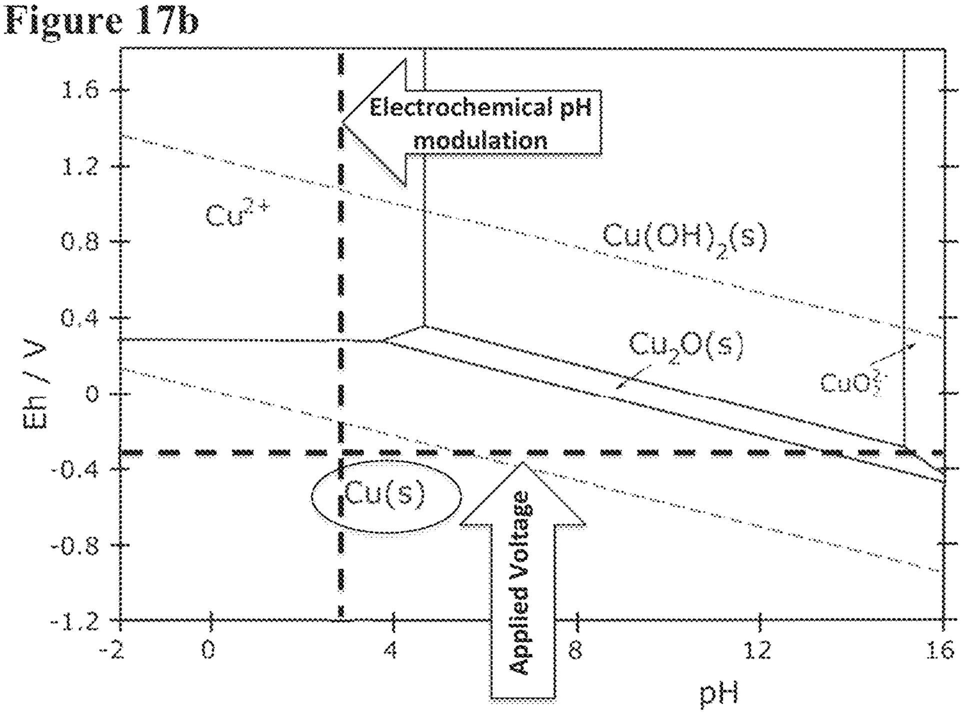
FIG. 17*b* shows a Pourbaix diagram for Cu showing methods of copper electrodeposition or electroplating [Cu(s)]. (commons.wikimedia.org/wiki/File:Cu-pourbaix-diagram.svg)
Figure 18:
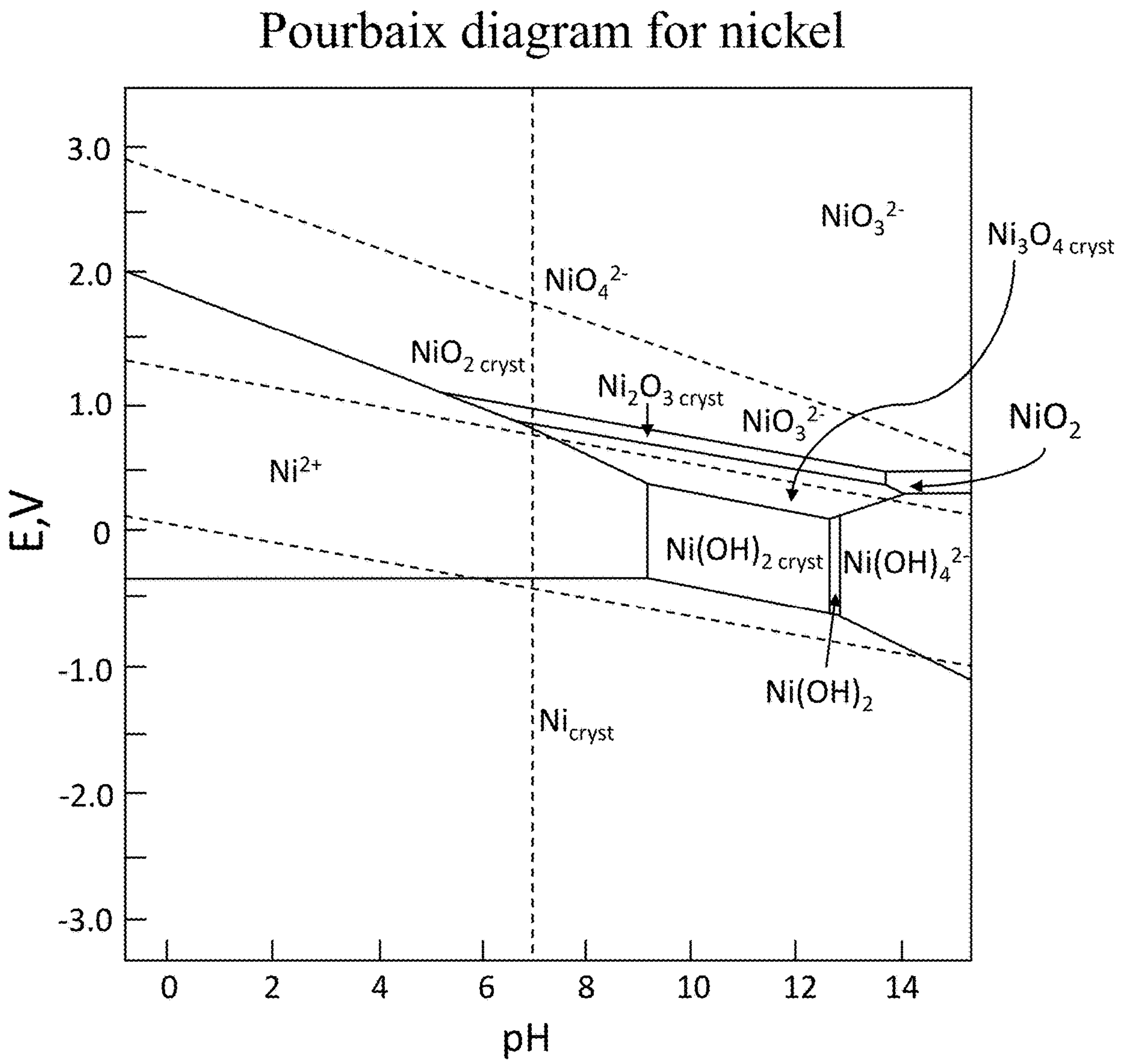
FIG. 18. Pourbaix diagram for Ni. (Ciesielczyk, F., Bartczak, P., Wieszczycka, K., Siwinska-Stefanska, K., Nowacka, M., and Jesionowski, T. (2013). Adsorption of Ni(II) from model solutions using co-precipitated inorganic oxides. Adsorption. 19, 423-434.)
Figure 19:
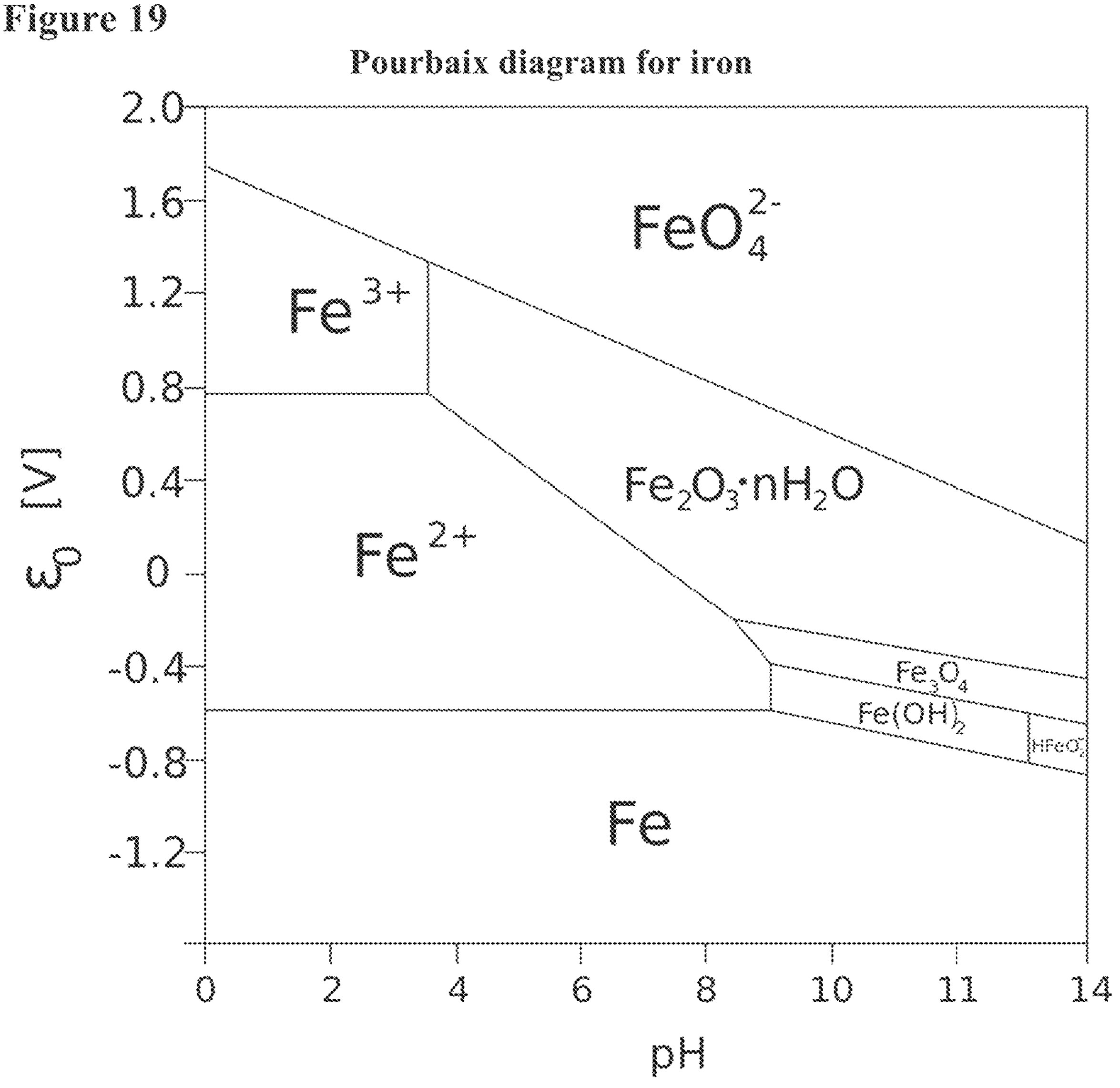
FIG. 19. Pourbaix diagram for Fe. (commons.wikimedia.org/wiki/File:Pourbaix_Diagram_of_Iron.svg)
Figure 20:
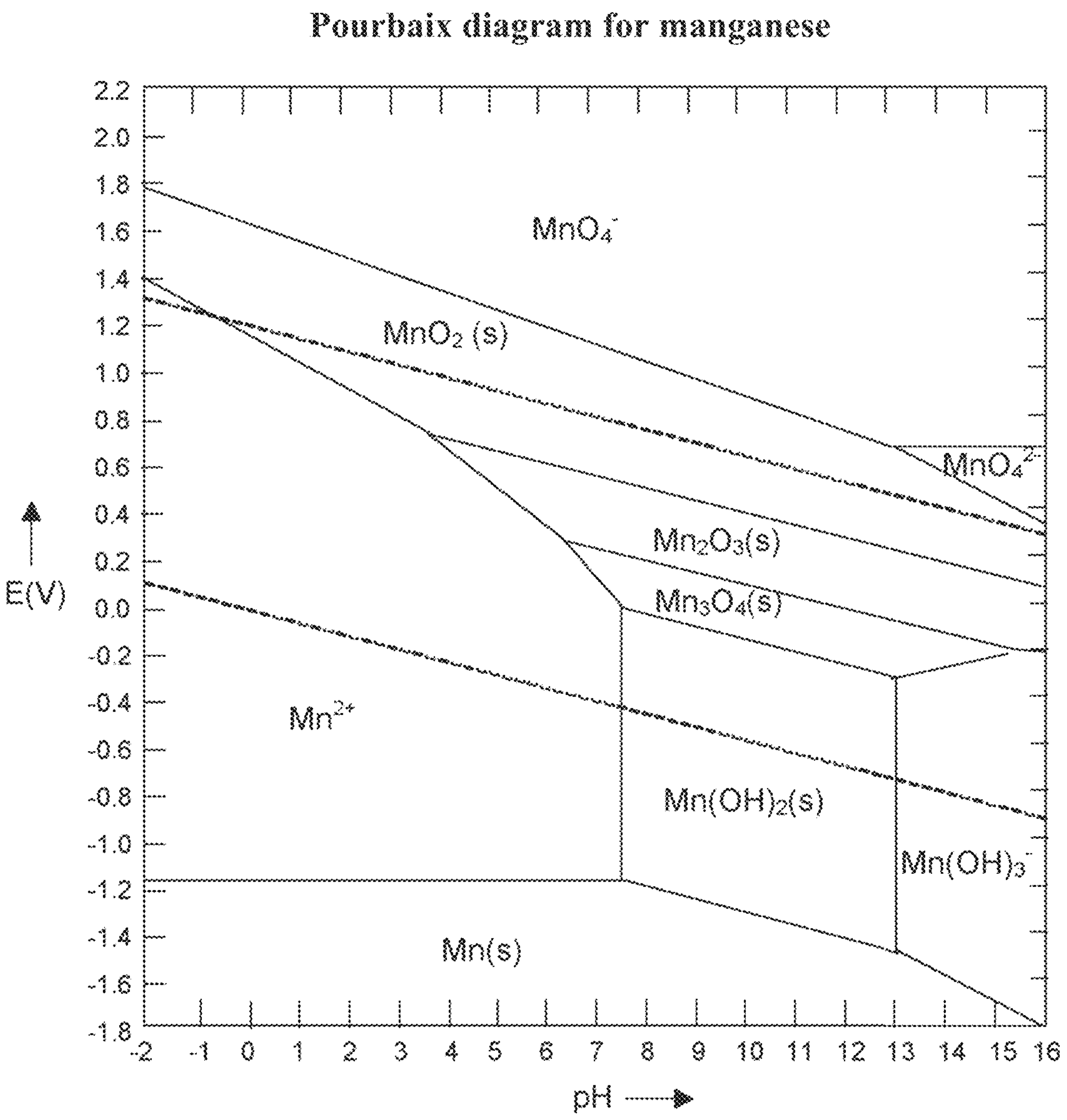
FIG. 20. Pourbaix diagram for Mn. (commons.wikimedia.org/wiki/File:Mn_pourbaix_diagram.png)
Figure 21:
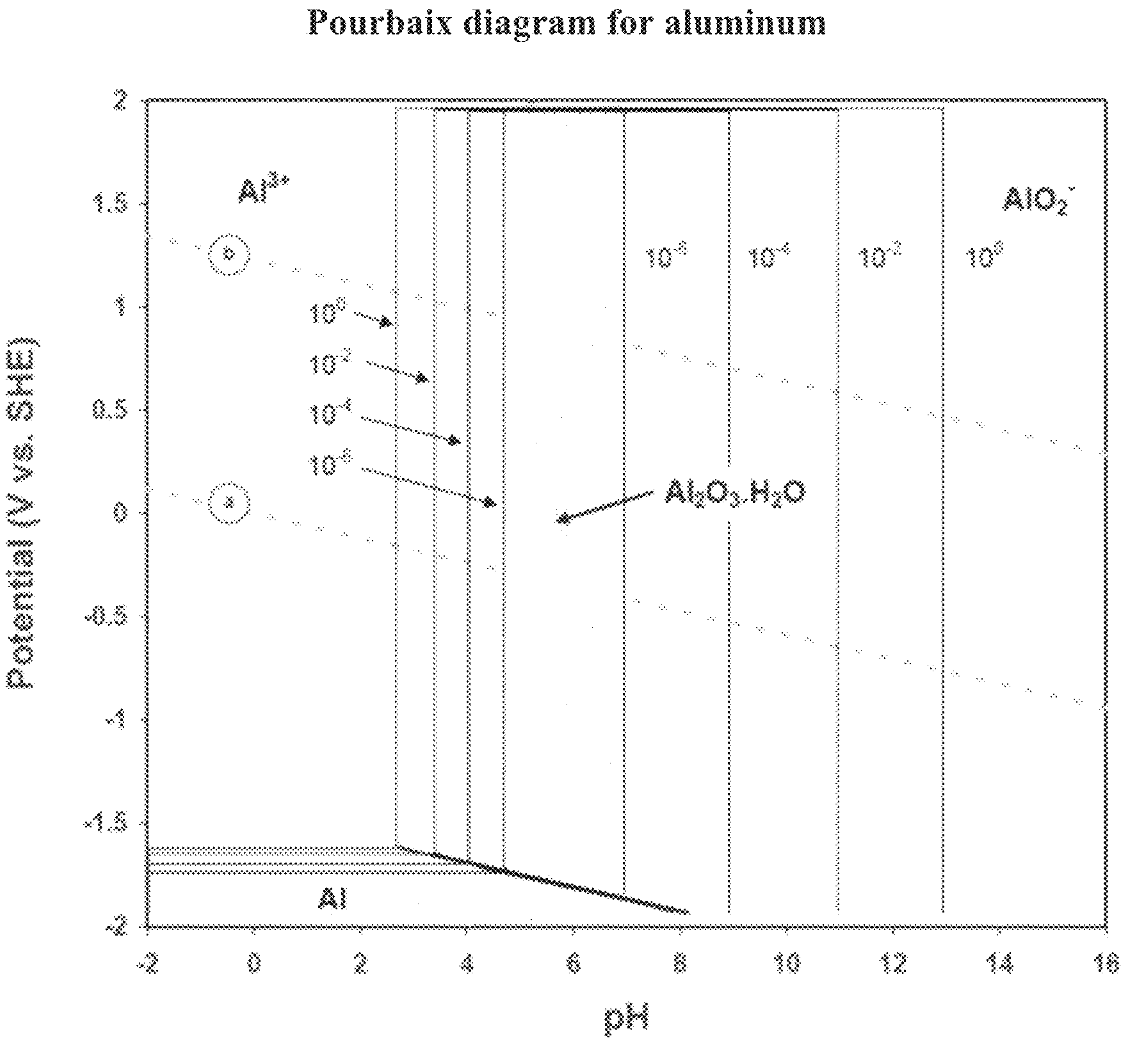
FIG. 21. Pourbaix diagram for Al. (corrosion-doctors.org/Corrosion-Thermodynamics/Potential-pH-diagram-aluminum.htm)
Figure 22:
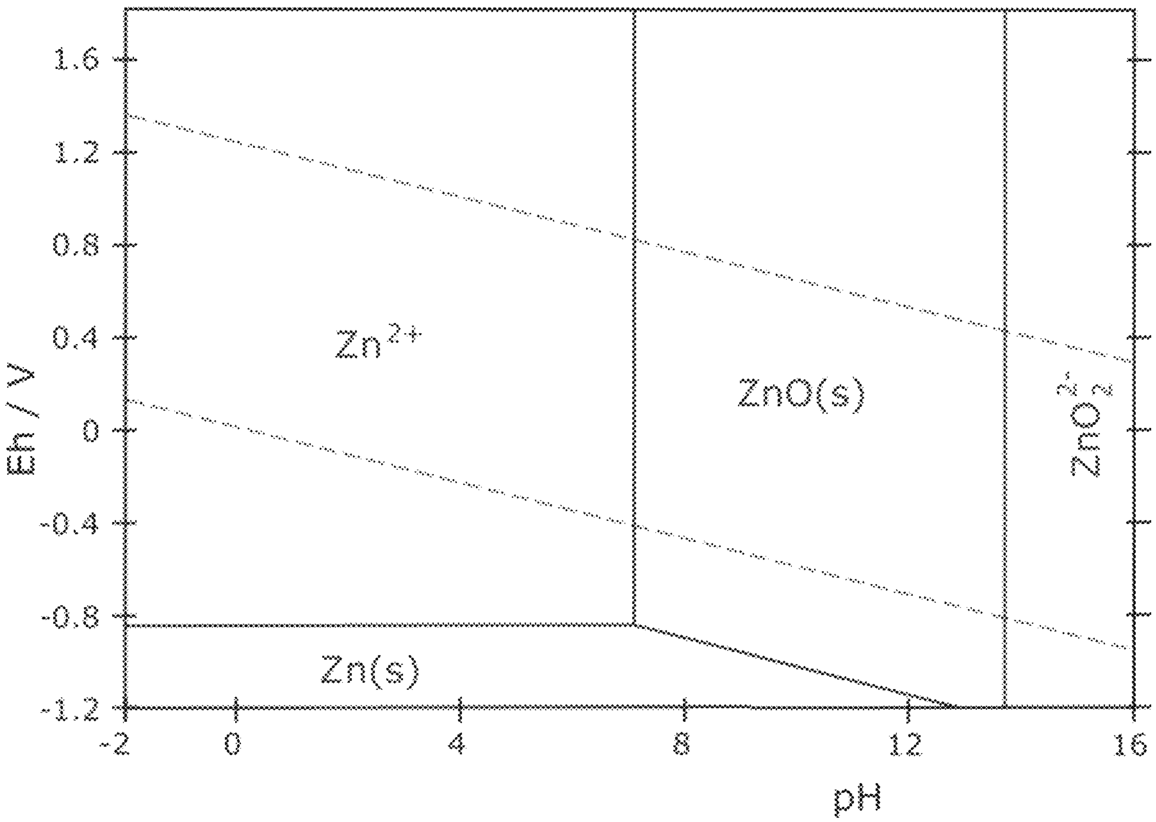
FIG. 22. Pourbaix diagram for Zn. (commons.wikimedia.org/wiki/File:Zn-pourbaix-diagram.svg)

Some species of a target species will adsorb by physical entrapment ("physical adsorption") on, or by electrical attraction ("capacitive adsorption") to, an electrode. Other species of a target species are starting materials for reactions (typically, oxidation) that create, directly or indirectly, new species of the target species that are immobilized on an electrode. Immobilization removes the target species from the solution. At a given spacing between the electrodes and matched carbon electrode materials properties, the potential applied to the anode and cathode are selected, based on the Pourbaix diagram of the target species in the input stream. Examples of FPC Parameters for various target species are shown in Table 1. For example, to remove copper, immobilization by plating on an electrode can occur at potentials ranging from ~0.3 V to −0.4 V vs. NHE for pH regions from 0 to 14. In addition, precipitation can occur in the form of copper hydroxide ($Cu(OH)_2$) at the anode at potentials above 0 V vs. NHE and pH values higher than 4 (see FIG. 17). Total cell potentials of approximately 0.4 V are desired for the removal of copper in a faradic porosity cell.

TABLE 1

FPC parameters for various target species

| Target Species | Anode Voltage Range (V) | Cathode Voltage Range (V) | Preferred Anode $E_{PZC}$ Range (V) | Preferred Cathode $E_{PZC}$ Range (V) | PMD Range (nm) | Preferred Operating Voltage (V) | Pourbaix Reference |
|---|---|---|---|---|---|---|---|
| Mn | 0-1.2 | <−1.1 | −0.1-1.0 | −1.0-0.1 | 0-50 | 1.2 | https://commons.wikimedia.org/wiki/File:Mn_pourbaix_diagram.png |
| Fe | 0-1.2 | <−0.5 | −0.1-1.0 | −1.0-0.1 | 0-50 | 0.4-1.2 | https://commons.wikimedia.org/wiki/File:Pourbaix_Diagram_of_Iron.svg |
| Co | >0 | <−0.5 | −0.1-1.0 | −1.0-0.1 | 0-50 | \ | Garcia, E.M, Santos J.S., Pereira, E.C., and Freitas, M.B.J.G. (2008). Electrodeposition of cobalt from spent Li-ion battery cathodes by the electrochemistry quartz crystal microbalance technique. J. Power Sources, 185(1), 549-553. |

TABLE 1-continued

FPC parameters for various target species

| Target Species | Anode Voltage Range (V) | Cathode Voltage Range (V) | Preferred Anode $E_{PZC}$ Range (V) | Preferred Cathode $E_{PZC}$ Range (V) | PMD Range (nm) | Preferred Operating Voltage (V) | Pourbaix Reference |
|---|---|---|---|---|---|---|---|
| Ni | 0-1.0 | <−0.4 | −0.1-1.0 | −1.0-0.1 | 0-50 | 1.2 | Ciesielczyk, F., Barczak, P., Wieszczycka, K., Siwinska-Stefanska, K., Nowacka, M., and Jesionowski, T. (2013), Adsorption of Ni(II) from model soultions using co-precipitated inorganic oides. Adsorption, 19, 423-434.) |
| Cu | >0 | <0 | −0.1-1.0 | −1.0-0.1 | 0-50 | 0.8-1.2 | https://commons.wikimedia.org/wiki/File:Cu_pourbaix_diagram.svg |
| Zn | >0 | <−0.8 | −0.1-1.0 | −1.0-0.1 | 0-50 | 0.8-1.2 | https://commons.wikimedia.org/wiki/File:Zn_pourbaix_diagram.svg |
| Al | >0 | <−1.3 | −0.1-1.0 | −1.0-0.1 | 0-50 | 0.4 | https://corrosion-doctors.org/Corrosion-Thermodynamics/Potential-pH-diagram-aluminum.htm |
| Pb | >0.5 | <−0.4 | −0.1-1.0 | −1.0-0.1 | 0-50 | 1.2 | Schock, M. R., Hyland, R. N., and Welch, M. M. (2008). Occurence of containment accumlation in lead pipe scales from ddomestic drinking-water distribution systems. Environ. Sci. Technol. 42(12), 4285-4291. |
| Pd | >0 | <0 | −0.1-1.0 | −1.0-0.1 | 0-50 | \ | Pourbaix M.J., Van Muylder, J., and de Zoubev N. (1959) Electrochemical properties of the platinim mtals. platinum Metals. Rev. 3(3), 100-106. |
| Ag | >0 | <0 | −0.1-1.0 | −1.0-0.1 | 0-50 | \ | Kortenaar, M.V.,de Goeij, J.J.M,Kolar, Z.I., Frens, G., Lusse, P.J., Zuiddam. M.R., and van der Drift, E. (2001). Electroless silver deposition in 100 nm silicon structures. J. Electrochem. Soc. 148(1), C28-C33. |
| Ir | >0.4 | <0 | −0.1-1.0 | −1.0-0.1 | 0-50 | \ | https://www.gamry.com/resources/electrochemical-calculators-tools/convert-potentials-to-another-reference-electrode/ |
| Pt | >0 | <0 | −0.1-1.0 | −1.0-0.1 | 0-50 | \ | Pourbaix M.J.N., Van Muylder, J., and de Zoubev N. (1959) Electrochemical properties of the platinum metals. Platinum Metals. A new approach to studies of corrosion resistance and cathodic protection Rev. 3(2), 47-53. |
| Au | >0.8 | <0 | −0.1-1.0 | −1.0-0.1 | 0-50 | \ | https://www.doitpoms.ac.uk/tlplib/pourbaix/pourbaix_example.php |
| Hg | >0.3 | <0 | −0.1-1.0 | −1.0-0.1 | 0-50 | \ | https://commons.wikimedia.org/wiki/File:Pourbaix-hg.png |
| Free Cl | <1.5 | <−1.0 | −0.1-1.0 | −1.0-0.1 | 0-50 | 1-3 | Debiemme-Chouvy, Catherine & Hua, Y & Hui, F & Duval, Jean-Luc & Cachet, H. (2014). Corrigendum to "Electrochemical treatments using tin oxide anode to prevent biofouling" [Electrochimica Acta. 56/28 (2011) 10364-10370]. Electrochimica Acta. 121. 461. 10.1016/j.electacta.2014.01.130 |
| Free Br | <1.2 | <−1.0 | −0.1-1.0 | −1.0-0.1 | 0-50 | \ | Ibid |
| Chroamine | <1.4 | <−1.0 | −0.1-1.0 | −1.0-0.1 | 0-50 | 1-3 | www.sedimentaryores.net/Pipe%20Sales/Chlorine-chloramine.html |

Figure 16:
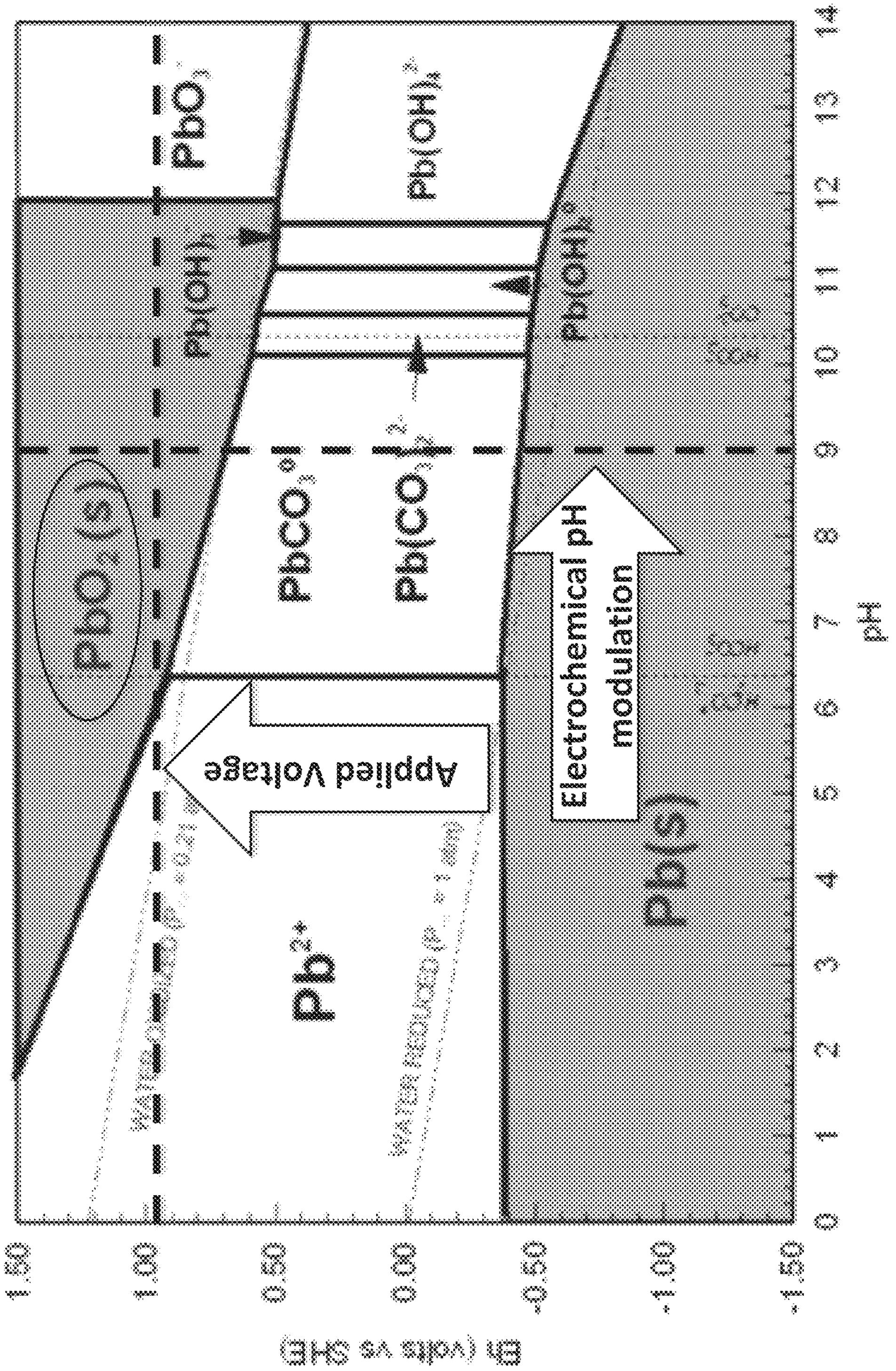
FIG. 16. Pourbaix diagram for Pb. (Schock, M. R., Hyland, R. N., and Welch, M. M. (2008). Occurrence of contaminant accumulation in lead pipe scales from domestic drinking-water distribution systems. Environ. Sci. Technol. 42(12), 4285-4291)

Other target species can be removed under similar mechanisms but under different voltage regions. For example, lead precipitation can occur from the pH and potentials that are generated on the electrode surfaces. At potentials more negative than ~−0.4 V vs. NHE and pH regions from 0 to 14, lead can be plated as a solid at the cathode. Precipitation at the anode can also occur as $PbO_2$ if the pH is kept >1.5 and potentials >0.5 V vs. NHE are used (FIG. 16). Finally, oxidation from $H_2O_2$ generated at the cathode can also result in precipitation of target species. The rate of reduction of dissolved oxygen ("DO") near the cathode depends upon the oxidation of the cathode carbon, e.g., by oxidative shifting of the cathode $E_{PZC}$, or as a result of use in situ.

Figure 1:
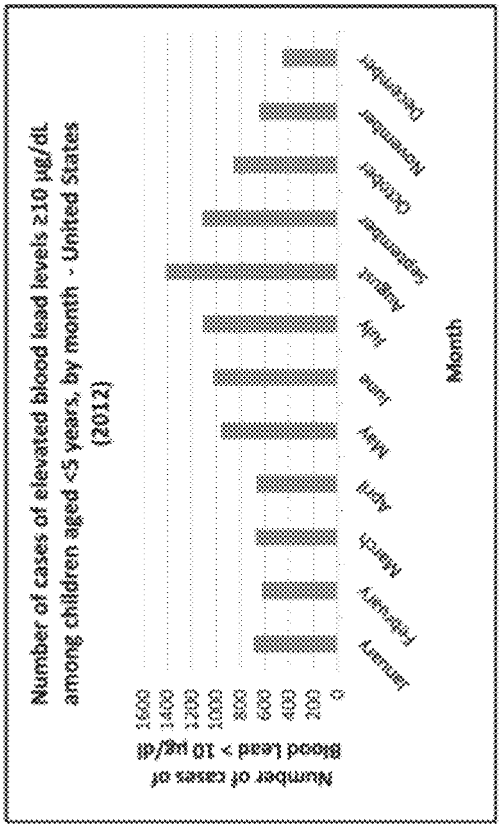
FIG. 1. A map the National Resources Defense Council produced of counties with water systems in violation of the EPA's Lead and Copper Rule (left), and number of cases of children with elevated blood lead levels in 2012 (right).
Figure 1:
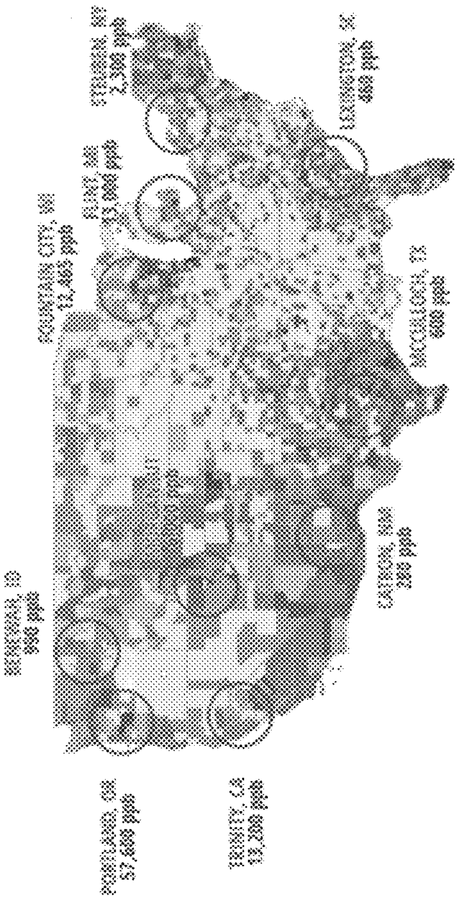
Figure 2:
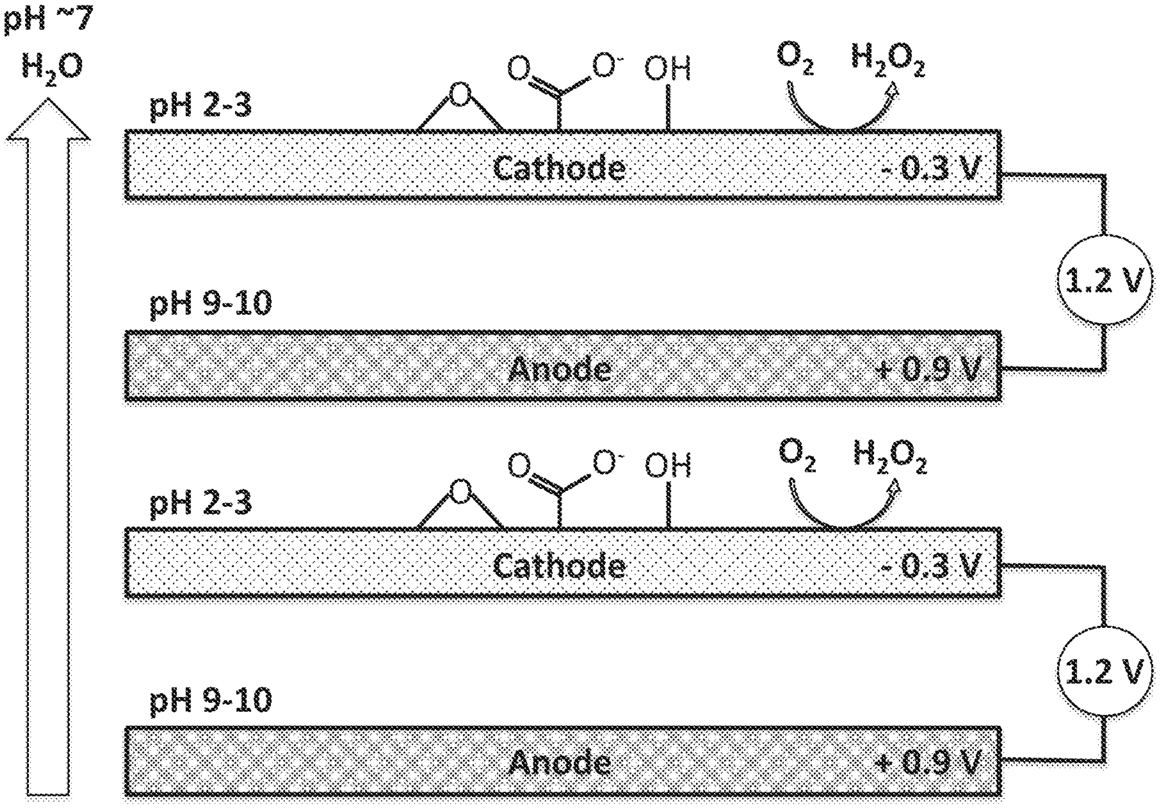
FIG. 2. Schematic of part of a CCC core. The schematic shows 2 pairs (anode and cathode per pair) of electrodes in a CCC core. A CCC typically has more than 10 pairs of electrodes.

Using the Pourbaix diagram for a material can define the pH and voltage needed in a faradic porosity cell to remove target species of interest. A faradic porosity cell comprises a series of porous carbon anodes and cathodes, typically consisting of reduced cathodes (negative $E_{PZC}$ and positive surface charge) and pristine anodes (although anodes experience a positive $E_{PZC}$ shift ((negative surface charge)) during use), and operated by applying a small voltage, e.g., 1.2 V, across the electrodes. A schematic of an CCC embodiment of an FPC is shown in FIG. 2. An aqueous input stream to be purified is introduced into an FPC through an inlet to the cell; the electrodes in an FPC are immersed in the aqueous stream and a target species is removed from the through stream. After removal of a target species in an FPC, the through stream is discharged from the cell through an outlet for use, storage, or further processing. The electrodes of the cell are connected to a power supply that can apply E+ or E− to a given electrode. A core inventive step of an FPC is the precise matching of E+ applied to the cell anodes and E− to cell cathodes, pore mouth diameter profile of the electrode material, and selected Pourbaix operating region, thereby improving purification efficiency and improving cost/benefit. A Pourbaix diagram operating region shows speciation based on applied E and pH. In an FPC, speciation is driven by the potentials, E+ and E−, applied to the electrodes. Maintaining FPC operation in the selected Pourbaix operating region, with optimized pore mouth distribution ("PMD") profile electrodes, increases removal of the target species far beyond conventional adsorption that occurs on untreated electrodes.

A preferred average pore mouth diameter is in the range of 0.8 nm to 50 nm, and a more preferred average pore mouth diameter range is 2 nm to 20 nm. The applied potential causes redox reactions of the target species (e.g., plating, oxidation, reduction, peroxidation, etc.), and drives faradic reactions on the carbon electrodes that will change the local pH regions at the anode (acidic) and cathode (basic). The combination of reactions of the target species and the change in pH is controlled by the applied potential. Applied E is typically at constant voltage and will reach a nearly constant current at steady state. Generally speaking, the applied voltage dictates which faradic reactions will occur within an FPC. An FPC will remove target species from a through stream without using treated (i.e., shifted $E_{PZC}$) electrodes, but target species removal may be greater in certain water chemistries when using treated electrodes. If treated electrodes are used, the working voltage window (the potential difference between anode $E_{PZC}$ and cathode $E_{PZC}$) is typically in the range if 0.3 V to 1.23 V.

The FPC invention combines adsorption (physical and capacitive) of target species (e.g., lead, iron, manganese, cadmium, chromium, chlorine, chloramine, etc.) and immobilization (aka coagulation) of the adsorbed target species by optimizing electrode porosity, applied E, and Pourbaix operating region. The optimization of (i) physical adsorption; (ii) capacitive adsorption; (iii) electrochemical pH modulation & target species immobilization; (iv) electrochemical peroxide ($H_2O_2$) generation; (v) electrodeposition (e.g., electroplating, electrophoretic deposition); (vi) electrochemical oxidation or reduction; (vii) precipitation; (viii) pore mouth diameter profile; (ix) electrode treatment, (x) electrode spacing, and (xi) flow-by vs. flow-through vs. carbon block cell design, depends upon target species, input stream water chemistry, and through stream water chemistry.

Reduction only occurs at the cathode of an FPC. Electrochemical reduction is usually described as an applied potential to the cell. The voltage distribution between anode and cathode occurs spontaneously based on the amount of applied voltage, the material properties of the electrodes, and the chemistry of the aqueous solution.

One embodiment of the invention is a capacitive coagulation system and method that uses one or more capacitive coagulation cells that remove metal ions or particulate metal for which a Pourbaix diagram exists, e.g. As, Se, Pb, Ni, Zn, Al, Sc, Ti, V, Cr, Mn, Fe, Co, Ni, Cu, Y, Zr, Nb, Mo, Tc, Ru, Rh, Pd, Ag, Cd, La, Hf, Ta, W, Re, Os, Ir, Pt, Au, Hg, Ce, Pr, Nd, Pm, Sm, Eu, Gd, Tb, Dy, Ho, Er, Tm, Yb, and Lu, from an input stream by one or more of the following methods, each of which is a CCC Parameter: (i) physical adsorption; (ii) capacitive adsorption; (iii) electrochemical pH modulation & metal immobilization; (iv) electrochemical peroxide ($H_2O_2$) generation & metal oxidation; (v) electrodeposition (e.g., electroplating, electrophoretic deposition); (vi) electrochemical oxidation or reduction; (vii) precipitation; (viii) pore mouth diameter profile; (ix) electrode treatment, (x) electrode spacing, and (xi) flow-by vs. flow-through vs. carbon block cell design. A CCC can remove lead from water to produce water with lead concentrations below the EPA action level of 15 ppb for potable or irrigation water.

Compared to prior art devices, Applicant's CCC has higher specificity for lead and other metals, removes both dissolved and particulate lead and other metals, has a device lifetime that can be measured in years rather than days or weeks, and uses low cost materials. Applicant's CCC achieves its longevity and efficiency by combining electrochemistry and carbon materials to provide a system that is not saturated, fouled, or inhibited by other constituents in the water such as iron, volatile organic compounds (VOCs), particulates, and natural organic matter (NOM). Applicant's device lifetime is multi-fold longer than the prior art technologies of carbon filtration, ion-exchange filtration, zeolite adsorbents, and reverse osmosis (RO).

Figure 13:
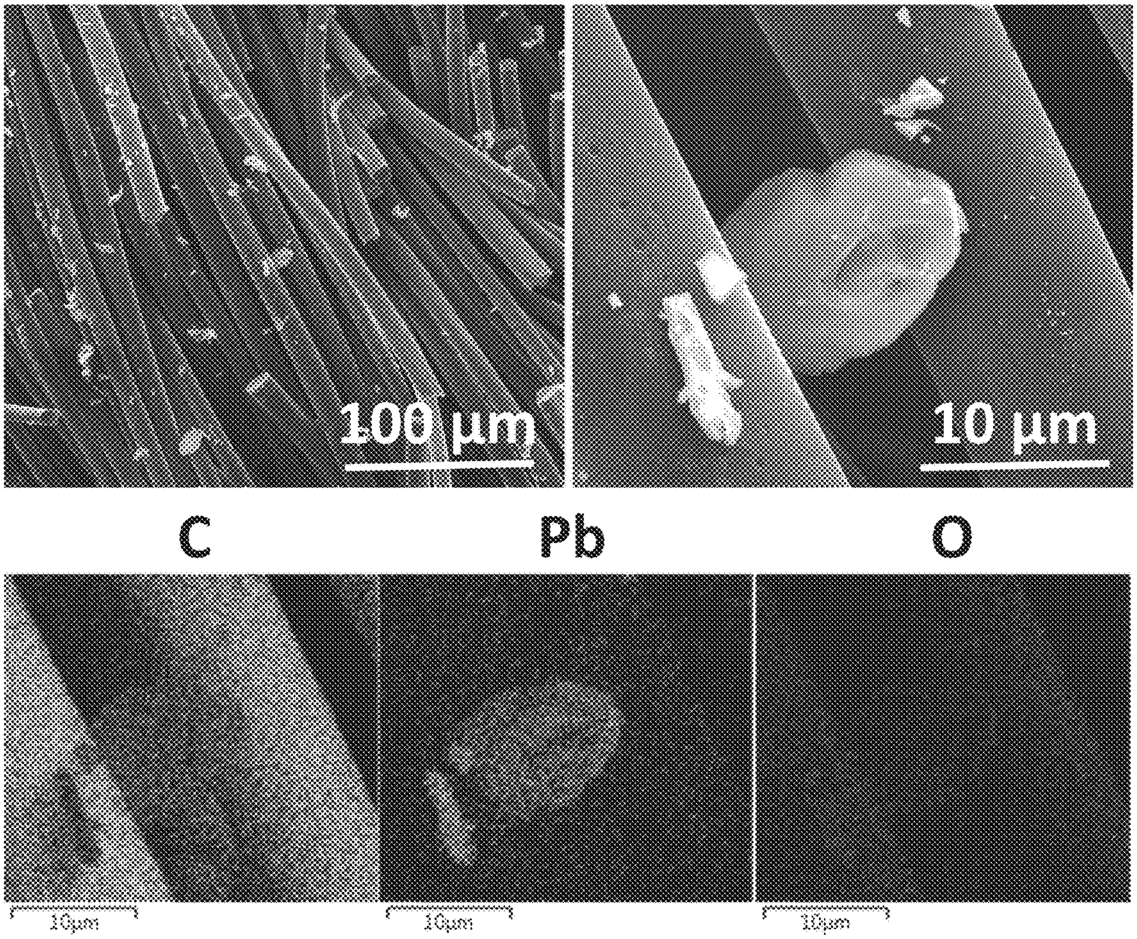
FIG. 13. SEM micrographs and EDX mapping showing the end fate of immobilized lead species. Carbon (C), lead (Pb), and oxygen (O) are mapped in the three panels below, represented by the lightest contrast in each corresponding gray scale image. The carbon electrodes are shown as black and the copper as gray in the grayscale equivalent of the photo. Color photograph of EDX mapping is available.

Combining in a CCC an optimized PMD, applied E, chemical manipulations, and electrochemical manipulations facilitates immobilization (coagulation) of lead onto the carbon electrodes. The adsorbed lead is permanently removed from solution (FIG. 13). This methodology is easily adaptable and applicable to the treatment of iron, manganese, cadmium, chromium, and other metals and metal derivatives. "Tuning" a CCC primarily means selecting (i) a voltage applied between CCC anodes and cathodes based on (ii) analyzing and selecting an operating region in the target species' Pourbaix diagram, and (iii) selecting a pore mouth diameter profile of the CCC carbon electrodes that maximizes removal of a target species. The effluent from an CCC can be used without further processing or can be routed to one or more EDCs, CCCs, or prior art water purification cells for further removal of other target species. Tuning can optionally be further optimized through electrode treatment.

Metal speciation and chemistries can be exploited to selectively remove lead (and other target metals) from water with high efficacy and selectivity, regardless of water chemistry. Through this operation, Applicant's CCC (i) can electrochemically, chemically, and physically remove lead and other target species from drinking water sources, eliminating the need for multiple separation techniques that are currently necessary and driven by varying input stream conditions and pH, and (ii) solves the technical problem of providing a more efficient, less expensive, scalable device for purifying drinking water and process water, especially a device that removes soluble and insoluble lead to below 15 ppb. Adjustment of pH of an input stream may be necessary to improve agglutination of a target species, especially for removal of metals.

In an EDC embodiment of the FPC technology, the EDC Parameters are "tuned" to remove other non-metal target species, e.g., chlorine, chloramines, and other halides and halide derivatives, from the EDC influent. "Tuning" an EDC primarily means selecting (i) a voltage applied between EDC anodes and cathodes based on (ii) analyzing and selecting an operating region in the target species' Pourbaix diagram, and (iii) selecting a pore mouth diameter profile of the EDC carbon electrodes that maximizes removal of a target species. The effluent from an EDC can be used without further processing or can be routed to one or more EDCs, CCCs, or prior art water purification cells for further removal of other target species. Tuning can optionally be further optimized through electrode treatment. Device features and benefits are listed below and in Table 2 and Table 3 in the Drawings.

TABLE 2

Detailed benefits of PTW EDC for chlorine removal

| Parameter | Prior Art | PTW EDC |
|---|---|---|
| Capacity (gallons) | 1000 | 100,000 |
| Free Cl Removal | >99% | >99% |
| Residence Time (seconds) | 80 | 10-15 |
| Operating Cost ($/1000 gallons) | $20-$50 | $ 0.1 |
| Carbon Mass (g) | 200+ | 30 |
| Footprint (sq ft) | 0.133 | 0.130 |

TABLE 3

Detailed benefits of PTW EDC for chloramine removal

| Parameter | Prior Art | PTW EDC |
|---|---|---|
| Capacity (gallons) | 100 | >3000 |
| Chloramine Removal | 75-90% | up to 99% |
| Residence Time (seconds) | 80 | 10-15 |
| Operating Cost ($/1000 gallons) | $200-$500 | $30 |
| Carbon Mass (g) | 200+ | 30 |
| Footprint (sq ft) | 0.133 | 0.130 |

An EDC or CCC optionally uses treated anodes and cathodes made of carbon in which the one or both electrodes' Epzc has been shifted compared to a pristine electrode Epzc. Shifting the Epzc of an electrode can change the kinetics of reactions occurring (either positively or negatively). Whether to shift only anodes, or only cathodes, or both types of electrode, and how much Epzc shift to use, depends upon input water chemistry and the target species.

Carbon electrodes are superior to metal electrodes in avoiding or reducing electrolysis, or water splitting, when potentials as high as 3 V are applied to an electrode. An applied potential of more than 1.23 V ("overpotential") can cause electrolysis of water, which produces dangerous hydrogen gas. Metal electrodes can cause hydrogen gas production at <2 V; in contrast, carbon electrodes can sustain higher applied voltages while avoiding substantive water electrolysis.

The inventive steps of an EDC are: (i) decreased power consumption required for reduction of chlorine and chloramines (responsible for taste and odor) through specific carbon electrodes and applied voltage, (ii) can be used on-demand or as continuous treatment, (iii) very scalable, simple design that provides significantly lower cost POU/POE devices as well as lower cost municipal, commercial, and industrial large-scale systems, (iv) similar performance to traditional carbon blocks (such as activated carbon/activated charcoal) but with significantly less carbon needed, (v) similar removal performance of free chlorine with a much shorter residence time, (vi) the use of less carbon, (vii) longer electrode life, especially for the removal of chlorine and chloramine, (viii) finer control over specific removal amounts and output water quality, (ix) better control over balancing rate of target species removal vs. electrode life, and (x) FPC cost/benefit can be adjusted by choice of carbon for FPC electrodes.

DETAILED DESCRIPTION OF THE PREFERRED EMBODIMENTS

During capacitive charging processes, a constant current or voltage is used to charge electrode surfaces for the purposes of energy storage, desalination, or other useful capacitive techniques. Charging and subsequent discharging of electrodes is often carried out for thousands of cycles over a range of voltages and currents, depending on the intended application. Carbon electrodes made of activated carbon are often employed for these capacitive-based charging and discharging processes due to (i) their high specific surface area and resulting high capacitance, and (ii) opportunities to add functional groups to effect surface modifications that improve, inter alia, metal and other target species removal, energy storage and deionization (e.g., desalination of seawater or brackish water). Activated carbon is a form of carbon processed to have numerous small, low-volume pores that increase the surface area available for adsorption or chemical reactions. An FPC can be used to purify wastewater, cooling water, laundry wastewater, water to be purified for human consumption, water to be purified for agriculture, water to be purified for horticulture, water to be purified for use in food, water to be softened, sea water to be purified for human consumption, water to be purified for laboratory use, brackish water to be purified for human consumption or agriculture use, and water to be purified for medical use.

The distribution of pore sizes in a carbon electrode is a critical FPC Parameter that has been overlooked in the prior art of water purification.

Figure 9:
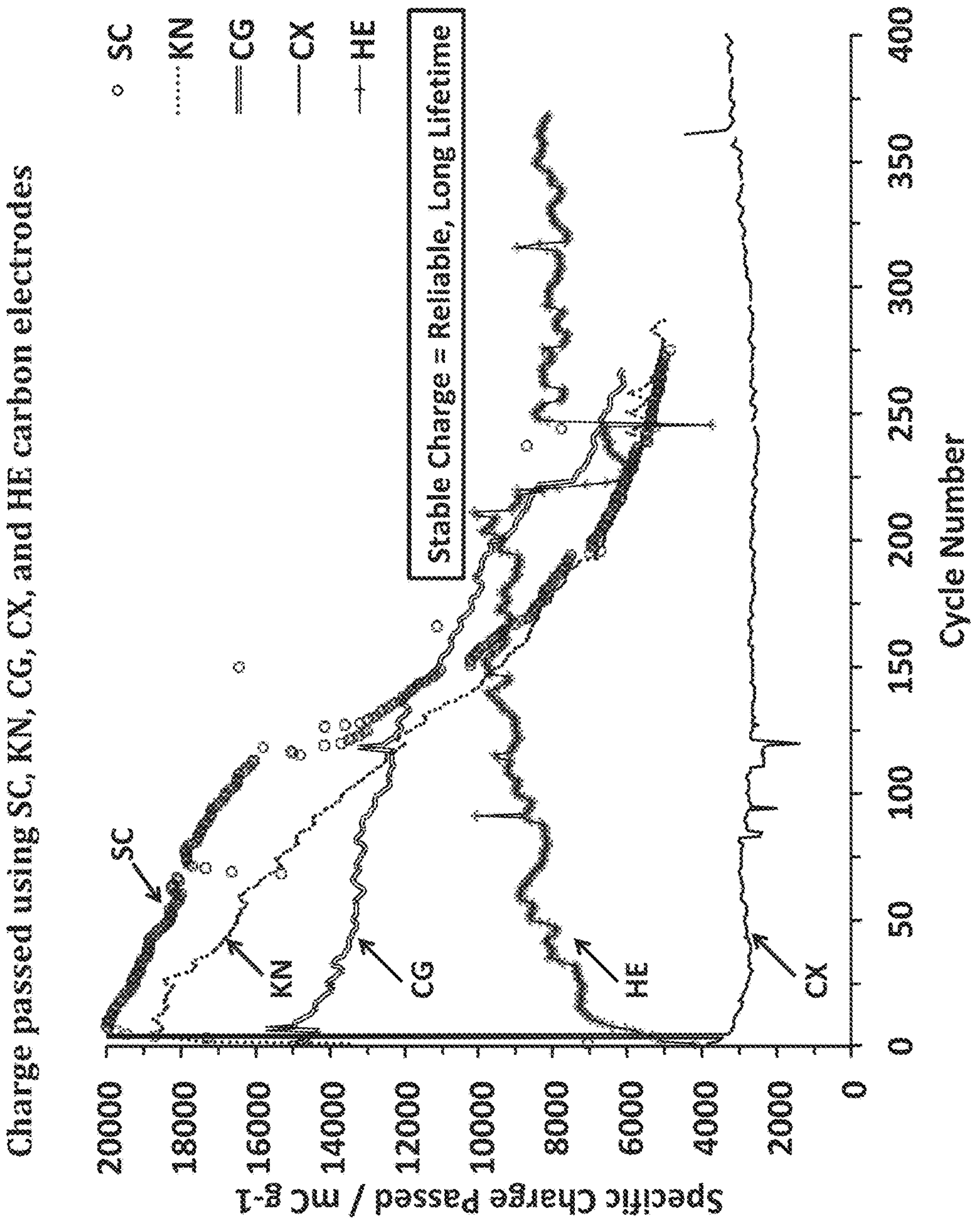
FIG. 9. Charge passed with commercially available microporous carbon [Spectracarb (SC) and Kynol (KN)], a predominately mesoporous carbon [Calgon (CG)], a mesoporous carbon [Carbon Xerogel (CX)], and the inventor's high-efficiency (HE) carbon electrodes, while cycling between applied and short-circuited voltages. The order of the carbon types in the legend is also the order of the starting specific charge passed (y-axis) traces, except CX has a lower y-axis value than HE.

Electrode properties are shown in Table 4; the electrode suppliers are recited in the first column of Table 4. The pore size, or pore mouth diameter ("PMD"), is extremely important in terms of maintaining charge passed and is directly related to the lifetime of the EDC electrodes. PMD is customarily used as representative of the diameter of the associated pore channel within a carbon electrode. FIG. 9 demonstrates the effect of PMD on stability of charge passed. A pore channel (and even the pore mouth) may "collapse" (more accurately, the pore becomes occluded) after repeated cycles of application of a voltage or potential followed by reverse voltage or potential (or short circuiting or open circuiting of anode(s) and cathode(s)). The pore mouth becomes "roofed" and/or the pore channel becomes "closed", decreasing the surface area of the carbon (esp., the pore channel diameter and length) so that the pore no longer functions effectively. A "roofed" pore mouth blocks access to the interior of the pore. Pore mouth roofing and pore channel collapse cause a decrease in electrode performance and eventual failure of prior art cells.

TABLE 4

Carbon electrode properties

| Carbon | Conductivity (S/cm) | PMD (nm) | Surface Area ($m^2/g$) |
|---|---|---|---|
| Calgon | 0.2 | 1.2-3 | 1000-2000 |
| Kynol | 1.2 | 2.2 | 2000 |
| Fuel Cell Earth | 900 | N/A | <2 |

In an FPC, a target species, if ionized, bearing an electrical charge, or bearing a partial charge due to the asymmetric distribution of electrons in chemical bonds, can be attracted to the carbon electrode due to the applied potential, which produces a driving force to move the target species close to (or in contact with) the carbon electrode. Non-ions and non-charged species of a target species can collide with an electrode surface. Once in contact with the electrode surface, numerous pathways to immobilization of the target species can occur. Local and large pH swings can be controlled to electrochemically produce an alkaline environment, which will produce, e.g., insoluble metal oxides, that precipitate near or on the electrodes and are entrapped in electrode pores. Faradic reactions, such as oxygen reduction reactions at the cathode, can produce hydrogen peroxide which can diffuse away from the electrode and oxidize target metal molecules that are within close proximity: hydrogen peroxide performs indiscriminate oxidation. When target species closer to the electrode are in a localized higher concentration, the statistical chance for hydrogen peroxide to oxidize the target species is greater. Other faradic reactions, such as direct electron transfer (reduction or oxidation) between the target species and electrode can also occur. Once the target species has been attracted to the electrode surface, the carbon electrode can (1) transfer an electron(s) from the electrode to the target species and reduce it so that it is deposited onto the electrode or (2) transfer an electron(s) from the target species to the carbon electrode and oxidize the target species into either an insoluble oxide or hydroxide, or into a more reactive species that can be immobilized through additional electron transfer reactions or pH adjustments. Precipitated species and electrically attracted species are entrapped in electrode pores.

The size and volume of actual pores in activated carbon depend upon the shape, tortuosity (which is usually associated with changes in pore diameter), and channel length of a given pore. Based on micrographs of activated charcoal, and depending on the activation and/or synthesis procedures, some pores in activated carbon can be tubular channels, polygonal channels, spheroid chambers, surface slits, etc. Channels and chambers can be "dead end" or "through" (i.e., a channel or chamber with two surface appearances, aka "pore mouths", with channel continuity between the two pore mouths). Pores in activated carbon are generalized as being tubular channels that have an average pore channel diameter (hereinafter "pore channel diameter") and an average pore mouth diameter. Measuring actual pore channel diameter of billions of pores that rarely have a constant pore channel diameter in a mass of activated carbon is a herculean task, and not reported here. As a generalization, the pore channel diameter is assumed to be identical to the pore mouth diameter.

The diameter of a pore mouth, i.e., the opening of a pore to electrolyte, has a major, and in small pore mouth diameters, predominant, impact on the utilization of that pore for adsorption and on multi-cycle performance in capacitive coagulation. A larger pore mouth diameter (and therefore, pore mouth surface area) will provide significant contact area between the pore channel and the electrolyte. A small pore mouth diameter will have more limited contact area (i.e., "pore mouth surface area"). Pore mouth diameters are defined by IUPAC as microporous, mesoporous, and macroporous with pore mouth diameters of <2 nm, 2-50 nm, and >50 nm, respectively. The lifetime of an adsorption medium has a direct correlation to the pore mouth diameter present on the surface of the material. The concept and ramifications of "pore mouth roofing", aka pore mouth closure, after repeated cycles of adsorption and desorption using an activated carbon electrode, is explained below. A pore mouth "roofs" or "closes", and a pore channel "collapses", after repeated polarity reversal cycles of an FPC so that the surface area of the pore no longer functions effectively in entrapment and adsorption of target species.

Applicant's device incorporating capacitive coagulation technology removed soluble (dissolved) and insoluble (particulate) lead species from tap water to well below the EPA action level in samples spiked with concentrations up to ~300 ppb lead. Efficient lead removal was even demonstrated with concentrations of lead as low 5 ppb in input streams, well below the action level. The prototype device achieved ≥90%, and frequently >99%, specificity for lead removal over other constituents commonly found in tap water, such as calcium ($Ca^{2+}$). Applicant's capacitive coagulation invention was able to achieve this performance in hard, alkaline water where lead species tend to form complexation species that are difficult to remove by commercial off-the-shelf products. A CCC is also unexpectedly capable of removing both soluble (dissolved) and insoluble (particulate) lead, arsenic, nickel, and copper species.

Applicant's capacitive coagulation invention provides in one embodiment for lead removal a POU/POE water purification device capable of meeting NSF/ANSI 53 and 61 certifications at a minimum flow rate of 1 gallon per minute (gpm) regardless of input water source conditions: hardness, pH, alkalinity, and types of disinfection. Additionally, the device is (i) highly specific for target metals, e.g., arsenic, lead, nickel, copper, cadmium, lead, manganese, mercury, and radioactive metals, (ii) more reliable, (iii) more efficient, and (iv) lasts longer than state-of-the-art solutions. Applicant's capacitive coagulation cells provide a more efficient, less expensive, and very scalable water purification device that removes soluble and insoluble lead to below 15 ppb and is suitable for residential as well as scale-up to higher-throughput systems. A detailed Example below focuses on lead removal using capacitive coagulation cells, but adjustment of CCC parameters permit "tuning" of a CCC to remove any other metal or metal derivative for which a Pourbaix diagram exists, such as arsenic, cadmium, manganese, and mercury, as well as Se, Ni, Zn, Al, Sc, Ti, V, Cr, Fe, Co, Ni, Cu, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Er, Tm, Yb, and Lu.

Figure 3:
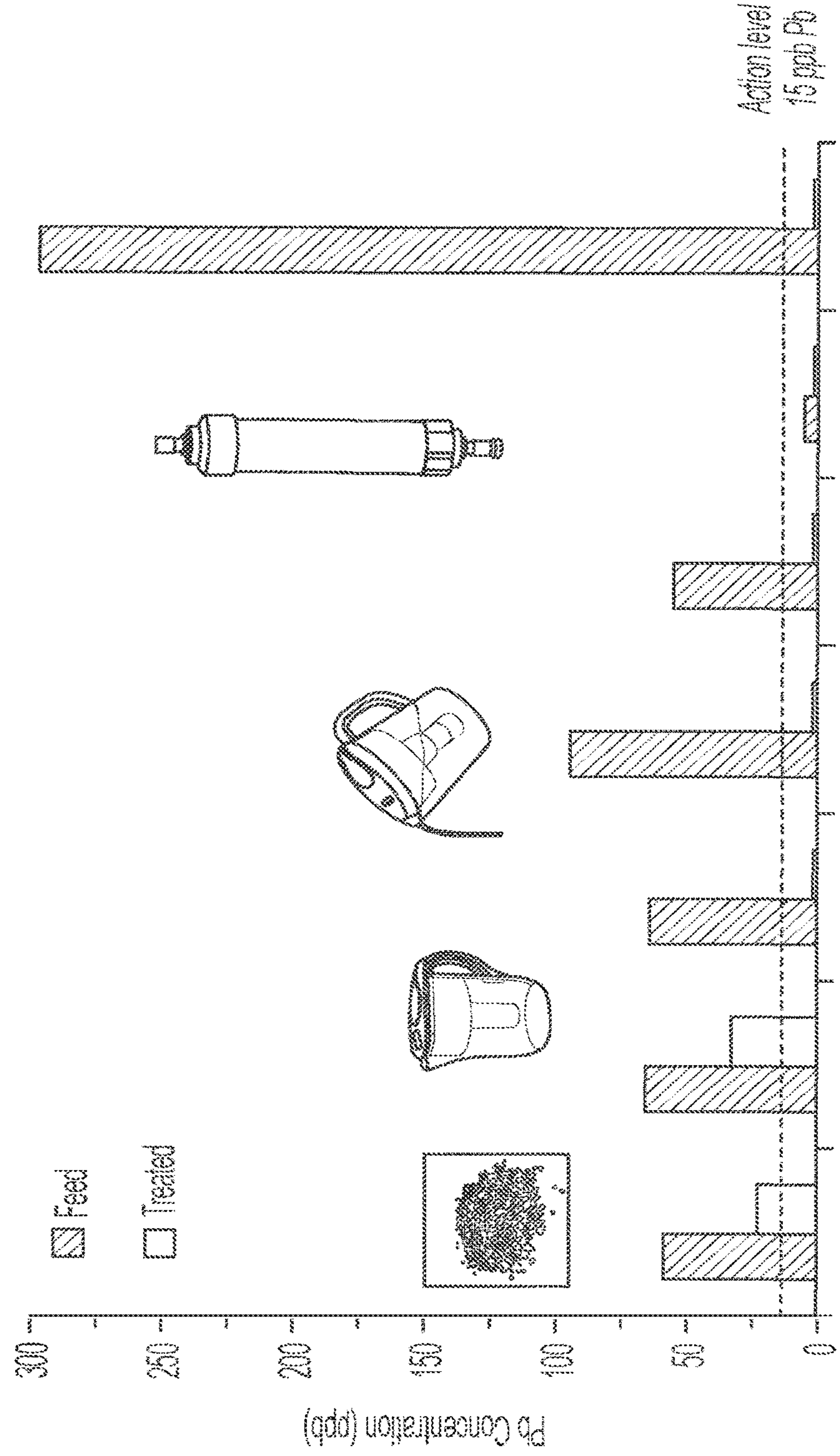
FIG. 3. Lead removal comparison of Applicant's CCC device to commercially available prior art POU devices. Applicant's CCC, denoted as "PTW" in FIG. 2, was tested with different municipal water chemistries that had lead content above the EPA action level. Applicant's CCC outperformed all prior art devices.

In a head-to-head comparison shown in FIG. 3, Applicant's CCC outperformed commercially available POU/POE water purification devices, such as the Brita® Longlast™ and Brita® PUR filters and the Calgon GAC filter material. The Brita® Longlast™ pitcher filter had drastically different performance when tested on two different days based on the change in water chemistry being supplied by the municipal water system in Lexington, Kentucky. This differing performance emphasizes the need for a more reliable device that performs well in varying water chemistries that occur from day-to-day. Applicant's invention outperformed the Brita® Longlast™ device in both instances.

Figure 4:
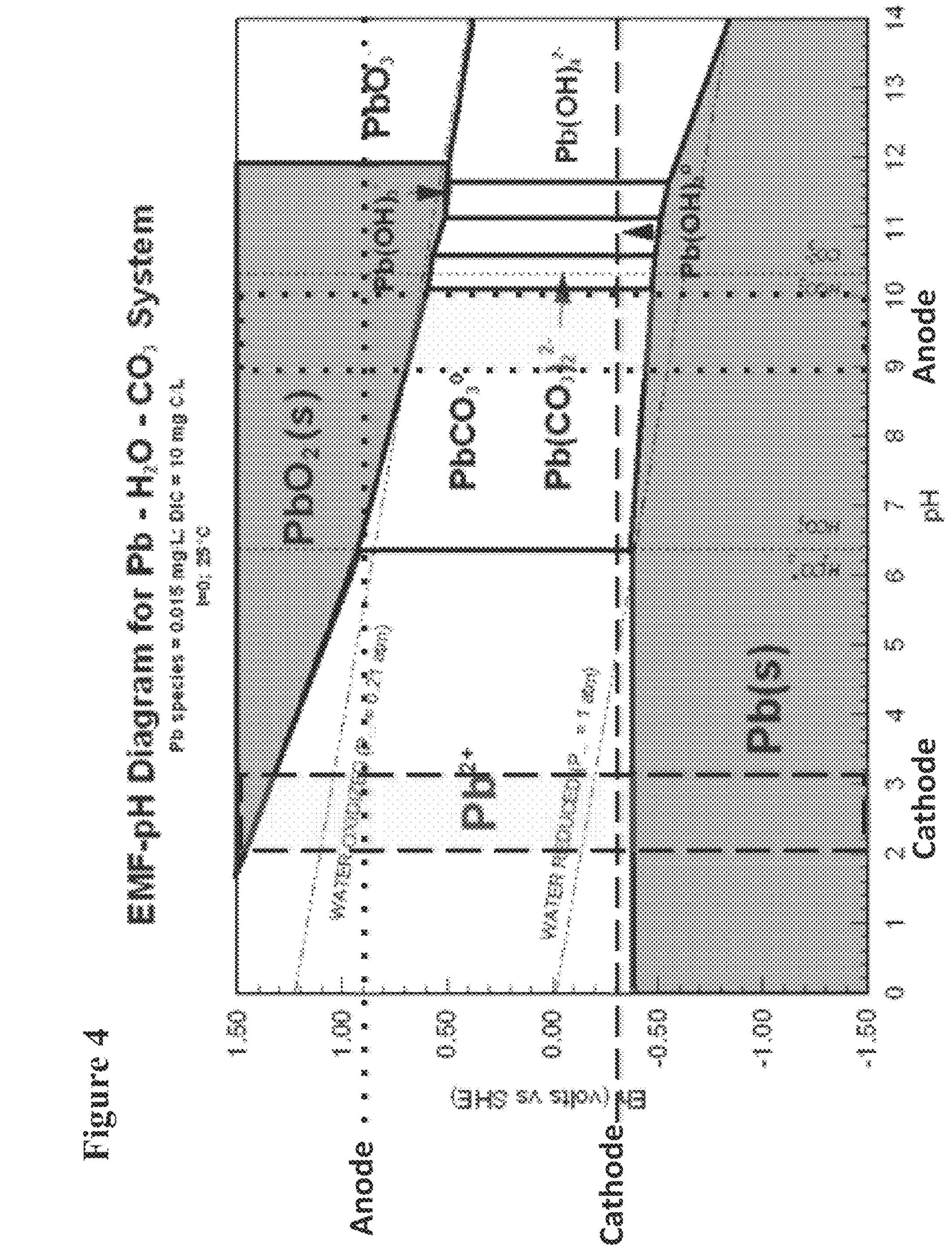
FIG. 4. Pourbaix diagram of lead (Pb) in a carbonate solution showing the Pourbaix operating regions for lead species removal at the intersection of E applied to anode and cathode and resultant pH near each electrode.

Soluble lead ions adsorb onto the carbon electrodes by physical and/or chemical adsorption, a process that is well documented (*J. Chem. Technol. Biotechnol.* 2002, 77, 458-464, Shekinah, P.; Kadirvelu, K.; Kanmani, P.; Senthilkumar, P.; Subburam, V. and Carbon. 2004, 42, 3057-3069, Swiatkowski, A.; Pakula, M.; Biniak, S.; Walczyk, M.), and undergo additional electro-adsorption onto the cathode under an applied potential. Modulation of the pH can also be exploited to control lead speciation in tap water. At an operating voltage of 1.2 V (as shown in FIG. 4), the potential distribution across the device yields +0.9 V at the anode and −0.3 V at the cathode, and the pH fluctuates between the electrodes, producing a near neutral pH in the bulk. However, while the bulk pH remains relatively constant, there are significant pH swings (aka "plugs") from as acidic as pH 2 and as alkaline as pH 10, which impart significant changes in acid/base chemistry on an electrode surface. Relating the voltage and pH at each electrode to a Pourbaix diagram, operating conditions can be selected to obtain the desired lead speciation in a given water chemistry (FIG. 4, where DIC is dissolved inorganic carbon). A similar approach to manipulating pH was utilized to remove boric acid using capacitive deionization (CDI). Electrochimica Acta. 2011, 56, 248-54, Avraham, E.; Noked, M.; Soffer, A.; Aurbach, D. For most residential and commercial uses, input stream pressure is less than 60 psi, and the porosity of the electrodes typically avoids more than a 20 psi drop at an FPC outlet compared to inlet pressure.

Multiple mechanisms of action occur simultaneously for lead removal during operation in a CCC: physical and electrochemical adsorption, pH modulation yielding acid/base chemistry, and electrochemical/chemical oxidation generating lead oxides and other insoluble species. The effect of applied potential and $H_2O_2$ generation on lead removal from tap water was verified by experimental data. As shown in Table 5, there is some physical adsorption of lead with the carbon electrodes at open circuit. At short-circuit there is a slight improvement in lead removal, but the most dramatic result occurs at an applied voltage of 1.2 V, where the lead concentration drops to nearly 0 ppb. "Feed" is the input stream, and "treated" is the output stream, in the CCCs used in the experiments.

TABLE 5

Lead removal at different applied potentials

| Applied Potential | Sample | $Pb^{2+}$ Concentration (PPb) |
|---|---|---|
| None | Feed | 57.28 |
| (open circuit) | Treated | 16.14 |
| 0 V | Feed | 55.26 |
| (short-circuit) | Treated | 10.14 |
| 1.2 V | Feed | 38.04 |
| | Treated | 2.89 |

Figure 5:
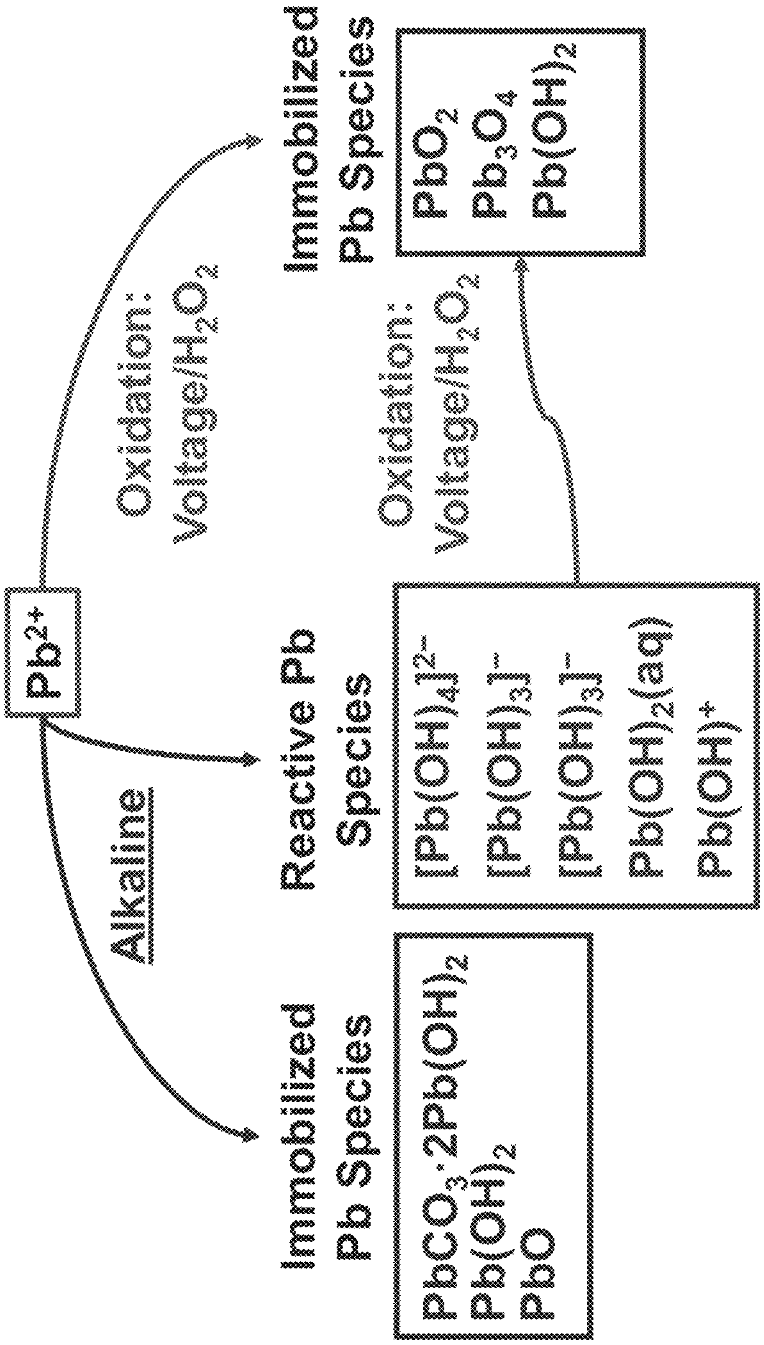
FIG. 5. Agglutination mechanisms for lead (Pb) removal showing lead speciation and pathways for immobilization of Pb species.

FIG. 4, in the Pourbaix diagram of lead (Pb) in a carbonate aqueous solution, shows the Pourbaix operating regions for lead species removal in a CCC at the intersection of E applied to anode and cathode. In a flow-through cell, FIG. 2 shows that the pH region at the start of the cathode is acidic (pH 2-3) while at the start of the anode, it is basic (pH 9-10). In a flow-through cell design (FIG. 2), these pH regions are a result of the reactions that take place at the electrode surfaces and yield fluctuations in pH from 2-10. In FIG. 4, $Pb^{2+}$ is in solution equilibrium in most of the white area (approximately pH 7) between the darker $PbO_2$(s) and Pb(s) areas; however, in the solution nearest the anode and cathode, $Pb^{2+}$ becomes (i) reactive or (ii) immobilized as other Pb species. FIG. 5 shows the reaction mechanisms by which Pb is removed from solution. In a flow-through cell, the alkaline (pH 9 to pH 10) region near the anode (at applied E of 0.9 V, emanating from the pH generated from the cathode), $Pb^{2+}$ is immobilized (adsorbed on the anode) as $PbCO_3$-$2Pb(OH)_2$, $2Pb(OH)_2$, and $PbO_2$. In the alkaline region near the anode, $Pb^{2+}$ also forms ionic compounds and lead hydroxide (as shown in the middle box of FIG. 5) that are then oxidized into $PbO_2$, $Pb_3O_4$, and $Pb(OH)_2$, which reaction products are then immobilized (adsorbed). Also in a flow-through cell, hydrogen peroxide, generated at the cathode from dissolved oxygen reduction and combined with the acidic pH emanating from the anode (pH 2 to pH 3) with an applied E of −0.4 V is a potent oxidizer. Hydrogen peroxide diffuses into the through stream, including the region near the anode where it oxidizes lead species in the intermediate reactions described above. The immobilized lead species are thereby removed from solution. Additional lead species are susceptible to immobilization through reactions with hydrogen peroxide that is generated via oxygen reduction at the cathode ("peroxidation cell"). *Water Research.* 2017, 120, 229-237, Tang, W.; He, D.; Zhang, C.; Kovalsky, P.; Waite, T. D. In a hybrid system, FPCs can be using in series with peroxidation cells to provide increased lead removal.

Figure 6:
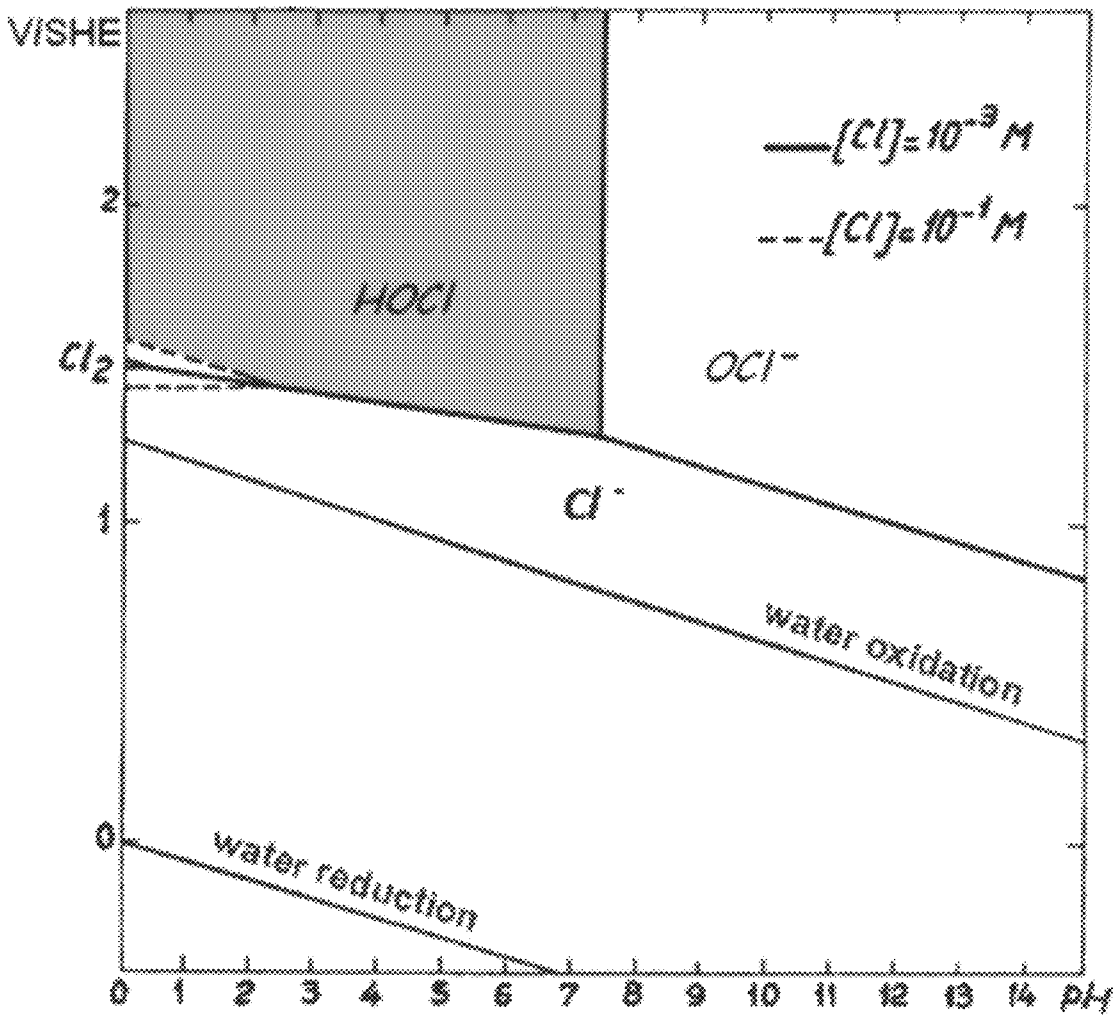
FIG. 6. Pourbaix diagram for hypochlorite. (Debiemme-Chouvy, Catherine & Hua, Y & Hui, F & Duval, Jean-Luc & Cachet, H. (2014). Corrigendum to "Electrochemical treatments using tin oxide anode to prevent biofouling" [Electrochimica Acta 56/28 (2011) 10364-10370]. Electrochimica Acta. 121. 461. 10.1016/j.electacta.2014.01.130.)
Figure 7:
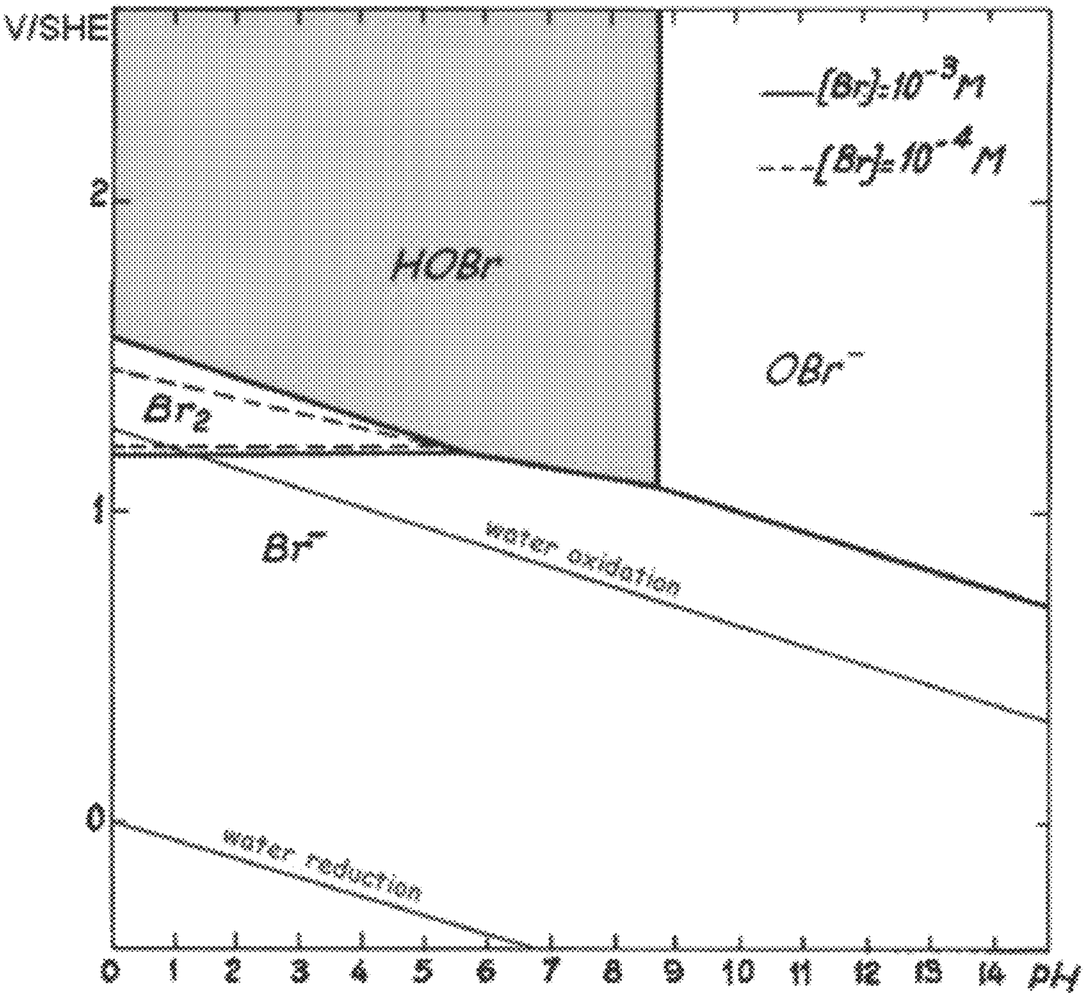
FIG. 7. Pourbaix diagram for hypobromite. (Ibid.)
Figure 8:
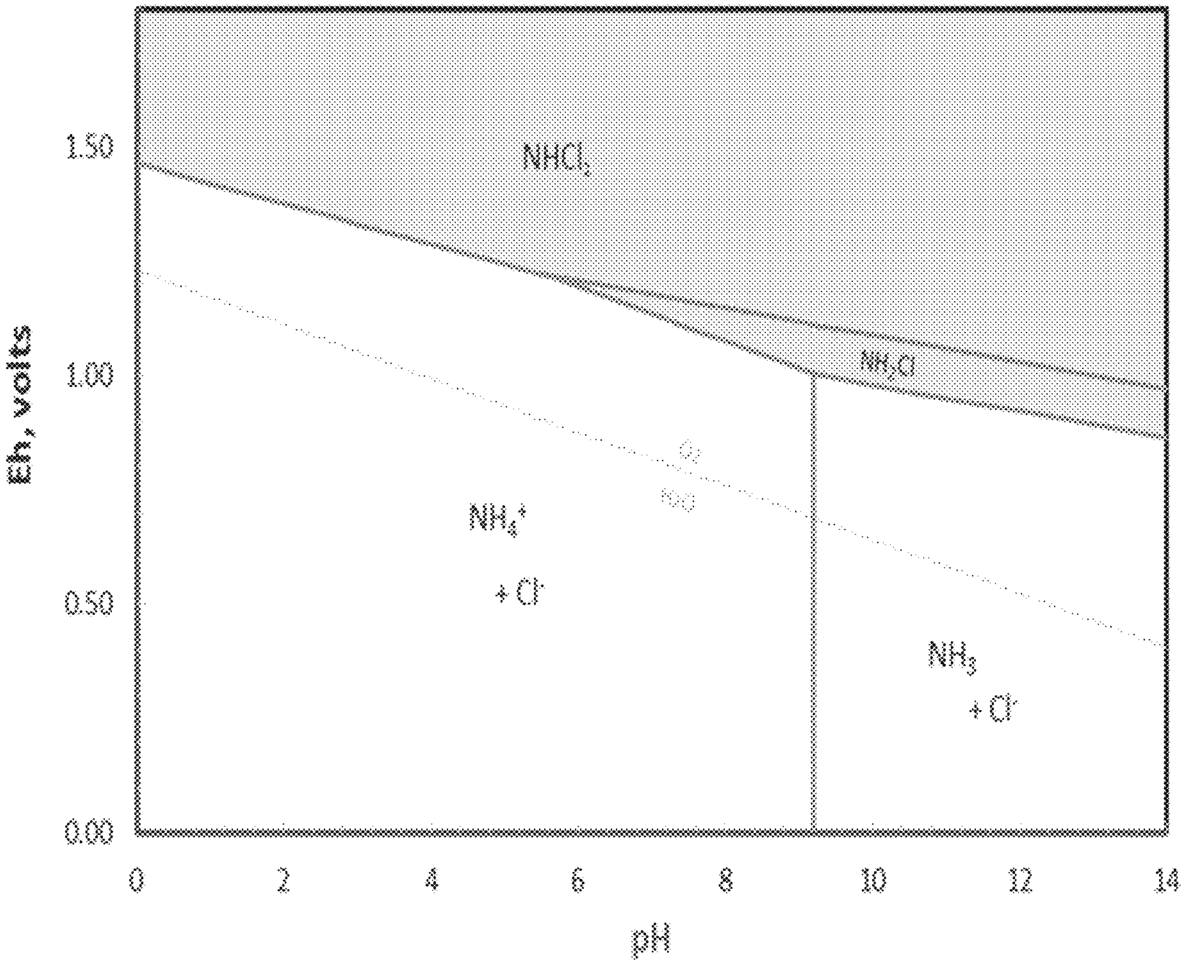
FIG. 8. Pourbaix diagram for mono chloramine ($NH_2Cl$). (www.sedimentaryores.net/Pipe %20Scales/Chlorine-chloramine.html)

In an EDC, a cascading series of chemical-electrochemical-chemical-electrochemical reactions are occurring to decompose free chlorine and chloramine. The pH and operating voltage are correlated through the Pourbaix diagram for a target species. Examples are given below for hypochlorite, hypobromite, and monochloramine and shown in FIG. 6, FIG. 7 and FIG. 8, respectively. Based on the pH and potential distributions at each electrode, the target speciation can be controlled by selecting the pH and voltage to apply. This calibration process determines and controls what species are decomposed at what voltage and in a given influent water chemistry. In FIGS. 6-8, the y-axis is voltage applied between the anode and cathode vs. a standard hydrogen electrode (SHE), and the x-axis is pH.

With reference to FIG. 6, at anode potential of <1.5 V vs. NHE and a total cell potential of <2.5 V applied across anode and cathode, electrochemically generated hydrogen peroxide reacts with "free chlorine" in solutions with pH>7. Direct electrochemical reduction of hypochlorous acid (HOCl) and hypochlorite ($OCl^-$) from the carbon cathode converts them into free chloride ions and water. The chloride ion is then capacitively adsorbed (immobilized). While there is no upper limit to the pH (e.g., $H_2O_2$ can be used to dechlorinate effluent from caustic/chlorine odor scrubbers), as a practical matter, pH 8.5 is preferred in order to provide an instantaneous reaction.

With reference to FIG. 7, a Pourbaix diagram for hypochlorite, at an anode potential <1.2 V vs. NHE, a cathode potential of >−1.0 V vs. NHE, and a total cell potential of <2.2 V applied across anode and cathode, electrochemically generated hydrogen peroxide reacts with "free bromine" in solutions with pH>7. Direct electrochemical reduction of hypobromous acid (HOBr) and hypobromite ($OBr^-$) from the carbon cathode converts them into free chloride ions and water. The bromine ion is then capacitively adsorbed (immobilized).

With reference to FIG. 8, a Pourbaix diagram for mono chloramine, at an anode potential <1.4 V vs. NHE, a cathode potential of >−1.0 V vs. NHE, and a total cell potential of <2.4 V applied across anode and cathode, direct electrochemical changes in chloramine under acidic conditions produces the ammonium salt. Electrochemically generated (at an EDC cathode) hydrogen peroxide reacts directly with chloramine to produce a mixture of products: chloride ions, nitrite ions, protons (acid), and water. Chloramine reacts with electrochemically generated hydrogen peroxide to produce ammonia which will react further in 2 ways: 1) reaction with electrochemically generated hydrogen peroxide to yield nitrogen and hydrogen gas and water, or 2) reaction with acid to yield ammonium salts. Chloramine will also react directly with electrochemically generated acid in a cascade process to yield trichloramine which is converted into hypochlorous acid in water.

EDCs typically operate with total cell potential of <3.0 V applied across anode and cathode; depending upon target species and input water chemistry, total cell potential of <3.0 V applied across anode and cathode in an EDC is usually between 1.0 V to 3.0 V.

As shown in FIG. 9, the active surface area of SC, KN, and CG carbon electrodes decreases from exposure to cycles of an applied voltage. CX's specific charge passed is stable over repeated cycles, but is lower than the other carbons tested. In contrast, Applicant's HE electrode, formulated with PMD, performs better than the other electrodes after about 220 cycles, and maintains superior performance. In the SC, KN, CG, and CX electrodes, oxide groups form on the surface causing pore roofing and pore collapse, resulting in increased resistance (bulk oxidation). Alternatively, oxide groups can form a resistive oxide layer (surface oxidation). Both scenarios require that the applied voltage increase, according to Ohm's law, to maintain the same amount of current to compensate for this increase in resistance: V=IR, where V is voltage (V), I is current (A), and R is resistance (Ω).

Figure 10:
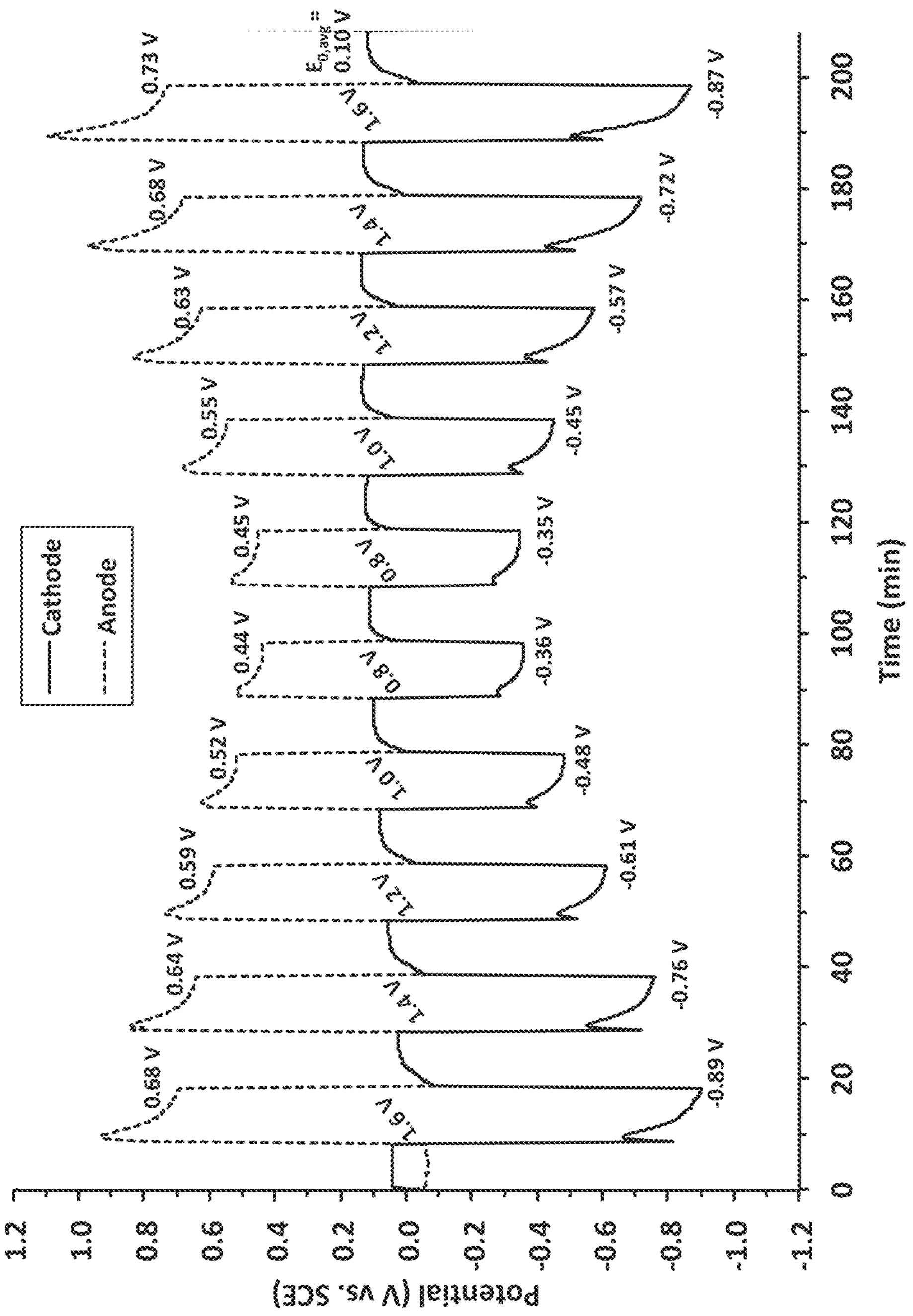
FIG. 10. Potential distribution for Kynol electrodes in a 4-electrode set-up in 4.3 mM NaCl, where pristine Kynol was the anode and cathode, Pt was the counter-electrode, and a standard calomel electrode (SCE) was the reference. The voltage was applied in 0.2 V increments from 1.6 V down to 0.8 V and back up to 1.6 V. E0,avg represents the open circuit voltage of the system.
Figure 11A:
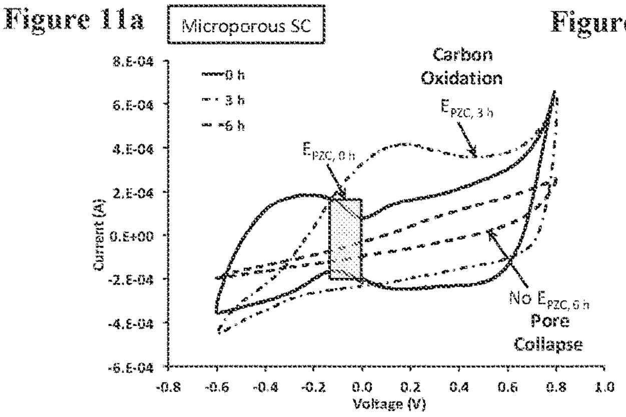
FIGS. 11*a-e* show cyclic voltammograms (CV) at a scan rate of 0.5 mV/s in 4.3 mM NaCl with carbon as the working electrode, Pt coated Ti as the counter-electrode, and a standard calomel electrode (SCE) as the reference. The CVs were collected using a carbon electrode (different types, as identified), disposed in an electrolyte and held at constant voltage and for a uniform experimental duration. The voltage applied between anodes and cathodes is ramped up then ramped down at the scan rate, and the current response recorded as a CV. In addition to a CV of pristine (0 h) electrodes, each plot shows the results (3 h and 6 h traces) of accelerated oxidation studies performed after use of the electrodes at a constant applied potential of 2.0 V for 3 and 6 hours.
Figure 11B:
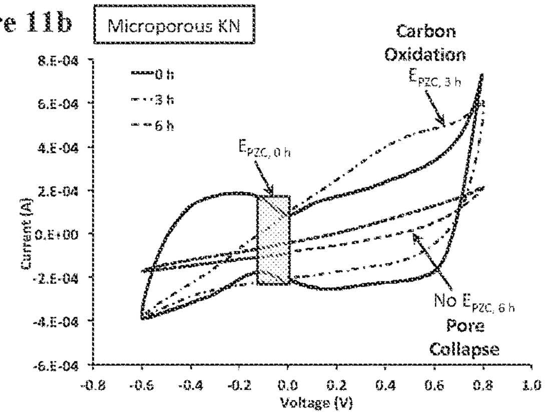
Figure 11C:
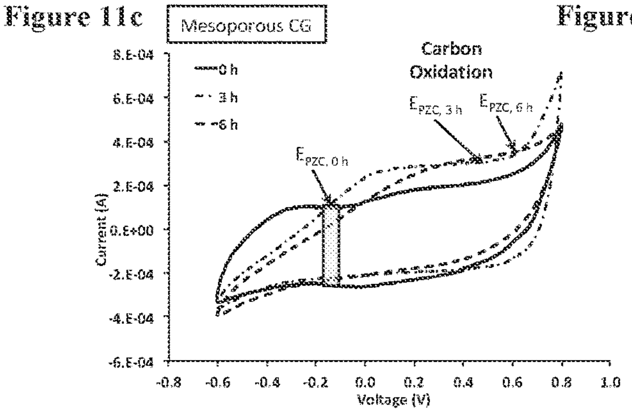
Figure 11D:
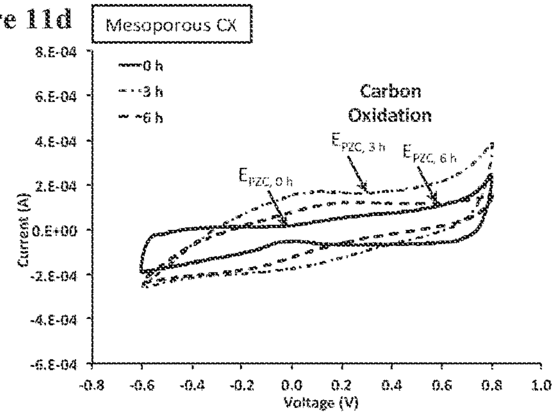
Figure 11E:
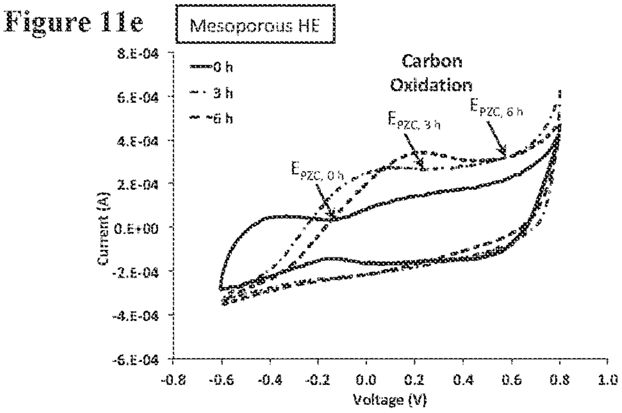

FIG. 10 shows that at a given applied voltage there will be a potential distribution between the anode and cathode in a CCC; the voltage will split between the electrodes, which may not be equal. For example, if 1.6 V is applied to an FPC, the cathode may be at −0.9 V vs. SCE and the anode at +0.7 V vs. SCE (FIG. 10). This in turn affects the FPC operating parameters and frequency of polarity-switching performed in each cycle of operation in an EDC. The active surface area, carbon material, and applied voltage, among other things, affect the potential distribution. The Epzc of an electrode affects the distribution of applied E during the initial use of an electrode, and the potential distribution changes slightly. Balancing of faradic reaction rates at the anode and cathode ultimately stabilize potential distribution Accelerated oxidation studies, shown in FIGS. 11*a, b, c, d* and *e*, show the effect of pore "collapse and roofing" observed with microporous carbon. This emphasizes that mesoporous carbons can handle a large applied voltage while maintaining charge efficiency and avoiding the effect of pore collapse and roofing. Careful selection of PMD used in an FPC device greatly increases device reliability and lifetime, and thereby reduces water treatment costs.

Figure 12:
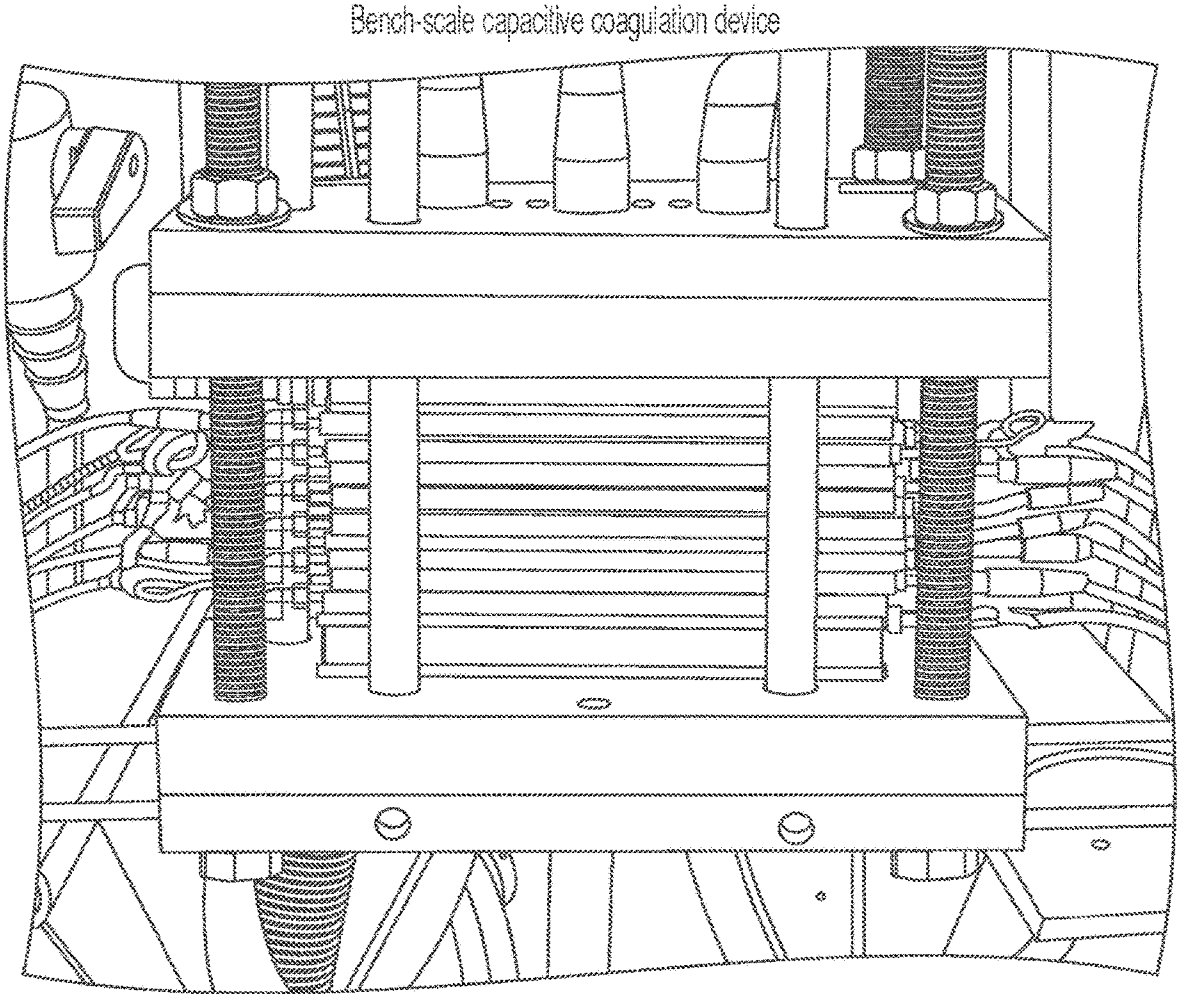
FIG. 12. Bench-scale capacitive coagulation device.

A bench-scale CCC system is shown in FIG. 12. The capacitive coagulation system provides >50% lead removal selectivity vs. non-metal ions. In CCCs tuned (using CCC Parameters) to remove lead ("lead-removal CCC"), lead removal can approach 100%. In one embodiment of a lead-removal CCC, various oxygen-based surface groups are added to the electrode and lead removal below 15 ppb is achieved in all cases for ~50 ppb lead tap water input stream, at a CCC operating voltage of 1.2 V. Using carboxyl functionalized electrodes (aka treated electrodes), as described in U.S. APP 62/702,286 incorporated herein, a lead-removal CCC reduced the concentration of lead in the output stream to only 0.05 ppb, equating to 99.9% removal efficiency.

The removal selectivity of dissolved lead was consistently ≥99% compared to $Ca^{2+}$ for the treatment of a consecutive 5 gallons of tap water with concentrations as high as ~10 ppm lead (Table 6), as confirmed by ICP-MS and calculated as percent removal of species. Scanning electron microscopy (SEM) and energy dispersive X-ray spectroscopy (EDX) analyses of the electrodes after filtration confirmed lead immobilization are shown in FIG. 13.

TABLE 6

Lead removal selectivity

| Volume Treated | % Removal $Pb^{2+}$ ~300 ppb Feed | % Removal $Pb^{2+}$ ~10 ppm Feed |
|---|---|---|
| 1 gallon | 99.69 | 99.99 |
| 2 gallons | 99.83 | 99.99 |
| 3 gallons | 99.95 | 99.98 |
| 4 gallons | 99.93 | 99.98 |
| 5 gallons | 99.48 | 99.97 |
| Removal Selectivity | ≥99% in all cases | |

Figure 14A:
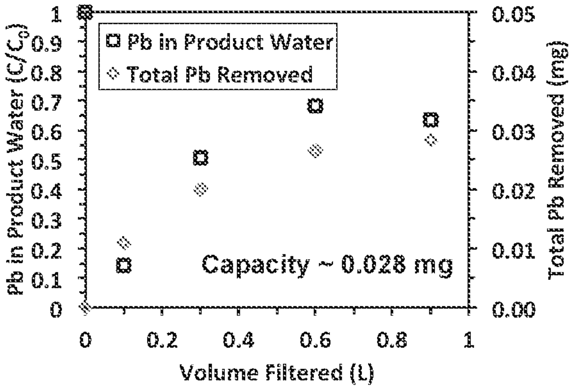
FIG. 14*a* shows a breakthrough curve for prior art activated carbon packed column. The y-axis on the left has been normalized for the initial lead concentration of 126 ppb. The y-axis on the right shows the total Pb removed in mg for the volume treated.
Figure 14B:
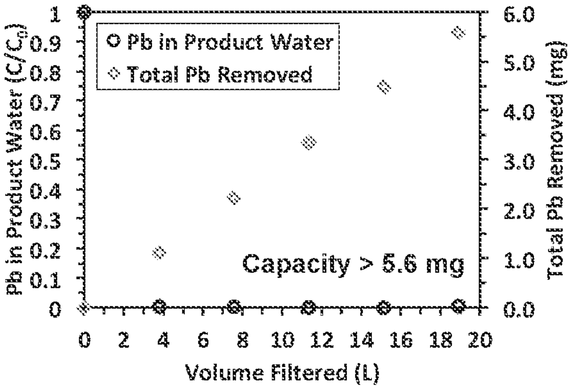
FIG. 14*b* shows a breakthrough curve for Applicant's CCC device experiment. The y-axis on the left has been normalized for the initial lead concentration of 296 ppb. The y-axis on the right shows the total Pb removed in mg for the volume treated.
Figure 14C:
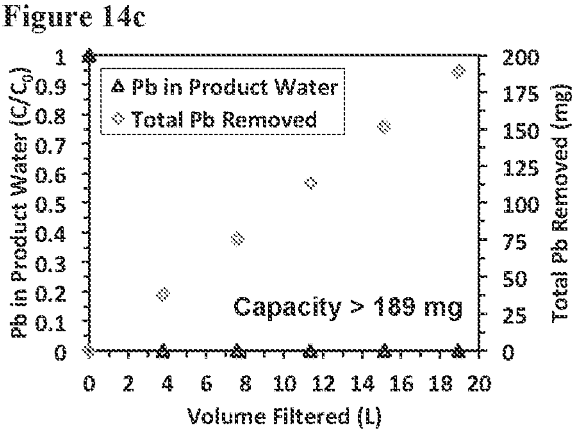
FIG. 14*c* shows a breakthrough curve for Applicant's CCC device experiment. The y-axis on the left has been normalized for the initial lead concentration of 10,000 ppb. The y-axis on the right shows the total Pb removed in mg for the volume treated.

To further study the effect of applied potential on lead removal, tap water spiked with lead was filtered with a packed column filled with activated carbon at no applied potential (passive filtration/physical adsorption) and compared to CCCs operated at 1.2 V (active filtration/capacitive coagulation). The same amount of carbon and flow rate was used for both experiments. Breakthrough curves for these studies are shown in FIGS. 14*a* and *b*. The packed column initially adsorbed lead, denoted by the abrupt drop in concentration, but after only ~0.3 L of water had passed through the carbon it began to saturate. In contrast, CCCs were able to filter 5 gallons (~19 L) of water up to an astonishing 10,000 ppb and maintain performance, consistently removing lead below a concentration of 2 ppb. This extrapolates to an estimated device capacity of ≥1 g of lead removed per gram of carbon electrode. The prototype device shown in FIG. 9 would yield an overall capacity of ≥500 g of lead, equating to a theoretical volume capacity of ~8.8 million gallons assuming an input stream concentration of 150 ppb lead; other factors impact CCC performance in POU configurations and yield a predicted CCC volume capacity of 100,000 gallons. In contrast, current POU filters only have a volume capacity of approximately 1,500 gallons.

Figure 15:
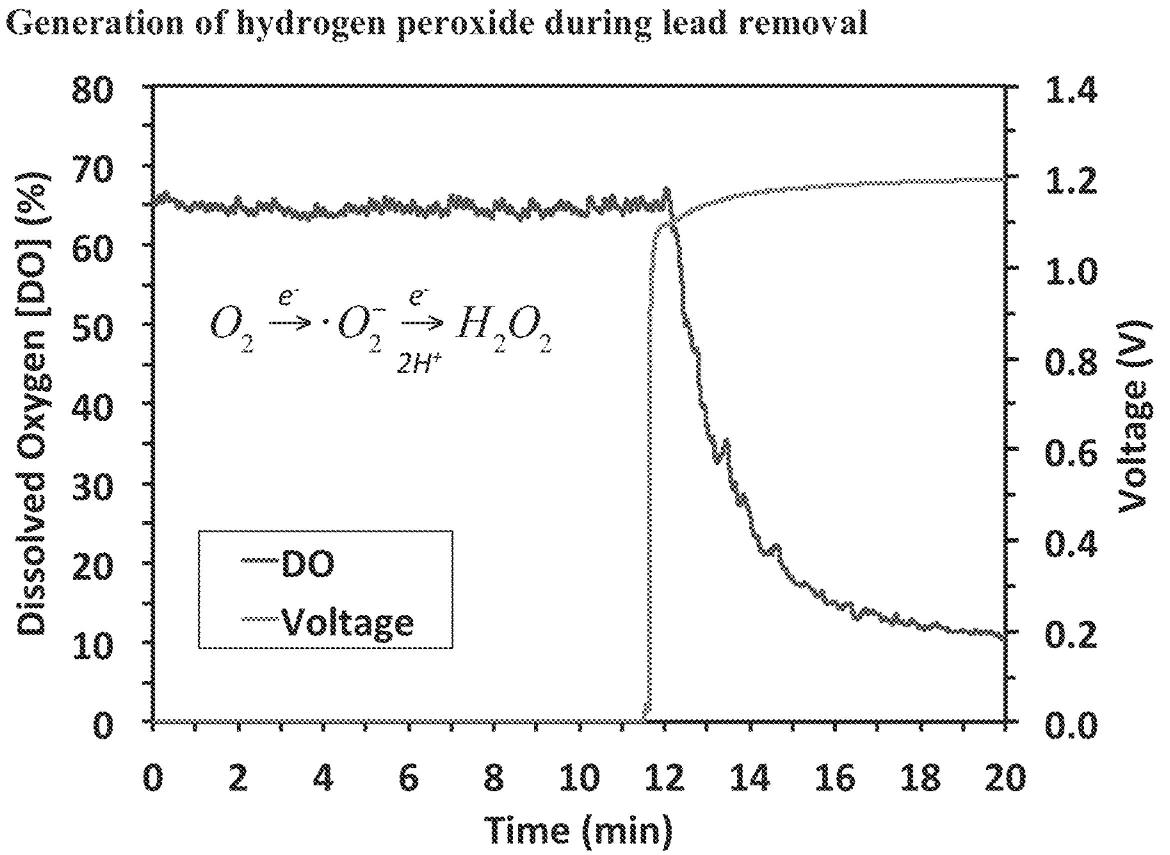
FIG. 15. DO reduction at 1.2 V. DO reduction generates hydrogen peroxide, a potent oxidizer.

Additionally, the dissolved oxygen (DO) dropped to ~10% of saturation, equating to <1 ppm DO, and 1.25 ppm of $H_2O_2$ was measured after filtration at an applied potential of 1.2 V (FIG. 15). These observations reveal that lead removal is influenced by a combination of potential and $H_2O_2$ generation. The Pourbaix diagram in FIG. 4 emphasizes how sensitive lead speciation is to modest changes in water chemistry, such as fluctuations in pH and voltage. The combination of these mechanisms yield the benefits observed with capacitive coagulation used in CCCs.

To test the limitations of Applicant's CCC device, tap water with lead concentrations as low as 5 ppb and as high as 10,000 ppb were processed through CCCs. Lead was successfully removed in all cases at an applied voltage of 1.2 V (Table 7). Even at highly dilute conditions where passive filtration consisting of equilibrium-based adsorption struggle, the capacitive coagulation's active filtration process excels with a selectivity of ≥99% (Table 6).

| Key CCC device performance improvements over prior art devices: |
|---|
| 99.9% lead removal |
| ≥99% selectivity maintained down to ~5 ppb lead |
| Active lead filtration system developed (capacitive coagulation) |
| Permanent lead removal |

TABLE 7

Lead removal at 1.2 V

| Sample | $Pb^{2+}$ Concentration (ppb) |
|---|---|
| Feed | 5.63 |
| Treated | 1.45 |
| Feed | 54.32 |
| Treated | 0.05 |
| Feed | 295.72 |
| Treated | 0.15 |
| Feed | 10,000 |
| Treated | 0.28 |

Higher throughput CCC systems are fabricated by adding more capacitive coagulation cells and/or using larger electrodes in each cell. Such larger systems provide lead removal efficacy from 150 ppb to ≤10 ppb at a flow rate of 1 gpm or higher.

The preferred applied E for removal of Al, Ag, Au, Br, Cl, Co, Cu, Fe, Hg, Ir, Mn, Pb, Pd, Pt, Ni, Zn, and chloramine using an FPC are shown in Table 1.

CCC systems remove lead to below EPA action levels even if the input stream has various combinations of lead content, water hardness, alkalinity, disinfectants, and pH. Water chemistry will impact lead speciation (e.g., day to day variations in municipal water chemistry, the effect of which are shown in FIG. 4 above). Currently there does not exist one device that can treat lead in all of its forms; prior art devices typically use physical entrapment at higher pH and zeolite media at lower pH. In contrast, CCCs can remove lead in all forms (species) commonly found in drinking water sources.

Different operating parameters were explored depending on the water type. Corrosion of internal materials is a common concern with electrochemical-based systems, however little evidence of corrosion has been observed in FPC systems; internal components are designed, and the material is chosen, to be extremely robust, stable, and inert to galvanic and chemical corrosion. In one embodiment of the invention, if lead is found to leach after on/off operation or from the addition of chloramines, the FPC system can be designed to switch to open circuit or a small potential when not in use, and an inexpensive carbon block pre-filter is added to remove chloramines. An optional post-filter is added if small pieces of the carbon cloth are found to flake off over time.

Operational adjustments for specific water chemistries. Analysis of typical input stream feeding a given FPC device permits adjustments to optimize operating parameters for specific water chemistries (adjustments are to optimize physical and electrochemical adsorption of lead, pH modulations, and oxidation to lead oxides and other insoluble species). Typical operating parameters are adjusted as follows:

Operating voltage. To obtain the potential distribution, a three-electrode set-up is used with a cathode, anode, and a standard calomel electrode (SCE) as the reference. The potential at each electrode is recorded at open circuit, short-circuit, and up to a voltage of 1.4 V with 0.2 V increments. The pH and operating voltage are correlated through the Pourbaix diagram. Based on the pH and potential distributions at each electrode, the lead speciation can be controlled by selecting what voltage to apply. This calibration process determines and controls what lead species precipitate at what voltage and in a given input stream water chemistry.

Oxygen reduction and $H_2O_2$ generation. Oxygen reduction at the cathode generates $H_2O_2$ that can react with lead species to facilitate the formation of lead oxides. There is a significant reduction in DO at an applied voltage of 1.2 V and measured 1.25 ppm $H_2O_2$ in the filtered water. The operating voltage is controlled to amplify this reaction for maximal lead removal. Experiments conducted at open circuit, short-circuit, and up to a voltage of 1.4 V with 0.2 V increments, and the pH, DO, and $H_2O_2$ concentrations at the outlet typically remove lead to below EPA action levels.

Carbon conductivity. FPC devices typically use a microporous carbon with a moderate conductivity (carbon B in Table 8). A comparative study of carbons with different properties, Table 8, was conducted to elucidate their effect on lead removal via capacitive coagulation.

TABLE 8

Carbon properties

| Carbon | Conductivity (S/cm) | Pore Size (nm) | Surface Area ($m^2/q$) |
|---|---|---|---|
| A | 0.2 | 1.2-3 | 1000-2000 |
| B | 1.2 | 2.2 | 2000 |
| C | 900 | N/A | <2 |

The CCC lead removal technology relies on (i) physical adsorption; (ii) capacitive adsorption; (iii) electrochemical pH modulation and metal immobilization; (iv) electrochemical peroxide ($H_2O_2$) generation & metal oxidation; (v) electrodeposition (e.g., electroplating, electrophoretic deposition); (vi) electrochemical oxidation; (vii) precipitation; (viii) pore mouth diameter profile, (ix) electrode treatment, (x) electrode spacing, and (xi) flow-by vs. flow-through vs. carbon block cell design. A combination of these factors, or a cascade of these factors, causes speciation and immobilization of target species that become trapped in the pore network of the carbon electrodes, which results in a purified effluent. It is imperative that the carbon electrodes are conductive. The more conductive the carbon material, the more uniform the current distribution was across the electrodes, which typically results in increased $H_2O_2$ generation and a more efficient lead removal process. The pore size and surface area are related to the adsorption capacity and tortuosity of the material. Pore size and surface area also affect $H_2O_2$ generation in an FPC device.

POU/POE device design. A POU/POE FPC product design parameters include: (1) Residence time and size of device was identified to achieve a flow rate of 1.5 gpm; and (2) Effective lead removal, defined by a reduction in dissolved lead levels from 150 ppb to ≤10 ppb and removal selectivity >90% over non-metal divalent ions, at 1.5 gpm for at least 150 gallons of water treated.

Residence time of the water: The residence time is a measure of the average time a volume of water remains in the device (volume/flow rate). In other words, it is the time required to filter a given amount of water. The internal volume of the device and flow rate dictates the residence time. In the bench-scale CCC device, at a flow rate of 20 ml/min, a residence time of 5 min typically gives the desired removal. The residence time for the flow rate at which the performance reaches a peak is selected as the design specification and the device is sized appropriately.

Pressure drop: The pressure drop across a FPC device is increasingly important as the flow rate increases. A pressure drop of <20 psi is considered acceptable and is below a normal inlet water pressure for residential and municipal buildings of ~45 psi.

Ultimate capacity of a FPC device. For NSF/ANSI certification, the lead concentration must be reduced from 150 to 10 ppb, and POU systems on the market are rated to treat up to 120 gallons of water. This translates into ~1 gallon of water treated per gram of carbon for a pitcher system and ~1.6 gallons of water treated per gram of carbon for an under-the-sink system. One embodiment of the CCC device can treat 2 gallons of water at 1.5 gpm to bring lead levels from 150 ppb to ≤10 ppb. Ultimate capacity of the system is obtained from a lead removal curve. Pressure drop issues typically arise after >1 g of lead removal per gram of FPC carbon electrode. CCC embodiments for POU/POE use can include a lead sensor and/or pressure drop sensor to alert a user to replace the device.

FPC replacement threshold ranges for various embodiments. In general, a CCC is replaced when the target metal concentration in the output stream exceeds the relevant threshold level, e.g., 15 ppb for lead concentration and 1.3 ppm for copper (see the Lead and Copper Rule, a regulation published by the EPA in 1991 (www.epa.gov/ground-water-and-drinking-water/national-primary-drinking-water-regulations). The threshold level (aka sorption capacity) could be specified by a government agency, or user selected. Municipal and industrial wastewater discharge limits are different from drinking water limits; the metal concentration thresholds are typically higher. There are effluent guidelines for different industries (www.epa.gov/eg).

FPC Regeneration. When a FPC output stream metal concentration equals or exceeds the threshold level, rather than replacing the FPC, some types of FPCs can be regenerated (e.g., in a CCC, the adsorbed metal ions and particles desorbed (removed) from the CCC electrodes). One method of CCC regeneration is by flushing acid through the cell to dissolve coagulated metals and regenerate the electrodes. During this "acid regeneration" step, the output stream is diverted to a receptacle in which the highly concentrated waste stream is collected for other processing. After an acid regeneration step, the CCC is flushed with water until the output stream reaches pH 7 (or other target pH) before normal CCC operation (i.e., removal of metal ions and particles from the through stream) is resumed. Another method of CCC regeneration is by electrolysis or electrochemical regeneration in an acidic solution; electrolysis (aka electrochemical) regeneration converts metal oxides to soluble metal ions, which are then flushed out of the CCC with water and collected in a waste receptacle. Electrolysis is an electrochemical reaction that requires the application of an external voltage to drive a reaction that is non-spontaneous. Any insoluble metal species that have formed on the electrodes can be dissolved into solution using a small voltage, typically up to 5 V, applied across the CCC. CCC regeneration can also be a sequence of acid regeneration followed by electrolysis, or vice versa.

Multiple FPCs, in series, each of which FPCs targets the same or a different species. Multiple FPCs connected in series (outlet to inlet) tuned to remove the same target species act to successively reduce the concentration of the target species in a single pass of an input stream through the FPCs connected in series (accomplishing the same level of target species removal as operating a single cell in batch mode multiple times). Adjustment of FPC Parameters, e.g., pH of the through stream and voltage applied to the cell electrodes of a given cell, of multiple cells connected in series to different FPC Parameters and EDC Parameters, as the case may be, enable each cell in a series to remove a different target species from the through stream in a single pass. Pourbaix diagrams, which show the speciation of a target species at a given voltage and pH, best illustrate the "cell series" concept. Pourbaix diagrams for lead (FIG. 16) and copper (FIGS. 17*a* and *b*) are used to explain the immobilization of different metals in a CCC series. The horizontal dashed lines represent the applied voltage; the applied voltage can move along the vertical axis. The vertical dashed lines represent the pH; the pH can move along the horizontal axis. The region where these lines intersect represents the species of the metal that will exist at these conditions. The operating conditions depicted in FIG. 16 and FIG. 17*a* would immobilize (adsorb on a CCC electrode) Pb and Cu as $PbO_2(s)$ (FIG. 16) and $Cu(OH)_2(s)$ (FIGS. 17*a* and *b*), effectively removing each metal from the feed stream. The operating conditions depicted in FIG. 17*b* would electrodeposit or electroplate Cu on the electrode as $Cu_{(s)}$. Pourbaix diagrams for nickel, iron, manganese, aluminum, and zinc have also been included (FIG. 18 to FIG. 22). A similar approach to manipulating the applied voltage and pH can be taken to remove these metals. The operating conditions selected to form insoluble species may differ for each target species, and there could be several possibilities for a given target species depending on the speciation depicted in the Pourbaix diagram.

Applied voltage and electrochemical pH modulation are selected to remove target species of Ni, Fe, Mn, Al, and Zn from CCC influent using the Pourbaix diagrams shown in FIGS. 18-22, respectively, as explained below. Those of skill in the art can select an applied voltage and electrochemical pH modulation to remove a given species of a target element or complex. Copper is removed by the CCC via electrodeposition, hydroxide precipitation, and/or oxidation to copper oxides.

FPC control system. FPC Parameters for a given FPC are monitored and controlled using a computer system that monitors and/or controls various sensors, interfaces, valves, and peripheral equipment, and is commonly known as a process control computer (aka process controller), a computer generally associated with continuous or semi-continuous production operations involving materials such as chemicals and petroleum, whether in liquid, solid, or gas phases. The process control computer enables FPC Parameters to be applied to one or more FPCs in a system and changes in through-stream routing, e.g, changes that convert a series system architecture to a series-parallel system architecture.

Extension of FPC design to other target species for which Pourbaix diagrams exist. In addition to Pb, Ni, Zn, Al, Cu, Fe, Mn, Cl, Br, and chloramine, the FPC Parameters, and the system and methods disclosed above, can be applied to remove a metal and halide species identified in the Pourbaix diagrams for As, Se, Sc, Ti, V, Cr, Co, Y, Zr, Nb, Mo, Tc, Ru, Rh, Pd, Ag, Cd, La, Hf, Ta, W, Re, Os, Ir, Pt, Au, Hg, Ce, Pr, Nd, Pm, Sm, Eu, Gd, Tb, Dy, Ho, Er, Tm, Yb, Lu, and other halides.

Figure 23A:
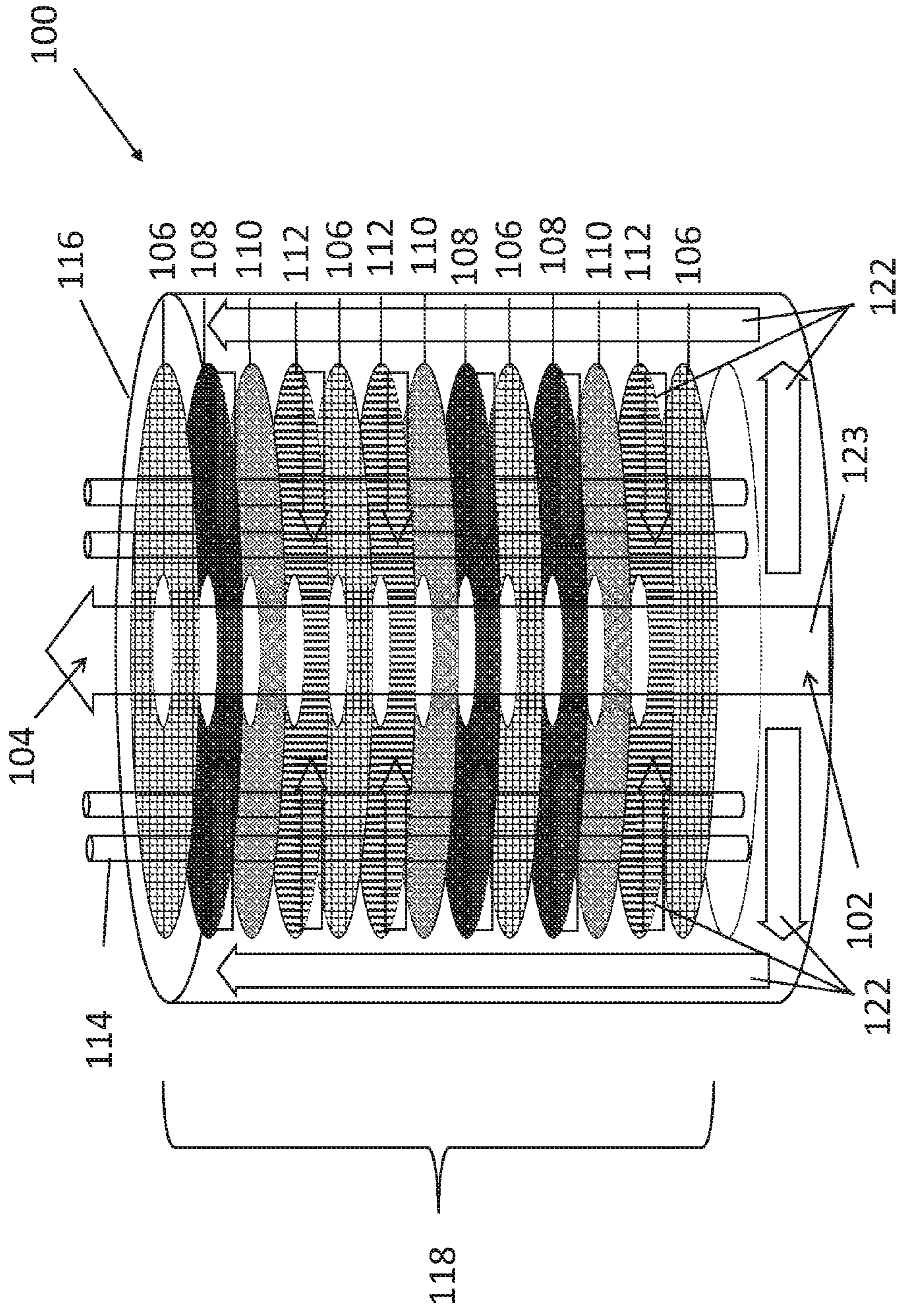
FIGS. 23*a-d*. Schematic of an electrochemical device with stacked cell design. The feed (influent, or input stream) flows in the bottom of the device, proceeds through an annular space near the wall of the cell housing, then flows centripetally over the electrode surfaces to the axial channel, and is then discharged (effluent or output stream) through the axial channel to the FPC outlet. Feed spacers are optional; a feed spacer (shown in FIGS. 23*d* and 29) is an additional layer of material between anode and cathode that can optionally be added to create a larger flow channel for the through stream.
Figure 23B:
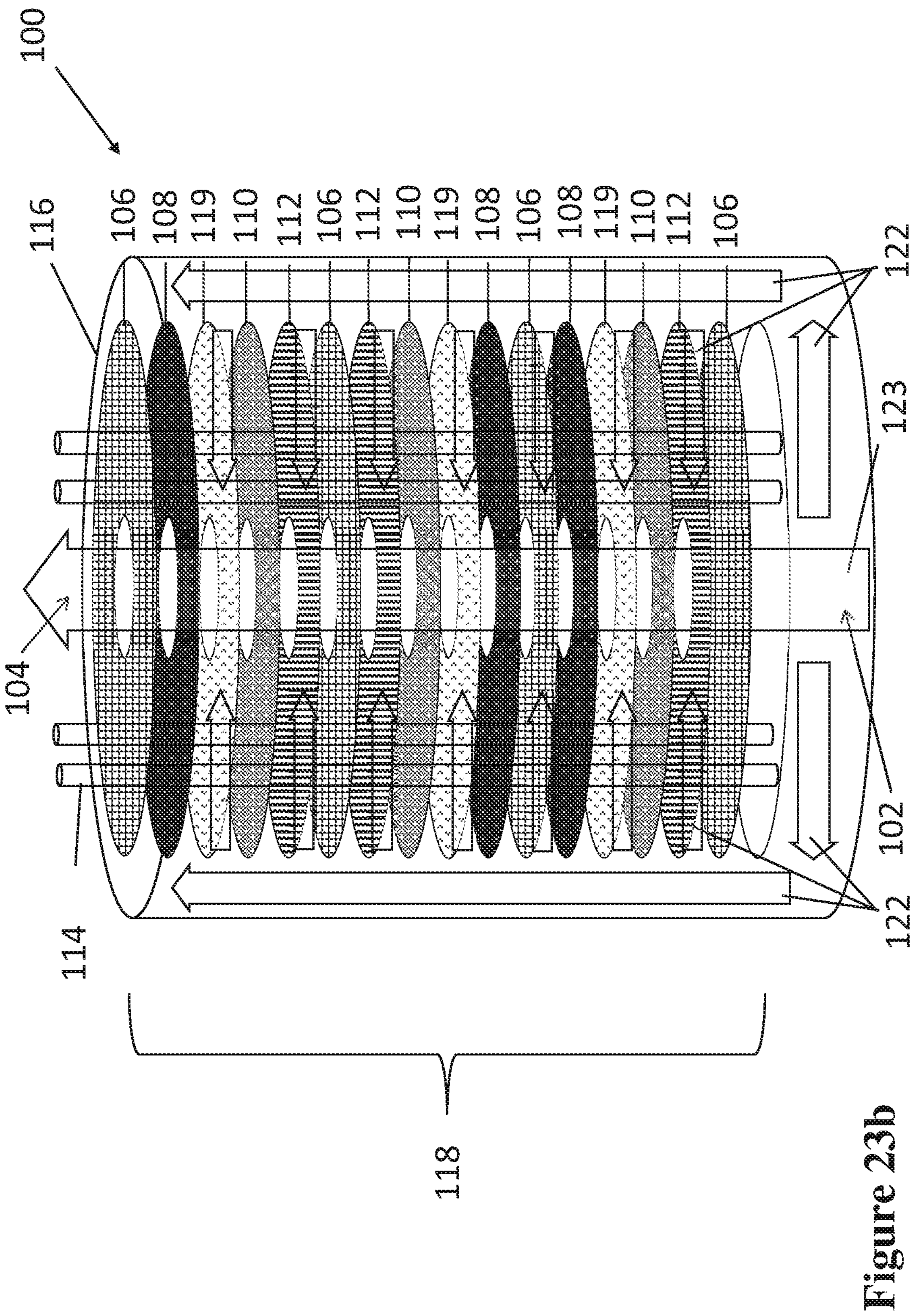
Figure 23C:
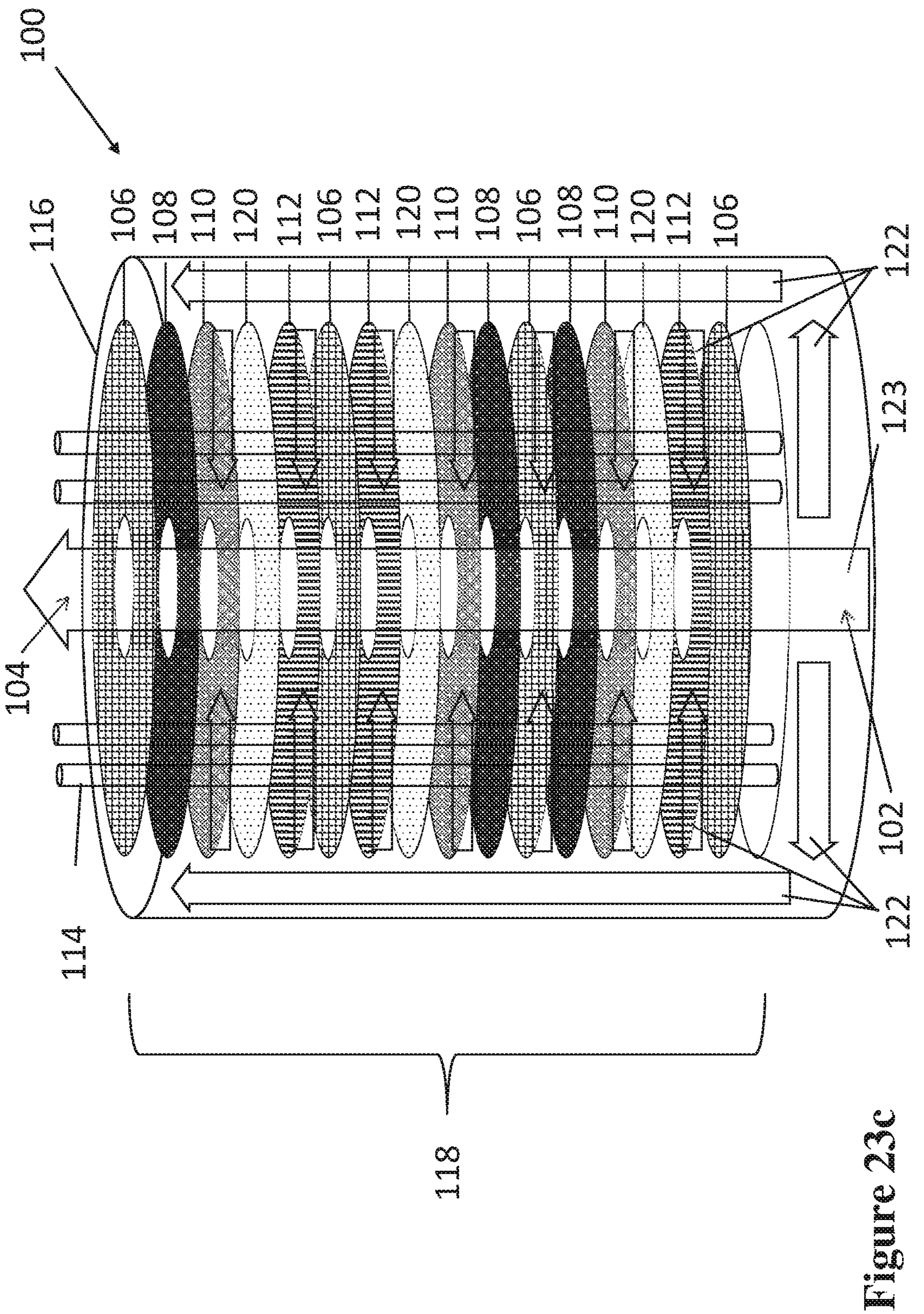
Figure 23D:
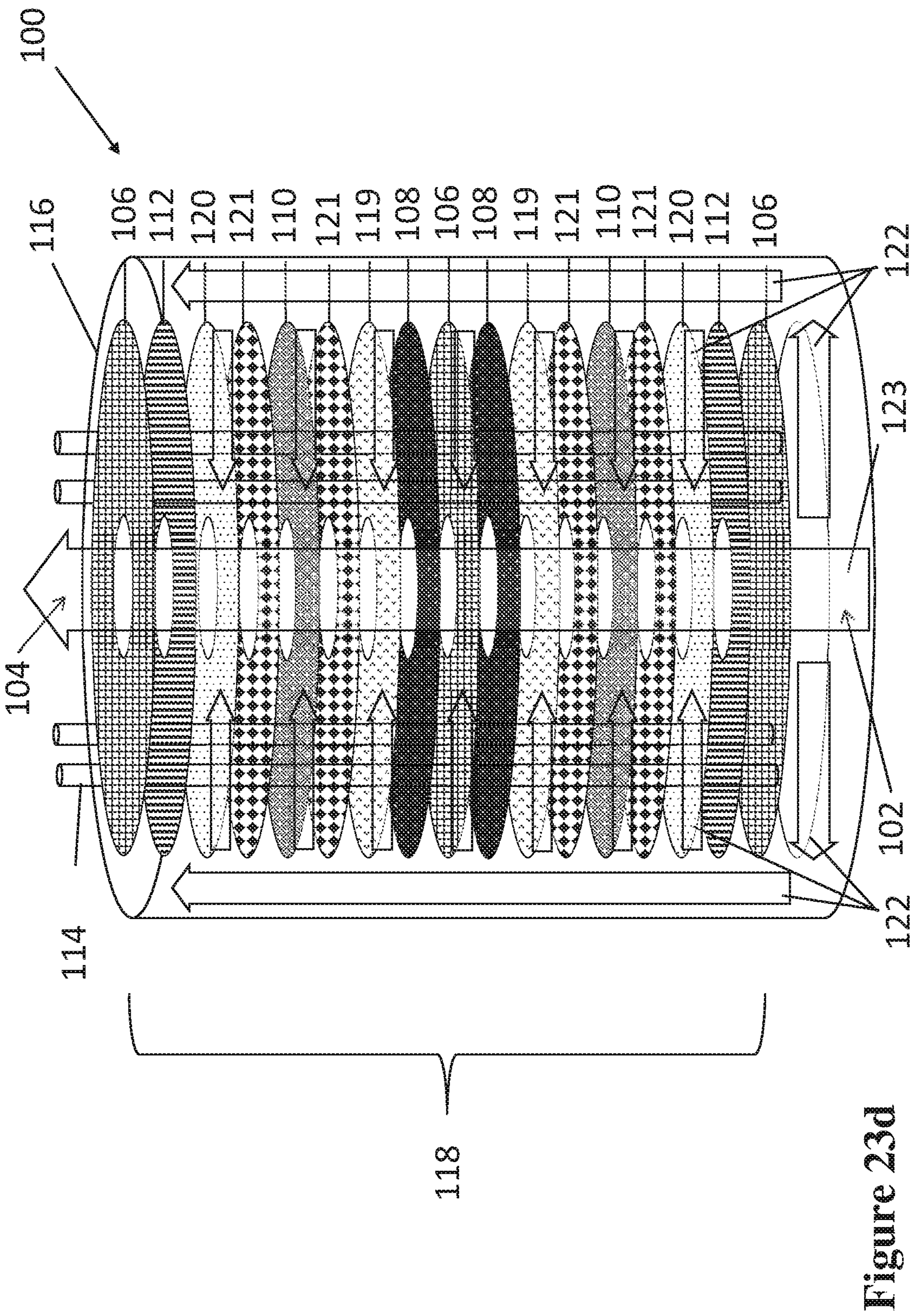

Stacked Cell Design. FIG. 23*a* illustrates an electrochemical device 100 that treats an input stream 102 of an aqueous solution (e.g., water) with one or more target species. FIG. 23*b* illustrates the electrochemical device 100 with a membrane 119 on the carbon-based anode 108. FIG. 23*c* illustrates the electrochemical device 100 with a membrane 120 on the carbon-based cathode 112. FIG. 23*d* illustrates the electrochemical device 100 with a membrane 119 on the carbon-based anode 108 and a membrane 120 on the carbon-based cathode 112 with an optional feed spacer 121.

The input stream 102 enters through an inlet in the housing 116 and is treated to at least partially remove or reduce the content of the one or more target species in the aqueous solution of the input stream 102, providing a treated output stream 104 that exits the housing 116 through an outlet. The output stream 104 includes a more reduced content of the target species than the input stream 102 and is then further processed as desired.

The electrochemical device 100 includes one or more electrode stacks 118 of a carbon-based cathode 112 and a carbon-based anode 108 arranged in the housing 116. In some embodiments, as shown in FIGS. 23*b* and 23*d*, a membrane 119 (i.e., an anion exchange membrane) is arranged on the carbon-based anode 108. In other embodiments, as shown in FIGS. 23*c* and 23*d*, a membrane 120 (i.e., a cation-exchange membrane) is arranged on the carbon-based cathode 112.

Although one electrode stack 118 is shown, the electrochemical device 100 is not limited to one stack and in other embodiments includes one or more stacks 118, i.e., a plurality of electrode stacks 118 of the carbon-based cathode 112 and the carbon-based anode 108. The electrochemical device 100 further includes electrical contacts 114 (or electrical connections) and associated wiring (not shown) between the electrodes. The electrical contacts 114 and associated wiring provide the necessary electrical connections to the electrical power supply (not shown). The carbon-based cathode 112 and the carbon-based anode 108 are porous materials that allow for aqueous fluid flow therethrough in some embodiments.

The electrochemical device 100 illustrates a flow-by and a flow-through configuration. In the flow-by configuration, the input stream 102 flows across (indicated by arrows 122) the surfaces of the electrodes rather than through the electrodes. In the flow-through configuration, the input stream

102 flows through (indicated by arrows 123 the electrodes. The flow-by design provides advantages of lower pressure drop, higher flow rate, equal degradation of carbon electrodes, equivalent pH regions generated for each electrode pair. The flow-through design provides more extreme pH regions and improved control over the outlet pH. In stacked electrochemical devices as shown in FIGS. 23*a*-23*d*, the input stream 102 flows-through the electrodes, flows-by the electrodes, or a combination thereof.

In some embodiments, the electrode stack 118 includes one or more optional current collectors 106 attached to or in contact with one or both of the carbon-based cathode 112 and the carbon-based anode 108. The current collectors 106 are, for example, sandwiched between layers of the carbon-based cathode 112, and between layers of the carbon-based anode 108. The current collectors 106 are electric bridging components that collect electrical current generated at the attached electrode and reduce electrical losses within the electrochemical device 100. In one or more embodiments, the electrode stack 118 is compressed, and the current collectors 106 contact the electrodes. In some embodiments, the electrode is a film or a sheet that is cast onto current collector. The current collector 106 attached to or in contact with the carbon-based cathode 112 and carbon-based anode 108 are the same or different. The current collectors 106 are solid or porous materials. Non-limiting examples of the current collectors 106 are films, layers, metal sheets, foil sheets, or mesh sheets. Non-limiting examples of materials for the current collectors 106 for the carbon-based cathode 112 include graphite, titanium, stainless steel, or a combination thereof. Non-limiting examples of materials of current collectors 106 for the carbon-based anode 108 include graphite, titanium, stainless steel, aluminum, copper, nickel, or a combination thereof. In one or more embodiments, a current collector 106 is attached to or in contact with the carbon-based cathode 112, and a current collector 106 is not attached to or in contact with the carbon-based anode 107.

In embodiments, the current collector 106 attached to either electrode is a planar structure with a thickness of about 0.01 to about 100 millimeters. In some embodiments, the current collector 106 has a thickness of about 0.1 to about 0.4 millimeters. In other embodiments, the current collector 106 has a thickness about or in any range between about 0.01, 0.05, 0.1, 0.15, 0.20, 0.25, 0.30, 0.35, 0.40, 0.45, 0.50, 0.55, 0.60, 0.65, 0.70, 0.75, 0.80, 0.85, 0.90, 1, 5, 10, 15, 20, 25, 30, 35, 40, 45, 50, 55, 60, 65, 70, 75, 80, 85, 90, 95, and 100 millimeters.

In some embodiments, each current collector 106 is a continuous planar structure without an annular hole therethrough, for example. In other embodiments, each current collector 106 is a planar structure with an annular hole therethrough, as shown in FIGS. 23*a*-23*d* for example. In embodiments, the current collector 106 has a thin planar cylindrical shape, with or without an annular hole therethrough. However, the shape of the current collector 106 is not limited to these shapes and can be any shape with the above-described thickness.

In embodiments as shown in FIGS. 23*a*-23*d*, the current collectors 106 are solid (non-porous), and each of the carbon-based cathode 112 and carbon-based anode 108 is porous, which allows for both flow-by (arrows 122) and flow-through (arrows 123 flow path configurations. In other embodiments, the current collectors 106, carbon-based cathode 112, and carbon-based anode 108 are all porous materials, allowing flow-through (arrows 123) the electrode stack 118 of the electrochemical device 200.

In one or more embodiments, the electrode stacks 118 further include a separator 110 arranged between the carbon-based cathode 112 and the carbon-based anode 108. The separator 110 is a dielectric material and prevents physical and electrical contact between the electrodes. Non-limiting examples of dielectric materials for the separator 110 include cellulosic-based materials, silica-based materials, or any combination thereof.

In embodiments, the separator 110 is a planar structure with a thickness of about 1 to about 1000 micrometers. In some embodiments, the separator 110 has a thickness of about 50 to about 250 micrometers. In other embodiments, the separator 110 has a thickness about, less than or in any range between about 1, 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 micrometers.

The thickness of the separator 110 that separates the carbon-based cathode 112 from the carbon-based anode 108 defines the separation distance between the electrodes. Thus, the separation distance between the carbon-based cathode 112 and the carbon-based anode 108 is about 1 to about 1000 micrometers, as described above, in some embodiments. In other embodiments, the separation distance between the carbon-based cathode 112 and the carbon-based anode 108 is about or in any range between about 1, 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 micrometers.

In some embodiments, each separator 110 is a continuous planar structure without an annular hole therethrough, for example. In other embodiments, each separator 110 is a planar structure with an annular hole therethrough, as shown in FIGS. 23*a*-23*d* for example. In embodiments, the separator 110 has a thin planar cylindrical shape, with or without an annular hole therethrough. However, the shape of the separator 110 is not limited to these shapes and can be any shape with the above-described thickness.

In some embodiments, the stacked cell further includes an optional feed spacer 121. A feed spacer 121 (shown in FIG. 23*d* for example) is an additional layer of material between anode and cathode that can optionally be added to create a larger flow channel for the through stream. Non-limiting examples of a form of the feed spacer are a netting or mesh. Non-limiting examples of materials for the feed spacer include polypropylene, polyethylene, nylon, or a combination thereof.

In some embodiments, the stacked cell further includes a membrane 119 or 120 on the cathode and/or on the anode. The membrane on the cathode and/or on the anode further increases the performance and lifetime of the electrochemical cell. The membrane is an ion exchange membrane, and the membrane may be a cation exchange membrane or an anion exchange membrane depending on which electrode the membrane is arranged on. A cation exchange membrane is a membrane that is selectively permeable to cations. An anion exchange membrane is a membrane that is selectively permeable to anions. The membrane is in a form of a film, a layer, a sheet, a coating, or a combination thereof, and the membrane is arranged on a surface of an electrode or is free-standing. The membrane is on, directly on, or in contact with the electrode in some embodiments. In other embodiments, the membrane surrounds the electrode. Non-limiting examples of the ion exchange membrane include those commercially available as NEOSEPTA (Ameridia, Napa, California), or FUMASEP (Fumatec, Bietigheim-Bissingen, Germany).

EXAMPLES

Figure 24:
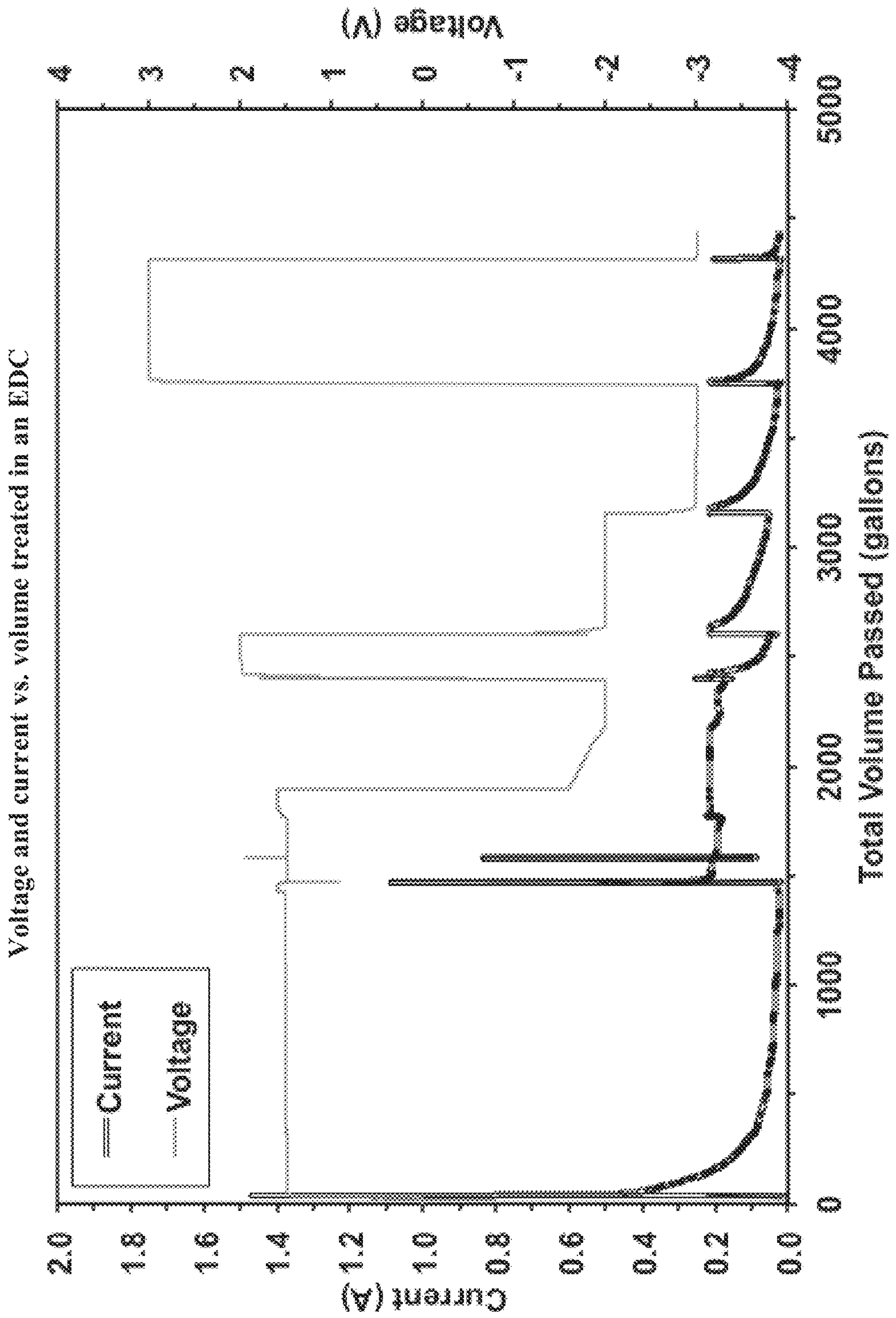
FIG. 24. Applied voltage and current transients as a function of volume treated at a flow rate of 300-500 ml/min for EDC experiments conducted with Calgon as both electrodes. Current spikes at ~1500 and ~1600 gallons are due to noise (inadvertent physical movement of the electrical leads) and can be neglected. At ~1800 gallons, operation was switched from applying a constant voltage to applying a constant current of ~0.2 A, observed as a straight line. The voltage decay (voltage is reading as negative, but the total cell voltage is increasing with constant current) seen at this condition is a consequence of applying a constant current. The subsequent switching also occurred at constant current, but the voltage reached the cutoff value quickly and the system essentially behaved as though at constant voltage.

Performance tests of EDCs were conducted to verify removal of total chlorine, free chlorine, chloramine, and peroxide ($H_2O_2$) using carbon electrodes and voltages of <3.0 V. Measurements were made using analytical test kits. Experiments were conducted with a flow-by cell design and 14 pairs of electrodes in an alternating series of anode-cathode-anode-cathode (variable number of repeats of anode-cathode) anode-cathode (FIGS. 23*a-d*). In the flow-by design shown in FIGS. 23*a-d*, the input stream proceeds through an annular space near the wall of the cell container, then flows centripetally over the electrode surfaces to the axial channel, and is then discharged through the axial channel to the FPC outlet. A positive voltage is applied to the anodes and a negative voltage is applied to the cathodes. The polarity of the voltage applied to a given electrode is periodically switched (converting each anode into a cathode, and each cathode into an anode) to ensure that all electrodes degrade at the same rate and to extend the lifetime of the EDC device. An example is shown in FIG. 24. The polarity-switching interval for a given EDC can be arbitrarily set (e.g., every hour) or can be set based on one or more EDC parameters, e.g., current threshold, voltage threshold, rate of current decrease at constant voltage, percentage of current decrease at constant voltage, rate of voltage decrease at constant current, percentage of voltage decrease at constant current, total volume treated, and concentration of target species in EDC effluent. Preferred polarity-switching points are (i) a percentage decrease in current at a constant applied voltage, (ii) a percentage increase in voltage at a constant applied current, (iii) total volume treated, and (iii) concentration of target species in effluent. Depending on a target species, percentage decreases or increases may be detected before a rise in concentration of the target species in the effluent is detected, or vice versa (see Figures below plotting V vs. concentration of target species in effluent). Three types of carbon were examined. Electrode properties are shown in Table 4.

Capacitive coagulation experiments were conducted to test Cu removal using 16 pairs of carbon electrodes (~13 g of carbon), in which the cathodes were pristine SC and the anodes were nitric acid oxidized SC. The FPC was operated at short-circuit (0 V). A 1 L feed solution of ~100 ppm Cu [$Cu(NO_3)_2$] in direct injection ("DI") $H_2O$ was treated at a flow rate of 20 ml/min. Samples were analyzed by inductively coupled plasma (ICP) with optical emission spectrometer (OES) and the results in Table 9 show that approximately ⅓ of the Cu was removed in a single pass.

TABLE 9

ICP-OES results for $Cu^{2+}$ removal

| Sample | $Cu^{2+}$ Concentration (ppm) |
|---|---|
| Untreated | 96 |
| Treated | 66 |

Figure 25A:
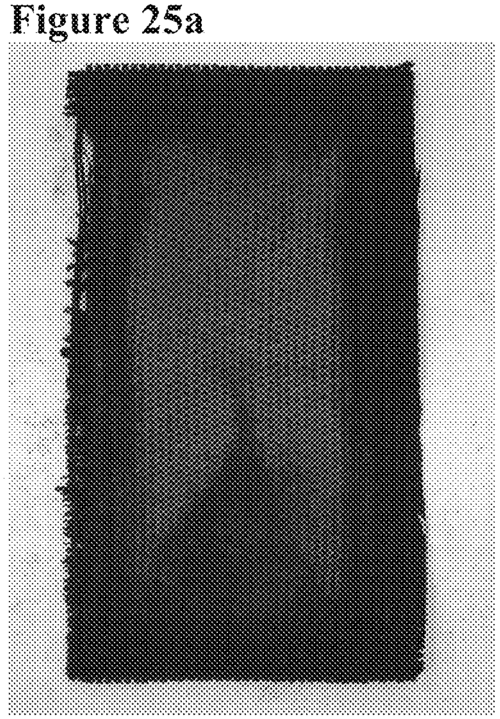
FIG. 25*a* shows copper deposition on the cathode at an applied potential of 1.2 V.
Figure 25B:
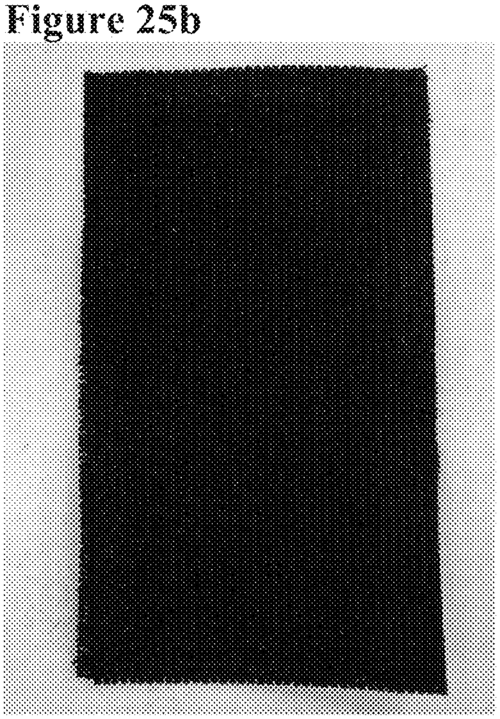
FIG. 25*b* shows no copper deposition on the cathode at an applied potential of 1.2 V. The carbon electrodes are shown as black and the copper as gray in the grayscale equivalent of the photo. Color photograph of copper deposited on the cathode available.

Capacitive coagulation experiments were conducted to test Cu removal using 12 pairs of carbon electrodes (~10 g of carbon), in which the cathodes and anodes were both pristine SC. The FPC was operated at an applied potential of 1.2 V on the cathode. A 18.5 L feed solution of ~50 ppm Cu [$Cu(NO_3)_2$] and ~50 ppm Ca ($CaCl_2$)) in DI $H_2O$ was treated at a flow rate of 20 ml/min. During operation Cu plated out of solution onto the cathode, shown as a grayish deposit in FIG. 25*a*. FIG. 25*b* shows when there is no Cu deposition on the cathode.

Flow-by capacitive coagulation experiments were conducted to test Cu removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~2 ppm Cu [$Cu(NO_3)_2$] in tap $H_2O$ was treated at a flow rate of 100 mL/min. Samples were taken before and after filtration with the cell and the $Cu^{2+}$ concentration measured with ICP-OES. ~78% Cu removal was achieved at all conditions tested (Table 10).

TABLE 10

ICP-OES results for $Cu^{2+}$ removal from tap water

| Sample | $Cu^{2+}$ Concentration (ppm) | Removal (%) |
|---|---|---|
| Untreated | 2.30 | n/a |
| Treated at 0.8 V | 0.52 | 77.5 |
| Treated at 1.0 V | 0.52 | 77.6 |
| Treated at 1.2 V | 0.52 | 77.6 |

Flow-by capacitive coagulation experiments were conducted to test Cu removal at low pH using 14 pairs of carbon electrodes (~30 g of carbon), in which the cathodes were nitric acid oxidized KN and the anodes were pristine carbon. The FPC was operated at 1.2 V. A 1.5 L feed solution of ~10 ppm Cu [$Cu(NO_3)_2$] in tap $H_2O$ was treated at a flow rate of 100 mL/min. The pH was adjusted to 2.8 using concentrated $H_2SO_4$. Samples were taken before and after filtration with the cell and the $Cu^{2+}$ concentration measured with ICP-OES. Cu was very effectively removed (Table 11), with a removal of 99.8%.

TABLE 11

ICP-OES results for $Cu^{2+}$ removal from tap water at pH 2.8

| Sample | $Cu^{2+}$ Concentration (ppm) | Removal (%) |
|---|---|---|
| Untreated | 10.29 | n/a |
| Treated | 0.02 | 99.8 |

Flow-by capacitive coagulation experiments were conducted to test Ni removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~50 ppm Ni [$Ni(Cl)_2$] in tap $H_2O$ was treated at a flow rate of 100 mL/min. Samples were taken before and after filtration with the cell and the $Ni^{2+}$ concentration measured with ICP-OES. The highest removal of ~63% was achieved at 1.2 V (Table 12).

TABLE 12

ICP-OES results for $Ni^{2+}$ removal from tap water

| Sample | $Ni^{2+}$ Concentration (ppm) | Removal (%) |
|---|---|---|
| Untreated | 49.21 | n/a |
| Treated at 0.8 V | 36.96 | 24.9 |
| Treated at 1.0 V | 24.56 | 50.1 |
| Treated at 1.2 V | 18.36 | 62.7 |

Figure 26:
FIG. 26. Rust colored Fe-oxide deposits on the separators at the cathode surface after experiment. The carbon electrodes are shown as black and the iron as gray deposits on the white separators in the grayscale equivalent of the photo. Color photograph of copper deposited on the cathode available.

Capacitive coagulation experiments were conducted to test Fe removal using 16 pairs of carbon electrodes (~14 g of carbon), in which the cathodes were pristine SC and the anodes were nitric acid oxidized SC. The cell was operated at short-circuit (0 V). A 18.5 L feed solution of 100 ppm Fe [$Fe(Cl)_3$] or 25 ppm $FeCl_3$ in DI $H_2O$ was treated at a flow rate of 20 ml/min. The concentration of Fe steadily decreased with treatment, ICP-OES results are shown in Table 13. For the higher concentration experiment (100 ppm Fe), Fe-oxides formed at the cathode as rust-colored precipitates on the separators, shown as a grayish deposit (FIG. 26).

TABLE 13

ICP-OES results for $Fe^{2+}$ removal

| Sample | $Fe^{2+}$ Concentration (ppm) |
|---|---|
| Untreated | 5.73 |
| Treated | 0.10 |

Flow-by capacitive coagulation experiments were conducted to test Fe removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~15 ppm Fe [$Fe(Cl)_3$] in tap $H_2O$ was treated at a flow rate of 100 mL/min. Samples were taken before and after filtration with the cell and the $Fe^{3+}$ concentration measured with ICP-OES. ~99.9% Fe removal was achieved at all conditions tested (Table 14).

TABLE 14

ICP-OES results for $Fe^{2+}$ removal from tap water

| Sample | $Fe^{2+}$ Concentration (ppm) | Removal (%) |
|---|---|---|
| Untreated | 15.37 | n/a |
| Treated at 0.8 V | 0.015 | 99.9 |
| Treated at 1.0 V | 0.012 | 99.9 |
| Treated at 1.2 V | 0.013 | 99.9 |

Flow-by capacitive coagulation experiments were conducted to test Mn removal using 14 pairs of carbon electrodes (~30 g of carbon), in which the cathodes were nitric acid oxidized KN and the anodes were pristine carbon. The FPC was operated at applied potentials of 0.8, 1.0, and 1.2 V. A 1.5 L feed solution of ~20 ppm Mn [$Mn(SO_4)$] in tap $H_2O$ was treated at a flow rate of 100 mL/min. Samples were taken before and after filtration with the cell and the $Mn^{2+}$ concentration measured with ICP-OES. ~99.8% Mn removal was achieved at 1.2 V (Table 15).

TABLE 15

ICP-OES results for $Mn^{2+}$ removal from tap water

| Sample | $Mn^{2+}$ Concentration (ppm) | Removal (%) |
|---|---|---|
| Mn Feed | 18.93 | n/a |
| Treated at 0.8 V | 8.43 | 55.5 |
| Treated at 1.0 V | 0.53 | 97.2 |
| Treated at 1.2 V | 0.041 | 99.8 |

Flow-by capacitive coagulation experiments were conducted to test Al removal using 14 pairs of carbon electrodes (~30 g of carbon), in which the cathodes were nitric acid oxidized KN and the anodes were pristine carbon. The FPC was operated at applied potentials of 0.4, 0.8, and 1.2 V. A 1.5 L feed solution of ~30 ppm Al from a wastewater sample was treated at a flow rate of 100 mL/min. Samples were taken before and after filtration with the cell and the $Al^{3+}$ concentration measured with ICP-OES. ~99.9% Al removal was achieved at 0.4 V (Table 16).

TABLE 16

ICP-OES results for $Al^{3+}$ removal from tap water

| Sample | $Al^{3+}$ Concentration (ppm) | Removal (%) |
|---|---|---|
| Feed | 31.58 | n/a |
| Treated at 0.4 V | 0.05 | 99.9 |
| Treated at 0.8 V | 5.84 | 81.5 |
| Treated at 1.2 V | 12.05 | 61.8 |

Flow-by capacitive coagulation experiments were conducted to test Zn removal using 14 pairs of carbon electrodes (~30 g of carbon), in which the cathodes were nitric acid oxidized KN and the anodes were pristine carbon. The FPC was operated at applied potentials of 0.4, 0.8, and 1.2 V. A 1.5 L feed solution of ~35 ppm Zn [$Zn(Cl_2)$] in tap $H_2O$ was treated at a flow rate of 100 mL/min. Samples were taken before and after filtration with the cell and the $Zn^{2+}$ concentration measured with ICP-OES. ~40.8% Zn removal was achieved at 1.2 V (Table 17).

TABLE 17

ICP-OES results for $Zn^{2+}$ removal from tap water

| Sample | $Zn^{2+}$ Concentration (ppm) | Removal (%) |
|---|---|---|
| Feed | 35.39 | n/a |
| Treated at 0.8 V | 23.75 | 32.9 |
| Treated at 1.0 V | 22.95 | 35.1 |
| Treated at 1.2 V | 20.94 | 40.8 |

Figure 27A:
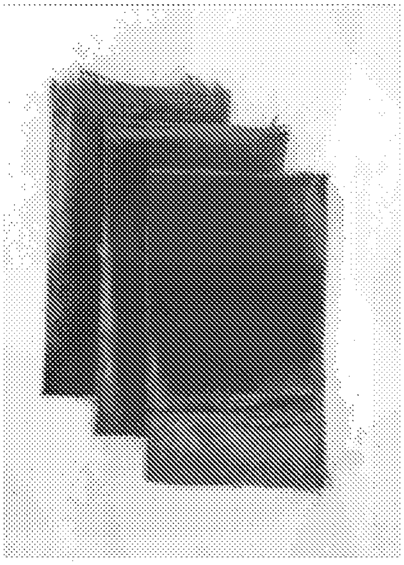
FIG. 27*a* shows carbon cloth with white precipitates.
Figure 27B:
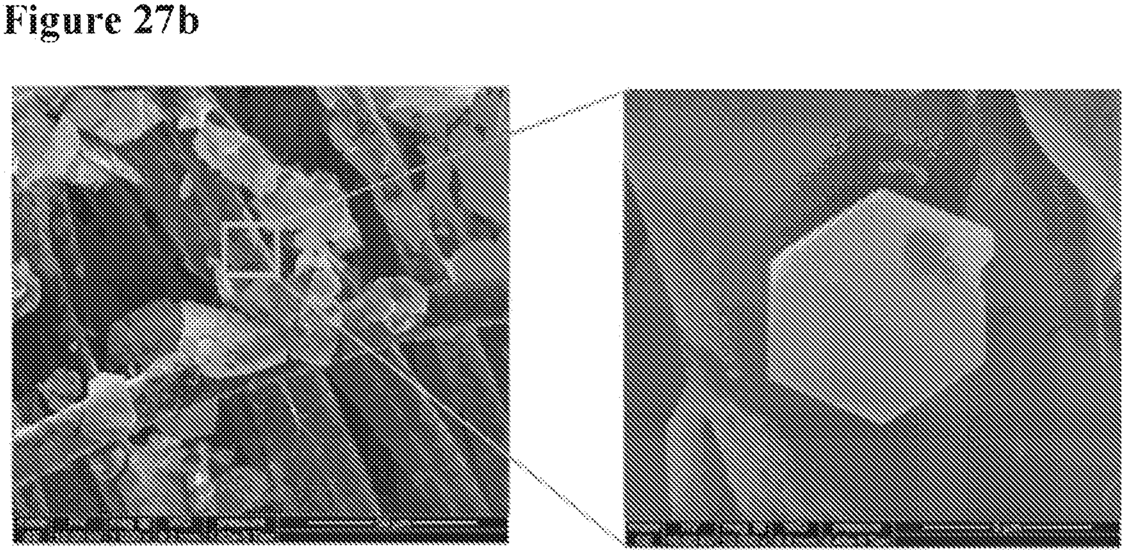
FIG. 27*b* shows scanning electron microscopy (SEM) micrographs of the cloth showing a Pb crystal.
Figure 28:
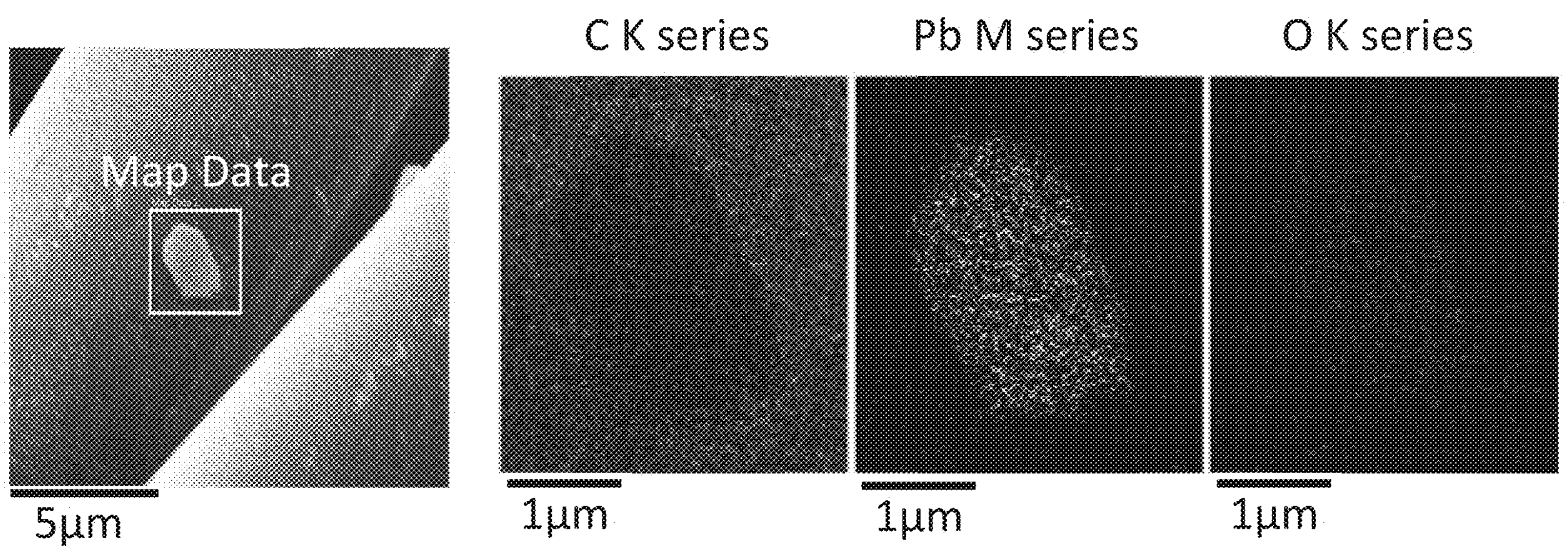
FIG. 28. EDX mapping of a Pb crystal from FIG. 27*a-b* confirming that the crystal is lead oxide by the presence of both lead and oxygen. Carbon (C), lead (Pb), and oxygen (O) are mapped in the three panels to the right, represented by the lightest contrast in each corresponding gray scale image. Color photograph of EDX mapping is available.

To study the physical adsorption of Pb on pristine and oxidized Kynol, packed columns were filled with ~5 g of carbon and 1 L of ~100 ppm Pb [$Pb(NO_3)_2$] in DI $H_2O$ was filtered at a flow rate of 20 mL/min. The results in Table 18 provide evidence that Pb is physically adsorbing to the carbon. Additionally, there was considerable white precipitate on the pristine Kynol electrodes after filtration (FIGS. 27*a* and *b*) that were confirmed by energy dispersive X-ray spectroscopy (EDX) to be lead oxide (FIG. 28).

TABLE 18

ICP results for treated water after flowing through packed columns

| | $Pb^{2+}$ Concentration (ppm) | |
|---|---|---|
| Sample | Pristine | Nitric acid oxidized |
| Feed | 73.87 | 94.94 |
| $1^{st}$ pass | 6.12 | 32.33 |
| 4 h | 17.11 | 36.45 |

*Conductivity reading was 0 μS/cm

Flow-through capacitive coagulation experiments with a 1 L feed solution of ~50 ppb Pb [$Pb(NO_3)_2$] in tap $H_2O$, 12 pairs of pristine carbon electrodes (~10 g), and a flow rate of 20 mL/min, showed Pb removal to well below the federal action level of 15 ppb in a single pass (Table 19 and Table 20). The cell was operated at short-circuit (0 V) and an applied potential of 0.8 and 1.2 V. Pb was spiked in several times to test removal. The experiments in Table 20 were performed with pristine anodes and nitric acid oxidized cathodes at 1.2 V. Samples were taken before and after filtration through the cell and the $Pb^{2+}$ concentration measured with a handheld sensor from ANDalyze and/or inductively coupled plasma mass spectroscopy (ICP-MS). "\" in the Tables means "not measured".

TABLE 19

Results for feed and treated water with Kynol anodes and cathodes

| Sample | $Pb^{2+}$ Concentration (ppb)* | ICP-MS (ppb) |
|---|---|---|
| Feed | 45, 58 | 44.96 |
| 1.2 V | <2 | 1.21 |
| Spike 1 | ~50 | \ |
| 0.8 V | <2 | \ |
| Spike 2 | ~50 | \ |
| 0.8 V | <2 | \ |
| Spike 3 | ~50 | \ |
| 1.2 V | <2 | \ |
| Spike 4 | 32 | \ |
| 1.2 V Single pass | 3 | \ |

*Measurements taken with ANDalyze sensor

TABLE 20

Results for feed and treated water with pristine Kynol anodes and nitric acid oxidized Kynol cathodes

| Sample | $Pb^{2+}$ Concentration (ppb)* | ICP-MS (ppb) |
|---|---|---|
| Feed (50 ppb Pb) | 21, 44, 51 | 51.72 |
| sample 1 | <2 | 0.2 |
| sample 2 | <2 | \ |
| Spike 1 | >100 | \ |
| sample 1 | 12, 17 | \ |
| sample 2 | <2 | \ |
| sample 3 | <2 | \ |
| Spike 2 | ~50 | \ |
| sample 1 | <2 | \ |
| sample 2 | <2 | \ |
| sample 3 | <2 | \ |
| sample 4 | 3 | \ |
| Spike 4 | 23 | 19.9 |
| Single pass | <2 | 2.18 |

*Measurements taken with ANDalyze sensor

Flow-by capacitive coagulation experiments with 1.5 L feed solutions of ~5 to ~275 ppb Pb [$Pb(NO_3)_2$] in tap $H_2O$, 14 pairs of carbon electrodes (~30 g), pristine anodes and nitric acid oxidized cathodes, and a flow rate of 100 mL/min, also showed Pb removal to well below the federal action level of 15 ppb in a single pass (Table 21) The cell was operated at an applied potential of 1.2 V. Samples were taken before and after filtration with the cell and the $Pb^{2+}$ concentration measured with a handheld sensor from ANDalyze and/or ICP-MS. From the results it was made clear that Pb was being permanently removed from solution.

TABLE 21

Results for feed and treated water with pristine Kynol anodes and nitric acid oxidized Kynol cathodes

| Sample | $Pb^{2+}$ Concentration (ppb)* | ICP-MS (ppb) |
|---|---|---|
| Feed | ~50 | \ |
| sample 1 | <2 | \ |
| sample 2 | <2 | \ |
| sample 3 | <2 | \ |
| Spike 1 | >100 | \ |
| sample 1 | <2 | \ |
| Spike 2 | 55 | 54.32 |
| sample 1 | <2 | 0.05 |
| Spike 3 | 74 | \ |
| sample 1 | <2 | \ |
| Spike 4 | 39 | \ |
| sample 1 | <2 | \ |
| Spike 5 | 17 | 5.63 |
| Single pass-1.2 V | <2 | 1.45 |
| Spike 6-15 ppb Pb | 11 | \ |
| sample 1 | 2 | \ |
| Spike 7-150 ppb Pb | 300 | 273.22 |
| sample 1 | 12 | 12.17 |

*Measurements taken with ANDalyze sensor

Flow-through capacitive coagulation experiments with a 1 L feed solution of ~50 ppb Pb [$Pb(NO_3)_2$] in tap $H_2O$, 12 pairs of carbon electrodes (~10 g), and a flow rate of 20 mL/min were carried out at open-circuit voltage (OCV), short-circuit (0 V), and applied potentials of 0.4 to 1.4 V with 0.2 V increments. Various oxygen-containing surface groups were tested, as well as carbons with differing properties. Samples were taken after a single pass through the cell and the $Pb^{2+}$ concentration measured with a handheld sensor from ANDalyze and/or ICP-MS.

The experimental results in Table 22 are for pristine anodes and citric acid oxidized cathodes. Pb was removed at OCV and short-circuit, but was more effectively removed under applied potential. The best result was obtained at 1.2 V, where 92% of the Pb was removed.

TABLE 22

Pb removal results for pristine Kynol anodes and citric acid oxidized Kynol cathodes

| Sample | $Pb^{2+}$ Concentration (ppb)* | ICP-MS (ppb) |
|---|---|---|
| Spike 1-50 ppb | 90 | 40.09 |
| Single pass-OCV | 22 | 13.44 |
| Spike 2-50 ppb | 72 | 57.28 |
| Single pas-OCV | 12 | 16.14 |
| Spike 3-50 ppb | 104 | 68.40 |
| Single pass-short-circuit | 5 | 12.02 |
| Spike 4-50 ppb | \ | 55. |
| Single pass-short-circuit | \ | 10.14 |
| Spike 5-50 ppb | 86 | 67.98 |
| Single pass-0.4 V | 14 | 13.36 |
| Spike 6-50 ppb | 72, 90 | 61.41 |
| Single pass-0.6 V | 2, 5 | 7.26 |
| Spike 7-50 ppb | 32 | 26.94 |
| Single pass-0.8 V | 13 | 8.99 |
| Spike 8-50 ppb | 52 | 50.70 |
| Single pass-1.0 V | 31 | 10.04 |
| Spike 9-50 ppb | <2 | 38.04 |
| Single pass-1.2 V | \ | 2.89 |
| Spike 10-50 ppb | \ | 29.91 |
| Single pass-1.4 V | \ | 7.26 |
| Spike 11 (150 ppb) | \ | 129.41 |
| Single pass-1.2 V | \ | 5.32 |

*Measurements taken with ANDalyze sensor

The experimental results in Table 23 are for pristine anodes and nitric acid oxidized cathodes. The measured concentrations of Pb are below the spiked value of ~50 ppb.

The pH was close to 9 and there was likely insoluble Pb species not being accounted for in the measurement. An orange precipitate was also observed on the last pristine piece of carbon (anode), visible on the perimeter of the filter paper.

TABLE 23

Pb removal results for pristine Kynol anodes and nitric acid oxidized Kynol cathodes

| Sample | $Pb^{2+}$ Concentration (ppb)* | ICP-MS (ppb) |
|---|---|---|
| Spike 1-50 ppb | >100, 112 | 58.33 |
| Single pass-OCV | >100, 48 | 27.51 |
| Spike 2-50 ppb | \ | 13.69, 12.15 |
| Single pass-OCV | \ | 26.60, 25.19 |
| Spike 3-50 ppb | 6 | 5.70 |
| Single pass-short-circuit | <2 | 5.40 |
| Spike 4-50 ppb | <2, 30 | 4.06 |
| Single pass-short-circuit | 10 | 5.00 |
| Spike 5-50 ppb | <2, 15 | 2.52 |
| Single pass-0.4 V | <2 | 4.39 |
| Spike 6-50 ppb | \ | 3.09 |
| Single pass-0.6 V | \ | 1.95 |
| Spike 7-50 ppb | <2 | 2.42 |
| Single pass-0.8 V | 8 | 2.24 |
| Spike 8-50 ppb | \ | 24.38 |
| Single pass-1.0 V | \ | 6.67 |
| Spike 9-50 ppb | \ | 17.87 |
| Single pass-1.2 V | \ | 9.51 |
| Spike 10-50 ppb | \ | 3.83 |
| Single pass-1.4 V | \ | 22.31 |
| Spike 11 (150 ppb) | \ | 10.52 |
| Single pass-1.2 V | \ | 2.92 |

*Measurements taken with ANDalyze sensor

The experimental results in Table 24 are for pristine anodes and oven oxidized cathodes at 340° C. for 72 h. Pb removal was observed at short-circuit and 1.2 V. The dissolved oxygen (DO) was also monitored throughout the experiment and decreased with applied voltage, suggesting that oxygen is being reduced to $H_2O_2$ (Table 25).

TABLE 24

Pb removal results for pristine Kynol anodes and oven oxidized Kynol cathodes

| Sample | $Pb^{2+}$ Concentration (ppb)* | ICP-MS (ppb) |
|---|---|---|
| Spike 1-50 ppb | 19 | 24.9 |
| Single pass-OCV | 3 | 3.7 |
| Spike 2-50 ppb | \ | 9.4 |
| Single pass-short-circuit | \ | 0.9 |
| Spike 7-50 ppb | >100 | 34.0 |
| Single pass-1.2 V | <2 | 0.8 |

*Measurements taken with ANDalyze sensor

TABLE 25

Conductivity (κ), pH and DO values for samples listed in Table 2

| Sample | κ (μS/cm) | pH | DO (%) |
|---|---|---|---|
| Spike 1-OCV | 450 | 4.90 | 46.3 |
| Spike 2-short-circuit | 473 | 6.15 | 59.8 |
| Spike 3-1.2 V | 217 | 6.04 | 17.3 |

Three carbons were tested: Kynol, Zorflex, and Fuel Cell Earth. Their properties are listed in Table 26. Results using Zorflex are shown in Table 27 and Table 28. The DO decreased and lead removal improved with applied voltage.

TABLE 26

Carbon properties

| Carbon | Conductivity (S/cm) | Pore Size (nm) | Surface Area ($m^2/g$) |
|---|---|---|---|
| Zorflex | 0.2 | 1.2-3 | 1000-2000 |
| Kynol | 1.2 | 2.2 | 2000 |
| Fuel Cell Earth | 900 | N/A | <2 |

TABLE 27

Pb removal results for pristine Zorflex anodes and nitric acid oxidized Zorflex cathodes

| Sample | $Pb^{2+}$ Concentration (ppb)* | ICP-MS (ppb) |
|---|---|---|
| Spike 1 | >100 | 36.1 |
| Single pass-OCV | 23 | 8.1 |
| Spike 2 | ~50 | 59.7 |
| Single pass-short-circuit | \ | 9.6 |
| Spike 7 | ~50 | 67.5 |
| Single pass-1.2 V | 17 | 5.0 |

*Measurements taken with ANDalyze sensor

TABLE 28

Conductivity (κ), pH, and DO values for samples listed in Table 26

| Sample | κ (μS/cm) | pH | DO (%) |
|---|---|---|---|
| Spike 1-OCV | 644 | 6.16 | 64.2 |
| Spike 2-short-circuit | 639 | 6.33 | 65.5 |
| Spike 3-0.4 V | 611 | 6.55 | 68.3 |
| Spike 4-0.6 V | 591 | 6.60 | 54.4 |
| Spike 5-0.8 V | 626 | 6.84 | 58.4 |
| Spike 6-1.2 V | 440 | 6.21 | 6.6 |

Results using Kynol are shown in Table 18-Table 24, as well as below in Table 29, Table 32 and Table 36. For the results shown in Table 29 only OCV, short-circuit, and an applied potential of 1.2 V were tested. Lead removal to very low levels even at a starting concentration of ~10 ppb was achieved, and the DO concentration dropped to below 6% at 1.2 V. SEM/EDX confirmed Pb deposits on the electrodes (FIG. 13).

Fuel Cell Earth (www.fuelcellstore.com) is a graphitic cloth and is highly conductive. Results are shown in Table 30 and Table 31. There was no measurable current in either case, owing to its very low surface area. When the cell was taken apart after the first experiment (Table 30) there was orange precipitate on all filter paper, regardless of location in the cell. The experiment was repeated with pristine carbon for both the anode and cathode, and samples were taken after 3 h of cycling as opposed to a single pass (Table 31). In this case there was no lead removal at open circuit, some at short-circuit, and much more at an applied potential of 1.2 V. The DO remained unchanged regardless of applied potential, and $H_2O_2$ was measured to be 0 ppm at 1.2 V. Pb removal is likely occurring due to pH swings at the electrode surface and not by reacting with $H_2O_2$.

TABLE 29

Pb removal results for pristine Kynol anodes and nitric acid oxidized cathodes

| Sample | κ (μS/cm) | pH | DO (%) | $Pb^{2+}$ Concentration (ppb) |
|---|---|---|---|---|
| Spike 1 | 508 | 6.30 | 43.9 | 29.1 |
| Single pass-OCV | 423 | 6.91 | 56.4 | 5.3 |
| Spike 2 | \ | \ | \ | 34.6 |
| Single pass-short-circuit | 421 | 7.05 | 60.6 | 7.7 |
| Spike | 274 | 6.46 | 20.0 | 36.8 |
| Single pass-1.2 V | 270 | 6.54 | 15.6 | 5.4 (3*) |
| Spike 4 | 305 | 6.35 | 16.2 | 14.6 |
| Single pass-1.2 V | 301 | 6.40 | 14.7 | 5.2 |
| Spike 5 | 299 | 6.33 | 12.2 | 8.9 |
| Single pass-1.2 V | 297 | 6.29 | 12.2 | 0.6 (<2*) |
| Spike 6-1.2 V | 326 | 6.10 | 10.2 | \ |

*Measurements taken with ANDalyze sensor

TABLE 30

Pb removal results for pristine Fuel Cell Earth anodes and nitric acid oxidized Fuel Cell Earth cathodes

| Sample | $Pb^{2+}$ Concentration (ppb)* | ICP-MS (ppb) |
|---|---|---|
| Spike 1 | 48 | 31.1 |
| Single pass-OCV | 3 | 3.5 |
| Spike 4 | \ | 85.7 |
| Single pass-short-circuit | 17 | 15.2 |
| Spike 9 | 65 | 42.0 |
| Single pass-1.2 V | <2 | 2.4 |
| Spike 14 | ~50 | \ |
| Single pass-80 ml/min 1.2 V | <2 | 1.7 |

*Measurements taken with ANDalyze sensor

TABLE 31

Pb removal results for pristine Fuel Cell Earth anodes and cathodes

| Sample | κ (μS/cm) | pH | DO (%) | $Pb^{2+}$ Concentration (ppb)* |
|---|---|---|---|---|
| Spike 1 | \ | \ | \ | 125 |
| Single pass-OCV | 671 | 7.73 | 61.4 | 125 |
| Spike 2 | 671 | 7.73 | 61.4 | 125 |
| Single pass-short-circuit | 562 | 7.87 | 66.2 | 85 |
| Spike 3 | 562 | 7.87 | 66.2 | 85 |
| Single pass-1.2 V | \ | \ | \ | 28 |
| 3 h-1.2 V | 596 | 8.11 | 68.0 | 3 |
| Spike 4 | 671 | 8.28 | 71.4 | ~150 |
| 3 h-OCV | 670 | 8.29 | 70.4 | 146 |
| Spike 5 | 670 | 8.29 | 70.4 | 146 |
| 3 h-1.2 V | 627 | 818 | 71.1 | 5 |

*Measurements taken with ANDalyze sensor

The same series of experiments as described above was conducted with Pb spiked into synthetic tap water (Table 32 and Table 33 This water did not contain any carbonates and had a similar concentration of other ionic species in our tap water. Pb removal was observed at OCV and short-circuit, with slightly more removal at 1.2 V. The DO concentration was low throughout the experiment.

TABLE 32

Pb removal results for pristine Kynol anodes and nitric acid oxidized cathodes in synthetic tap water

| Sample | $Pb^{2+}$ Concentration (ppb)* | ICP-MS (ppb) |
|---|---|---|
| Spike 1 | 63 | 58.7 |
| Single pass-OCV | <2 | 6.1 |
| Spike 2 | >100 | 86.5 |
| Single pass-1.2 V | 5 | 6.4 |
| Spike 3 | \ | 12.7 |
| Single pass-1.2 V | \ | 3.6 |
| Spike 7 | 31 | \ |
| Single pass-0.6 V | 11 | \ |

*Measurements taken with ANDalyze sensor

TABLE 33

Conductivity (κ), pH and DO values for samples listed in Table 31

| Sample | κ (μS/cm) | pH | DO (%) |
|---|---|---|---|
| Spike 1-OCV | 468 | 5.16 | 7.30 |
| Spike 2-1.2 V | 350 | 6.02 | 5.94 |
| Spike 3-1.2 V | 329 | 5.89 | 5.22 |
| Spike 7-0.6 V | 452 | 6.12 | 6.01 |

Breakthrough curves were obtained for packed columns of pristine or nitric acid oxidized carbon (~5 g) and 1 L of ~150 ppb Pb [$Pb(NO_3)_2$] tap $H_2O$ was filtered at a flow rate of 20 mL/min (Table 34 and Table 35). In this case, Pb removal is occurring via physical adsorption (passive filtration) as opposed to capacitive adsorption and coagulation (active filtration) with our device. The initial Pb concentration decreases dramatically, but both carbons saturate quickly at ~0.3 L of water treated and become ineffective. Pristine carbon appears to be more effective for physical adsorption of lead as compared to oxidized carbon at the conditions tested. To determine when a flow-through embodiment of a FPC device becomes saturated, 5 gallons of water were treated at 1.2 V in a single pass with 12 pairs of electrodes (~10 g) at 20 mL/min. Sustained performance for 5 gallons of water treated was obtained (Table 36). The concentration of lead remained low after filtration, whereas the concentration of calcium ($Ca^{2+}$) was approximately constant, demonstrating a selectivity >99% for lead. This experiment was repeated with a flow-by device where 5 gallons of water were treated at 1.2 V in a single pass with 14 pairs of electrodes (~30 g) at 100 mL/min (Table 37). Pb removal was maintained for the total volume passed, even from an extremely high starting Pb concentration.

TABLE 34

Results for treated water after flowing through packed column of pristine Kynol (reduced carbon)

| Sample | $Pb^{2+}$ Concentration (ppb)* |
|---|---|
| Feed | 120 |
| 1 min | 5 |
| 3 min | 13 |
| 5 min | 41 |
| 15 min | 66 |

TABLE 34-continued

| Results for treated water after flowing through packed column of pristine Kynol (reduced carbon) | |
|---|---|
| Sample | $Pb^{2+}$ Concentration (ppb)* |
| 30 min | 46 |
| 45 min | 56 |

*Measurements taken with ANDalyze sensor

TABLE 35

| Results for treated water after flowing through packed column of nitric acid oxidized Kynol (oxidized carbon) | |
|---|---|
| Sample | $Pb^{2+}$ Concentration (ppb)* |
| Feed | 178 |
| 1 min | <2 |
| 15 min | 128 |
| 30 min | 116 |
| 45 min | 106 |

*Measurements taken with ANDalyze sensor

TABLE 36

Results for 5 gallons of treated water with pristine Kynol anodes and nitric acid oxidized cathodes from ~300 ppb Pb feed solution

| | | | | $Pb^{2+}$ Concentration | | $Ca^{2+}$ Concentration |
|---|---|---|---|---|---|---|
| Sample | κ (μs/cm) | pH | DO (%) | ANDalyze (PPb) | ICP-MS (ppb) | ICP-MS (ppb) |
| Feed | 458 | 7.00 | 17.3 | 275 | 295.72 | 42.21 |
| 1 gallon | 470 | 7.10 | 17.2 | <2 | 0.92 | 42.29 |
| 2 gallons | 470 | 7.14 | 16 | <2 | 0.50 | 44.72 |
| 3 gallons | 479 | 7.09 | 11.4 | <2 | 0.15 | 44.83 |
| 4 gallons | 488 | 7.25 | 10.4 | <2 | 0.19 | 47.05 |
| 5 gallons | \ | \ | \ | <2 | 1.53 | 47.27 |

TABLE 37

Results for 5 gallons of treated water with pristine Kynol anodes and nitric acid oxidized cathodes from ~10,000 ppb Pb feed solution

| Sample | $Pb^{2+}$ Concentration (ppb)* | ICP-MS (ppb) |
|---|---|---|
| Feed | ~10,000 | 2149.42 |
| 1 gallon | <2 | 0.28 |
| 2 gallons | \ | 0.29 |
| 3 gallons | \ | 0.38 |
| 4 gallons | \ | 0.49 |
| 5 gallons | <2 | 0.58 |

*Measurements taken with ANDalyze sensor

A flow-by capacitive coagulation experiment with a 1.5 L feed solution of ~150 ppb Pb $[Pb(NO_3)_2]$ in tap $H_2O$, 14 pairs of carbon electrodes (~30 g), and a flow rate of 300 mL/min was carried out at and applied potential 1.2 V (Table 38). Samples were taken before and after a single pass through the cell and the $Pb^{2+}$ concentration measured with a handheld sensor from ANDalyze. The treated sample was at the limit of detection of the sensor.

TABLE 38

Lead removal at 300 mL/min

| Sample | $Pb^{2+}$ Concentration (ppb) | Removal (%) |
|---|---|---|
| Untreated | ~150 | n/a |
| Treated | 2 | 97.73 |

A flow-by capacitive coagulation experiment with a 1.5 L feed solution of ~150 ppb Pb $[Pb(NO_3)_2]$ in tap $H_2O$ at a pH of 2.83, adjusted with concentrated $H_2SO_4$, 14 pairs of carbon electrodes (~30 g), and a flow rate of 100 mL/min was carried out at and applied potential 1.2 V (Table 39). Samples were taken before and after a single pass through the cell and the $Pb^{2+}$ concentration measured with a hand-held sensor from ANDalyze. The treated sample was below the limit of detection of the sensor.

TABLE 39

Lead removal at pH 2.83

| Sample | $Pb^{2+}$ Concentration (ppb) | Removal (%) |
|---|---|---|
| Untreated | 88 | n/a |
| Treated | <2 | 97.73 |

A flow-by capacitive coagulation experiment with a 1.5 L feed solution of ~150 ppb Pb in a Pb-acid battery manufacturer wastewater sample, 14 pairs of carbon electrodes (~30 g), and a flow rate of 100 mL/min was carried out at and applied potential 1.2 V (Table 40). Samples were taken before and after a single pass through the cell and the $Pb^{2+}$ concentration measured with a handheld sensor from ANDalyze. The effluent was well below the assigned Pb discharge limit of 0.6 ppm.

TABLE 40

Lead removal at pH 2.83

| Sample | $Pb^{2+}$ Concentration (ppb) | Removal (%) |
|---|---|---|
| Untreated | 88 | n/a |
| Treated | <2 | 97.73 |

A rolled cell design was used for capacitive coagulation experiments with a 1.5 L feed solution of ~150 ppb Pb $[Pb(NO_3)_2]$ in tap $H_2O$, ~14 g of carbon electrodes, pristine anodes and nitric acid oxidized cathodes, and flow rates of 50, 100, and 200 mL/min, all showed Pb removal to below the federal action level of 15 ppb in a single pass (Table 41). The cell was operated at an applied potential of 1.2 V. Samples were taken before and after filtration with the cell and the $Pb^{2+}$ concentration measured with a handheld sensor from ANDalyze.

TABLE 41

Lead removal results for a rolled cell design

| Sample | $Pb^{2+}$ Concentration (ppb) | Removal (%) |
|---|---|---|
| Untreated | 122 | n/a |
| Treated at 50 ml/min | 8 | 93.4 |
| Untreated | ~150 | n/a |
| Treated at 100 ml/min | 8 | 94.7 |
| Untreated | ~150 | n/a |
| Treated at 200 ml/min | 13 | 91.3 |

Figure 29:
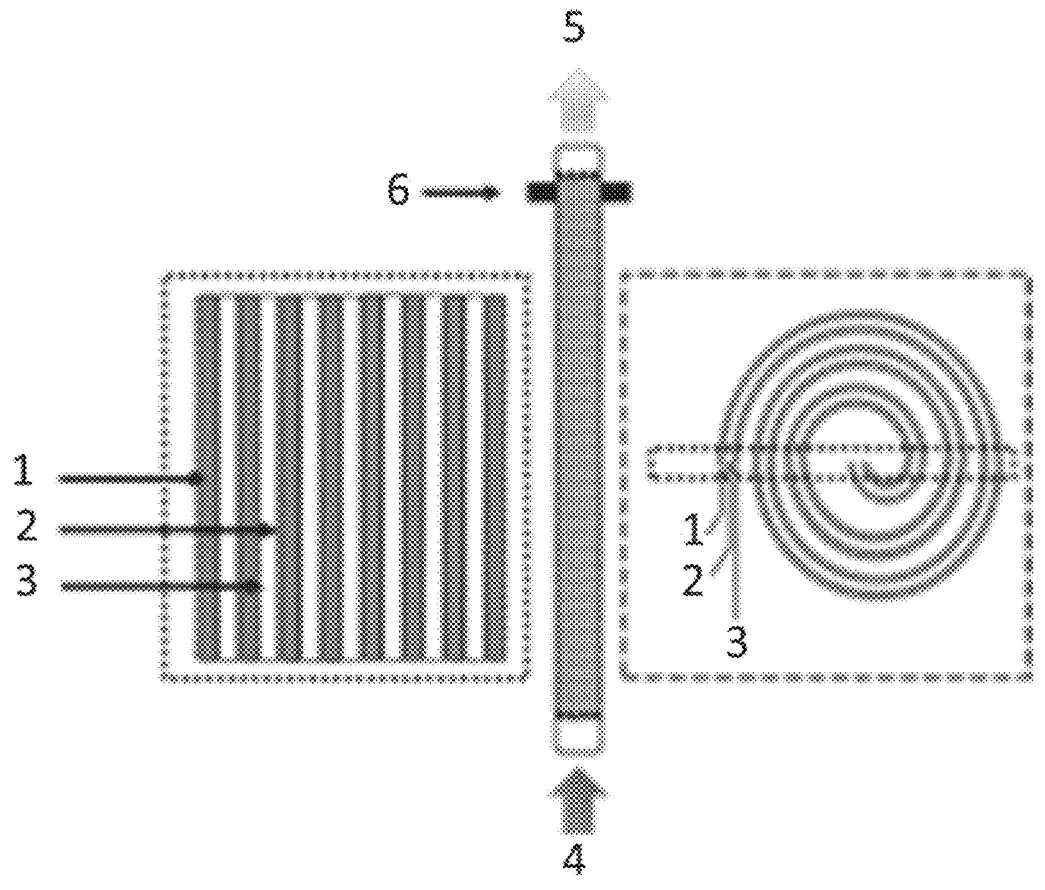
FIG. 29. Schematic of a rolled cell design in which continuous separator and porous carbon-based electrode materials are physically rolled into a spiral to create a cylinder with multiple, predominantly flow-by, through stream paths through the porous carbon electrode.

A rolled cell design was used for capacitive coagulation experiments with a 1.5 L feed solution of ~50 ppb Pb [$Pb(NO_3)_2$] and 2.5 ppm Pb in tap $H_2O$, as well as ~10 ppm Cu in tap water. Pb removal was below the federal action level of 15 ppb for the lower concentration and <1 ppm for the higher concentration (Table 42). Cu removal was >99% (Table 43). A schematic of a rolled cell is shown in FIG. 29.

TABLE 42

Results for Pb removal from tap water with a rolled cell architecture. Feed 2 was adjusted to pH 5.08 with sulfuric acid.

| Sample | Pb (ppm) |
|---|---|
| Feed 1 | 0.028* |
| Treated 1 | <0.002* |
| Feed 2 | 2.45** |
| Treated 2 | 0.83** |

*Measurements taken with ANDalyze sensor
**ICP-OES measurements

TABLE 43

ICP-OES results for Cu removal from tap water with a rolled cell architecture. The feed was adjusted to pH 2.4 with sulfuric acid.

| Sample | Cu (ppm) |
|---|---|
| Feed | 9.67 |
| Treated | <0.01 |

A series cell architecture was used for capacitive coagulation experiments with a solution of 2.5 ppm Pb [$Pb(NO_3)_2$] in tap $H_2O$ and ~30 g of carbon electrodes at 1.2 V. A consecutive 5 gallons of water were treated and concentrations were consistently below 48 ppb (Table 44).

TABLE 44

ICP-OES results for Pb removal from tap water with a series cell architecture. The feed was adjusted to pH 5 with sulfuric acid.

| Sample | Pb (ppm) |
|---|---|
| Feed | 2.53 |
| 2 Gallons Treated | 0.015 |
| 3 Gallons Treated | 0.026 |
| 4 Gallons Treated | 0.045 |
| 5 Gallons Treated | 0.048 |

Carbon blocks were used for capacitive coagulation experiments with a 1.5 L feed solution of ~50 ppb Pb [$Pb(NO_3)_2$] in tap $H_2O$ (Table 45). Pb removal was below the federal action level of 15 ppb.

TABLE 45

ICP-OES results for Pb removal from tap water with a carbon block architecture.

| Sample | Pb (ppb) |
|---|---|
| Feed | 55.35 |
| Treated | 4.48 |

Industrial wastewater containing multiple metal species, Cu, Fe, and Mn, at concentrations in the ppm range was used for flow-by capacitive coagulation experiments. Flow rates of 0.5, 1.0, and 1.5 L/min were tested at 1.2 V. Cu was reduced by >98%, Fe by >14%, and Mn by >87% (Table 46).

TABLE 46

ICP-OES results for metals removal from an industrial wastewater sample at increasing flow rates.

| | Feed | Treated (ppm) | | |
|---|---|---|---|---|
| Parameter | (ppm) | 0.5 L/min | 1.0 L/min | 1.5 L/min |
| Ca | 60.53 | 63.12 | 61.718 | 58.21 |
| Cu | 4.39 | 0.083 | 0.071 | 0.070 |
| Fe | 0.34 | 0.0008 | 0.0007 | 0.0007 |
| Mn | 0.43 | 0.18 | 0.15 | 0.11 |

The feed was adjusted to pH 5 with sulfuric acid.
Ca concentration remains unchanged, demonstrating the exceptional selectivity of the cell for metals.

Reverse osmosis (RO) concentrate, or brine, containing multiple metal species, Cu, Fe, and Mn, at concentrations in the ppb range was used for flow-by capacitive coagulation experiments. Flow rates of 0.1, 0.5, and 1.0 L/min were tested at 1.2 V. Cu was reduced by >99%, Fe by >99%, and Mn by >74% (Table 47).

TABLE 47

ICP-MS results for metals removal from reverse osmosis (RO) brine at increasing flow rates.

| | | Treated (ppb) | | |
|---|---|---|---|---|
| Parameter | Feed (ppb) | 0.1 L/min | 0.5 L/min | 1.0 L/min |
| Cu | 9.85 | <0.034 | <0.034 | 0.75 |
| Fe | 14.56 | 2.95 | 4.17 | 6.50 |
| Mn | 105.57 | 13.07 | 24.06 | 41.43 |

Total and free chlorine were measured before and after treatment with an EDC tuned for chlorine removal. Chloramine was estimated from the difference between total and free chlorine. Free chlorine removal of >99% and chloramine removal of up to 99% was obtained. A voltage<3.0 V was applied to the cell during operation. Flow rates of 100 to 500 ml/min were tested. A total of ~210 gallons of water was treated before degradation in performance was observed, strictly due to charge loss from pore collapse.

Figure 30:
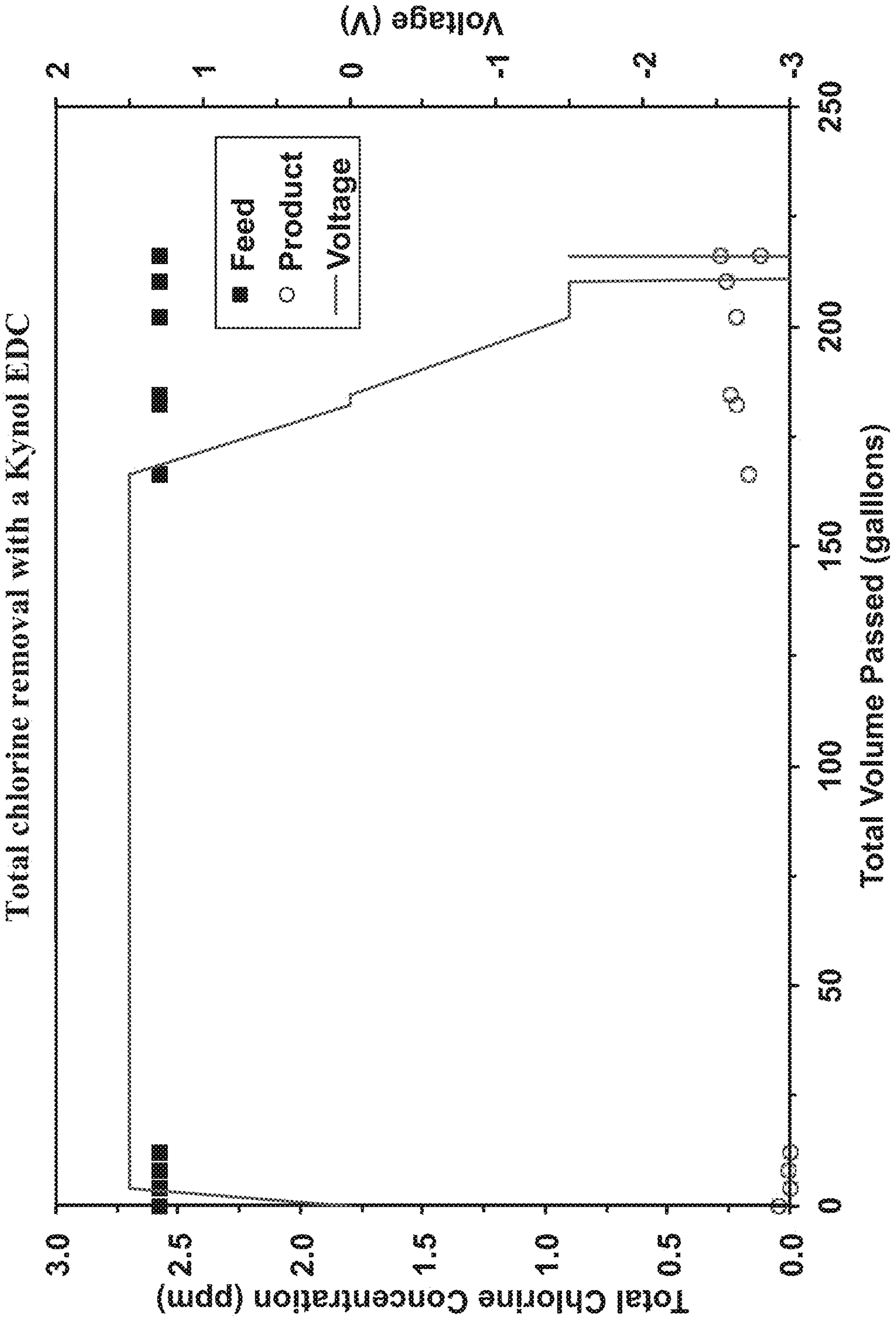
FIG. 30. EDC experiments conducted with Kynol as both electrodes. Concentration of total chlorine in the feed and product streams, and applied voltage, as a function of volume treated at a flow rate of 500 ml/min is shown.
Figure 31:
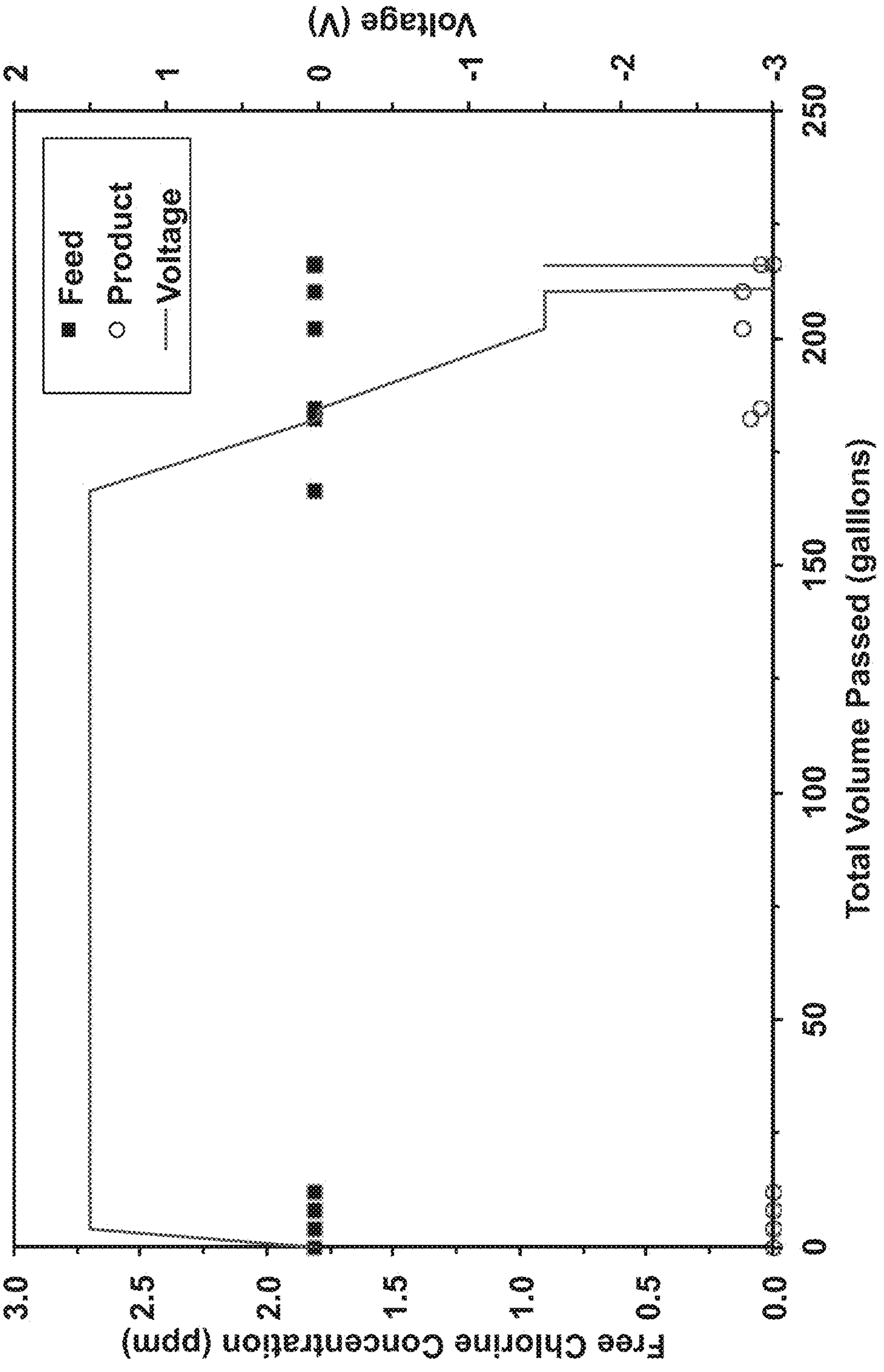
FIG. 31. EDC experiments conducted with Kynol as both electrodes. Concentration of free chlorine in the feed and product streams, and applied voltage, as a function of volume treated at a flow rate of 500 ml/min is shown.
Figure 32:
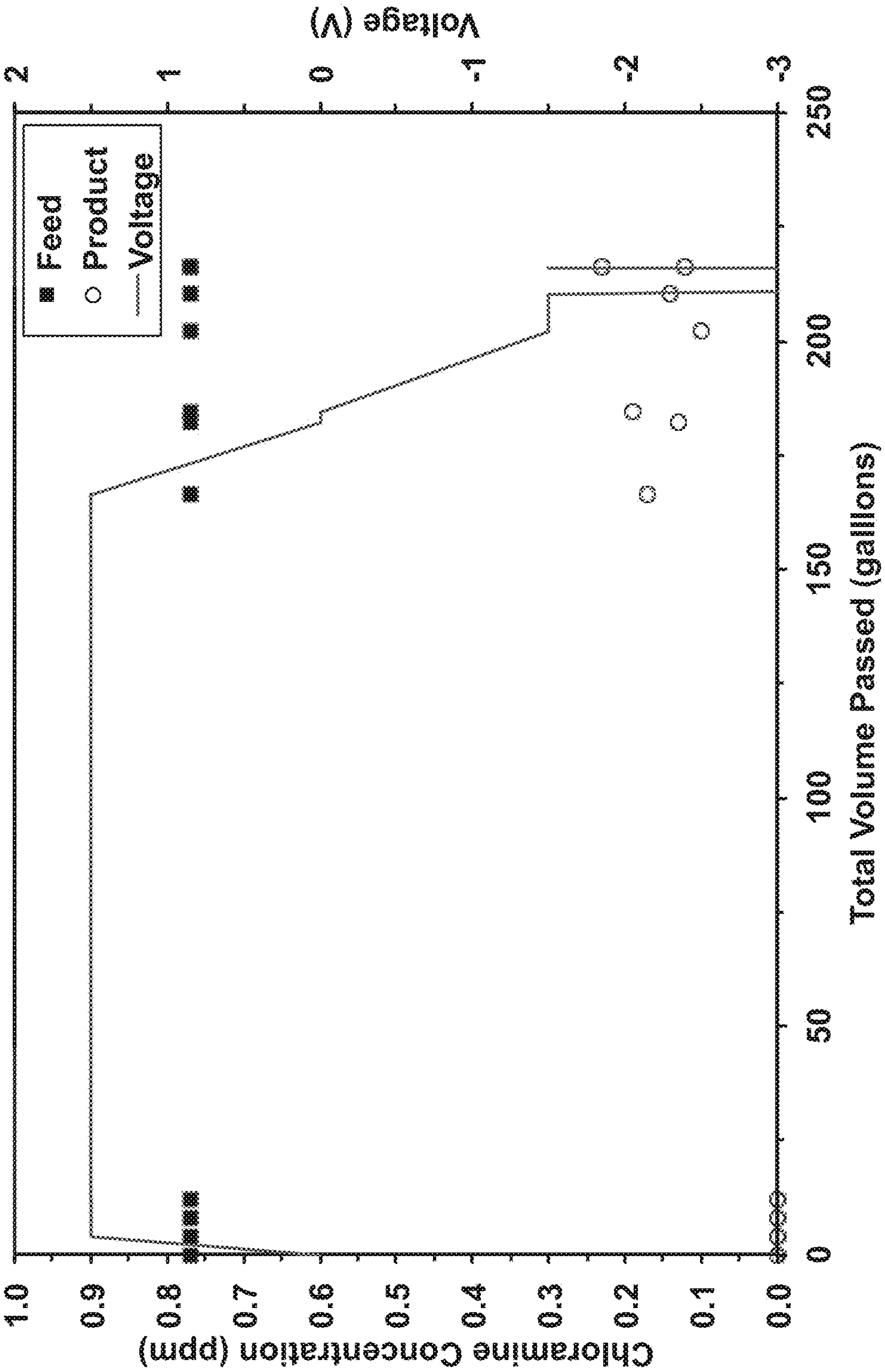
FIG. 32. EDC experiments conducted with Kynol as both electrodes. Concentration of chloramine in the feed and product streams, and applied voltage, as a function of volume treated at a flow rate of 500 ml/min is shown.
Figure 33:
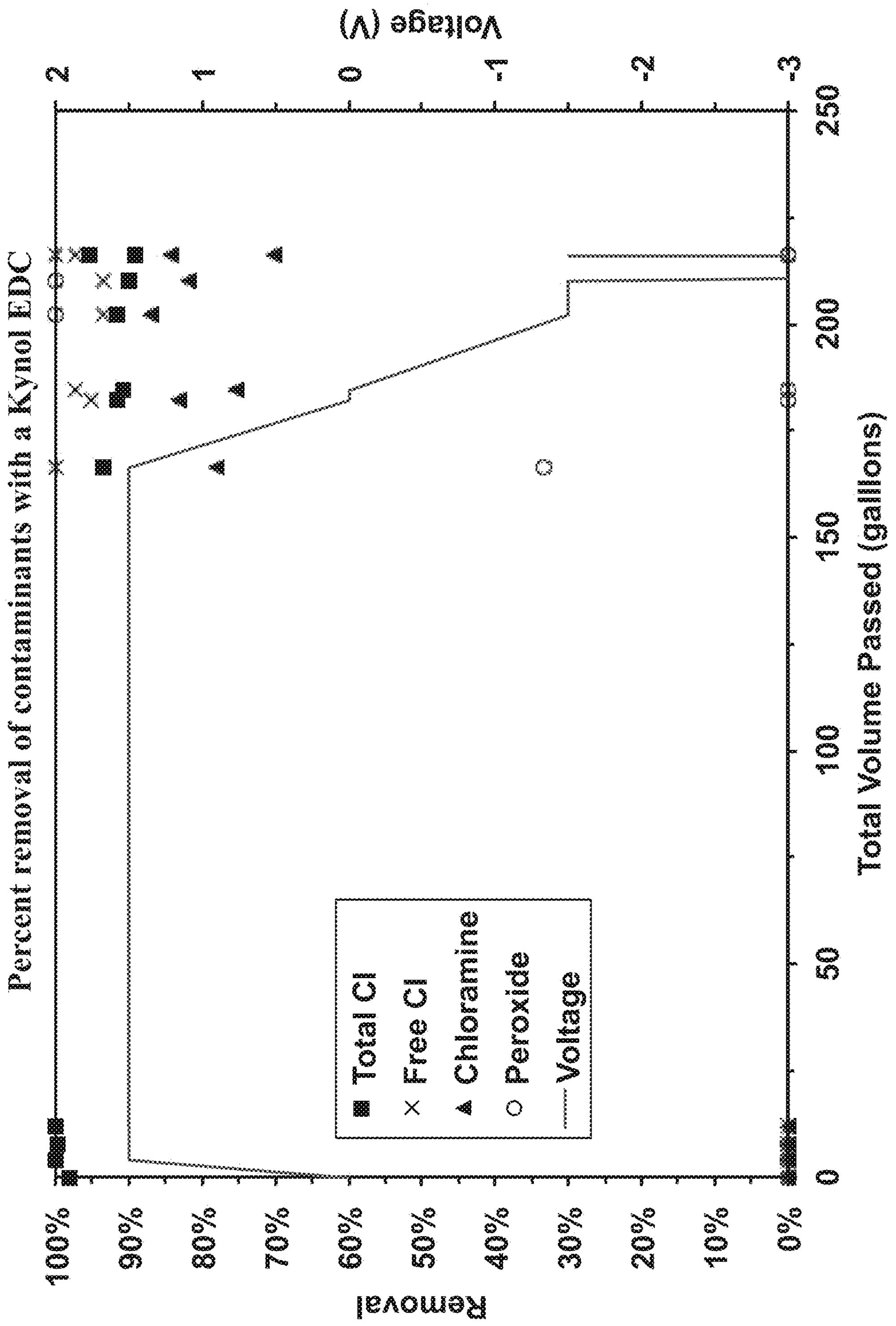
FIG. 33. EDC experiments conducted with Kynol as both electrodes. Percent removal of total chlorine, free chlorine, chloramine, and peroxide after treatment of tap water with the EDC, and applied voltage, as a function of volume treated at a flow rate of 500 ml/min is shown.

Oxidized Kynol (nitric acid treatment) was used as the anode and pristine Kynol as the cathode when V>0; electrodes are switched when V<0. Total chlorine in the feed (influent) and product (effluent) streams is shown in FIG. 30; a clear reduction of total chlorine in the effluent was observed. FIG. 31 and FIG. 32 show the concentration of free chlorine and chloramine in the feed and product streams, respectively. FIG. 33 shows the % removal of each disinfectant. Free chlorine removal of >99% and chloramine removal of ~80% was obtained. Peroxide removal of up to 100% was also achieved after treatment with the EDC.

Figure 34:
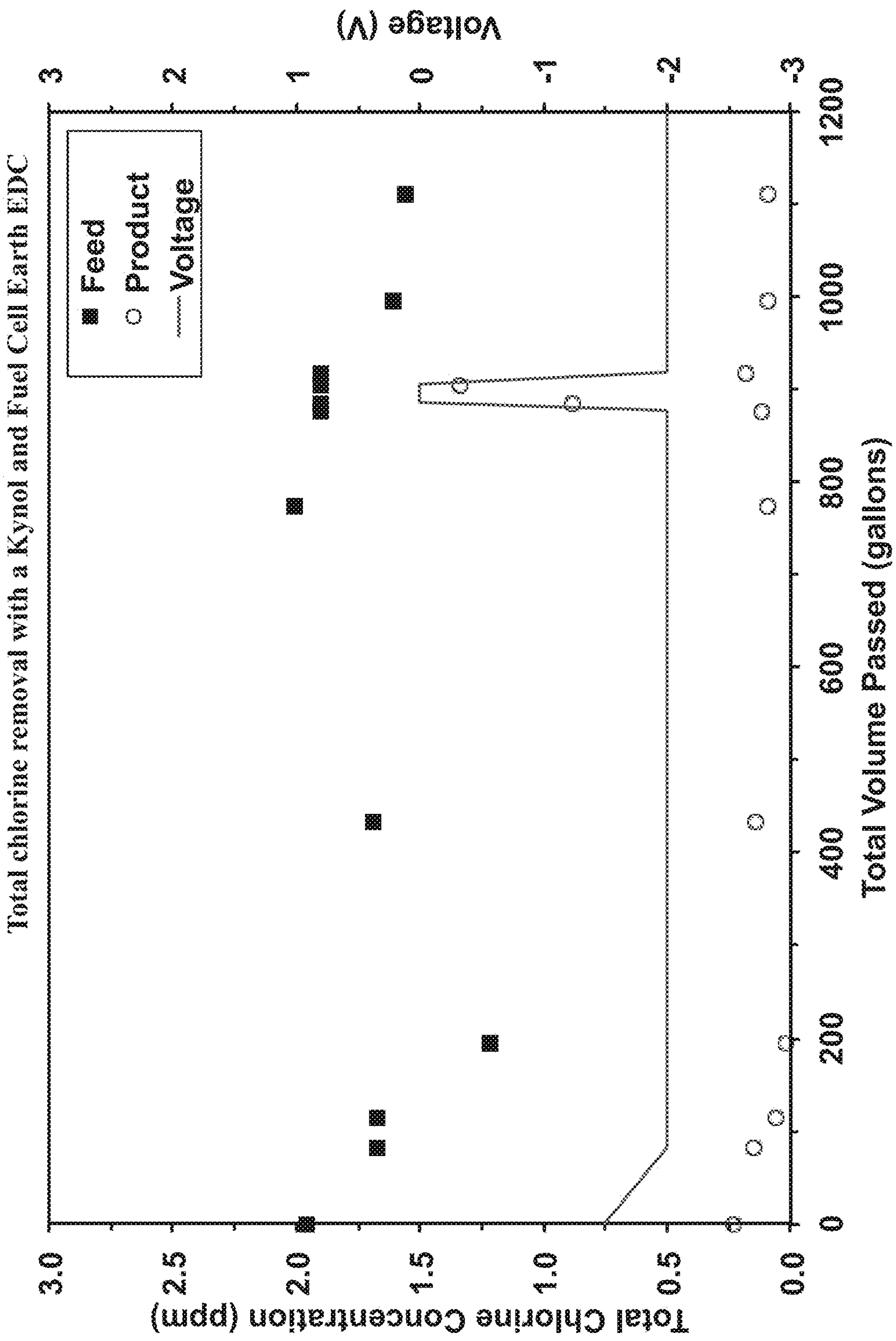
FIG. 34. EDC experiments conducted with oxidized Kynol as one electrode and Fuel Cell Earth as the other. Concentration of total chlorine in the feed and product stream, and applied voltage, as a function of volume treated at a flow rate of 300-500 ml/min.
Figure 35:
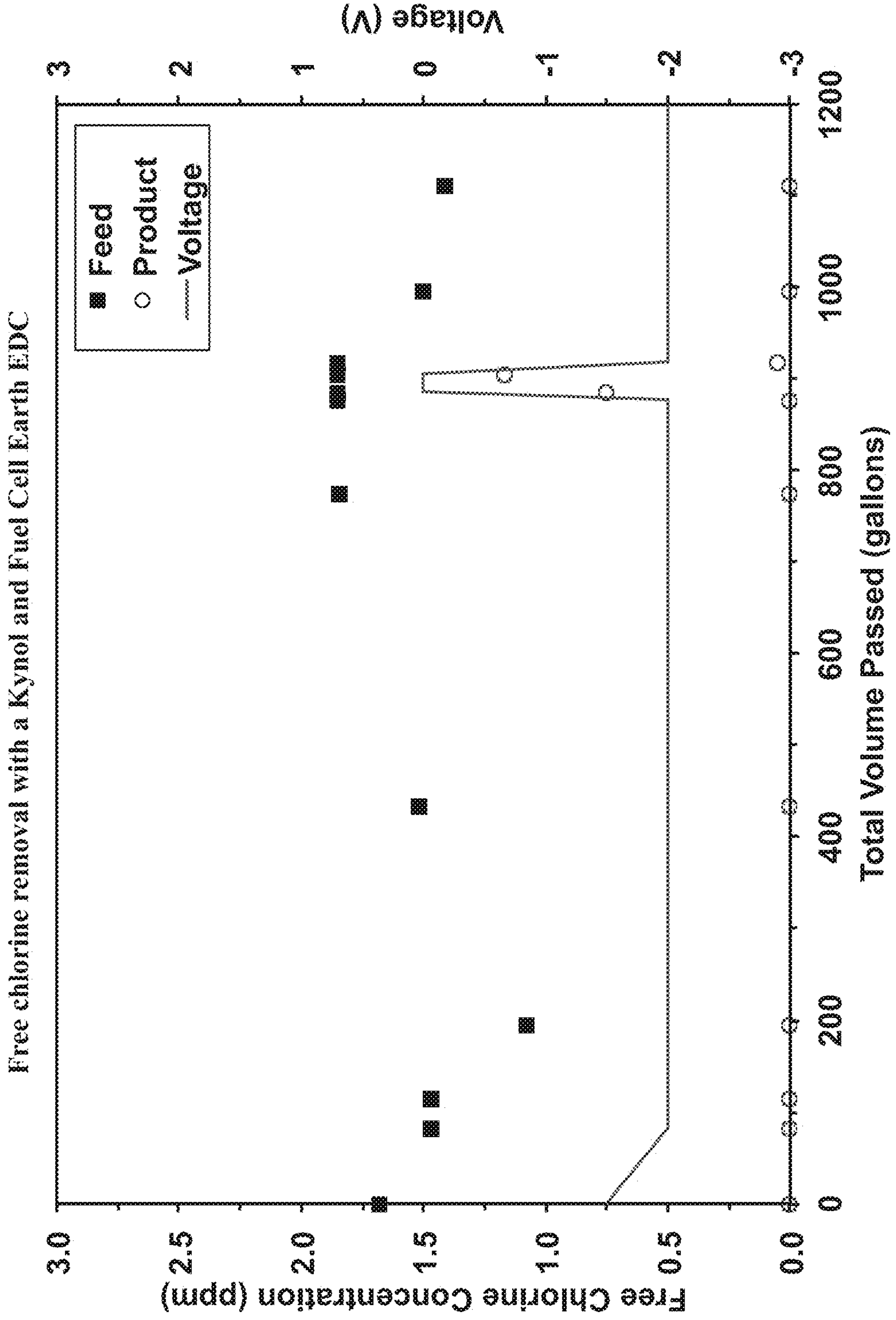
FIG. 35. EDC experiments conducted with oxidized Kynol as one electrode and Fuel Cell Earth as the other. Concentration of free chlorine in the feed and product stream, and applied voltage, as a function of volume treated at a flow rate of 300-500 ml/min.
Figure 36:
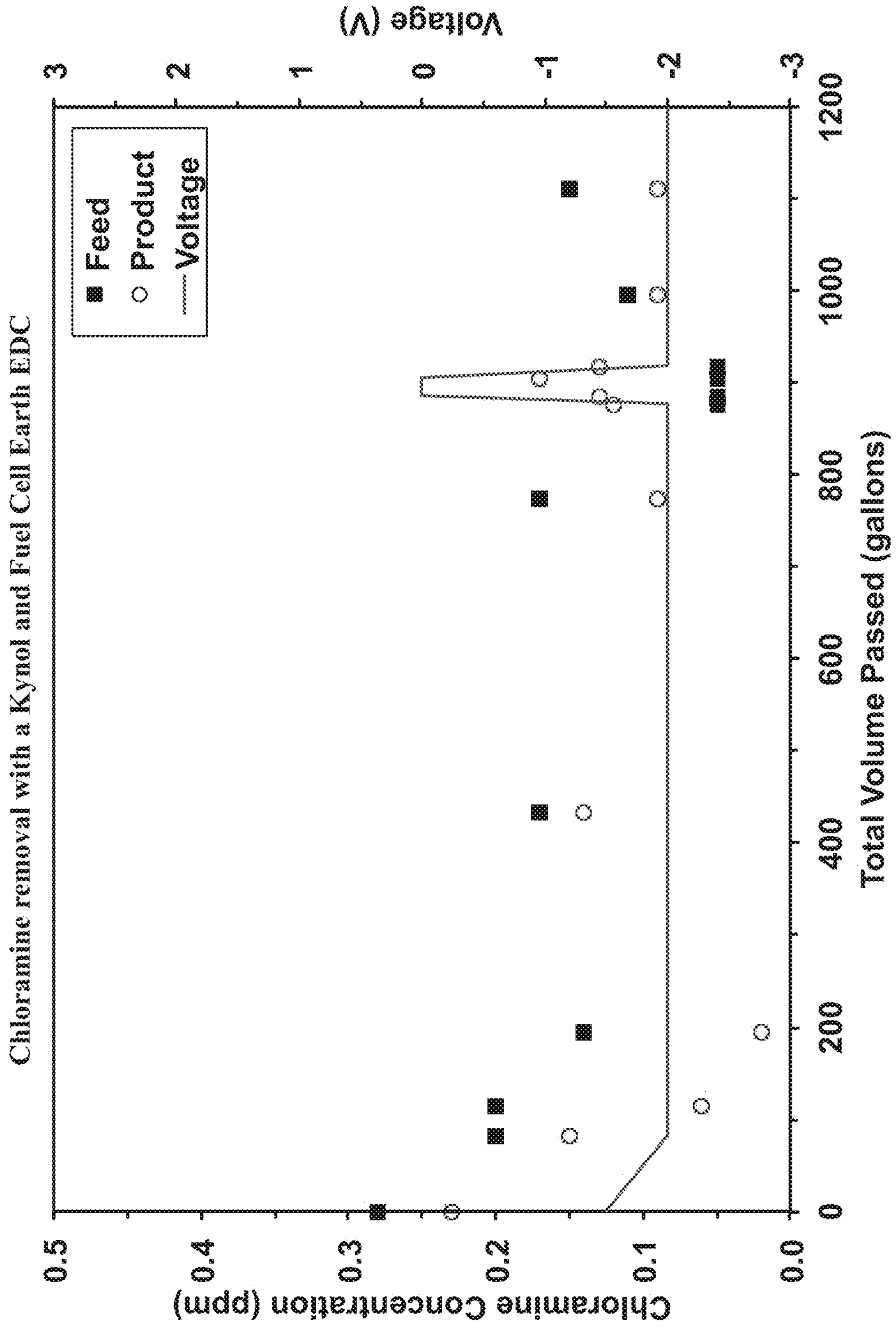
FIG. 36. EDC experiments conducted with oxidized Kynol as one electrode and Fuel Cell Earth as the other. Concentration of chloramine in the feed and product stream, and applied voltage, as a function of volume treated at a flow rate of 300-500 ml/min.
Figure 37:
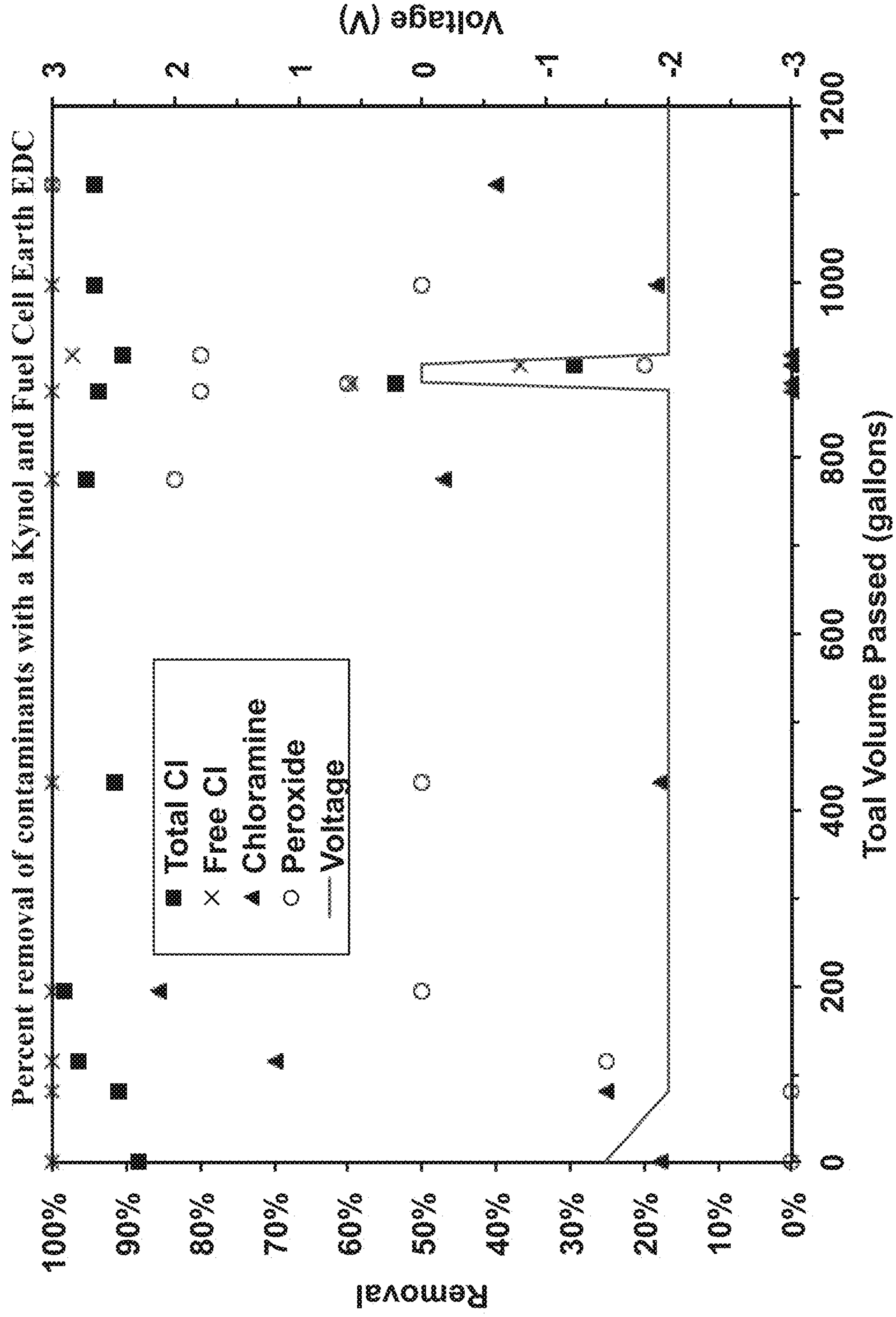
FIG. 37. EDC experiments conducted with oxidized Kynol as one electrode and Fuel Cell Earth as the other. Percent removal of total chlorine, free chlorine, chloramine, and peroxide after treatment of tap water with the EDC, and applied voltage, as a function of volume treated.

Oxidized Kynol (nitric acid treatment) was used as the cathode and Fuel Cell Earth as the anode. Total chlorine in the feed and product streams is shown in FIG. 34; a clear reduction of total chlorine in the effluent was observed at an applied voltage of 2.0 V. FIG. 35 and FIG. 36 show the concentration of free chlorine and chloramine in the feed and product streams, respectively. FIG. 37 the % removal of each disinfectant. Free chlorine removal of >99% and chloramine removal of ~40% was obtained. Peroxide removal of ~60% was also achieved after treatment with the EDC.

Figure 38:
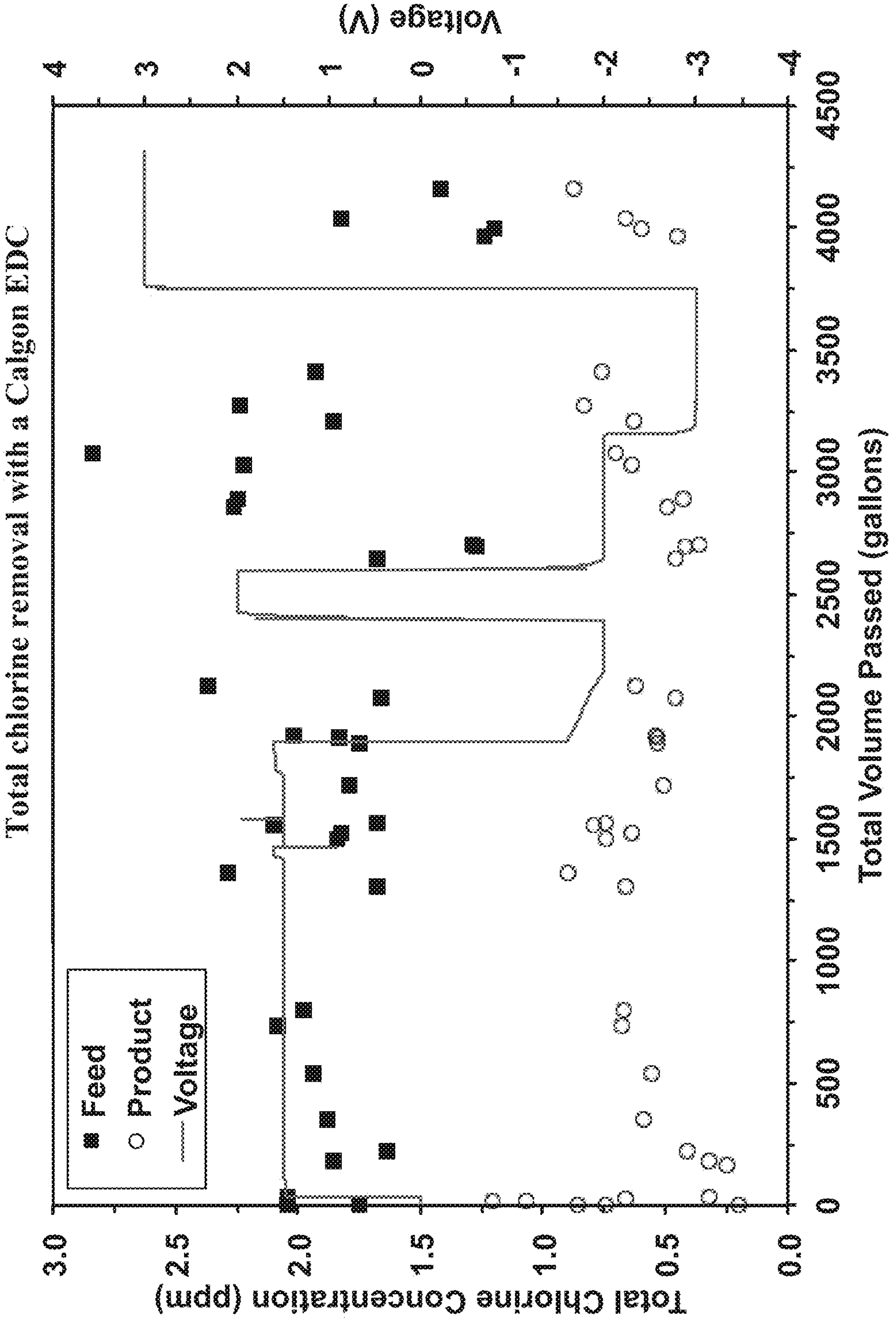
FIG. 38. EDC experiments conducted with Calgon as both electrodes. Concentration of total chlorine in the feed and product stream, and applied voltage, as a function of volume treated at a flow rate of 300-500 ml/min.
Figure 39:
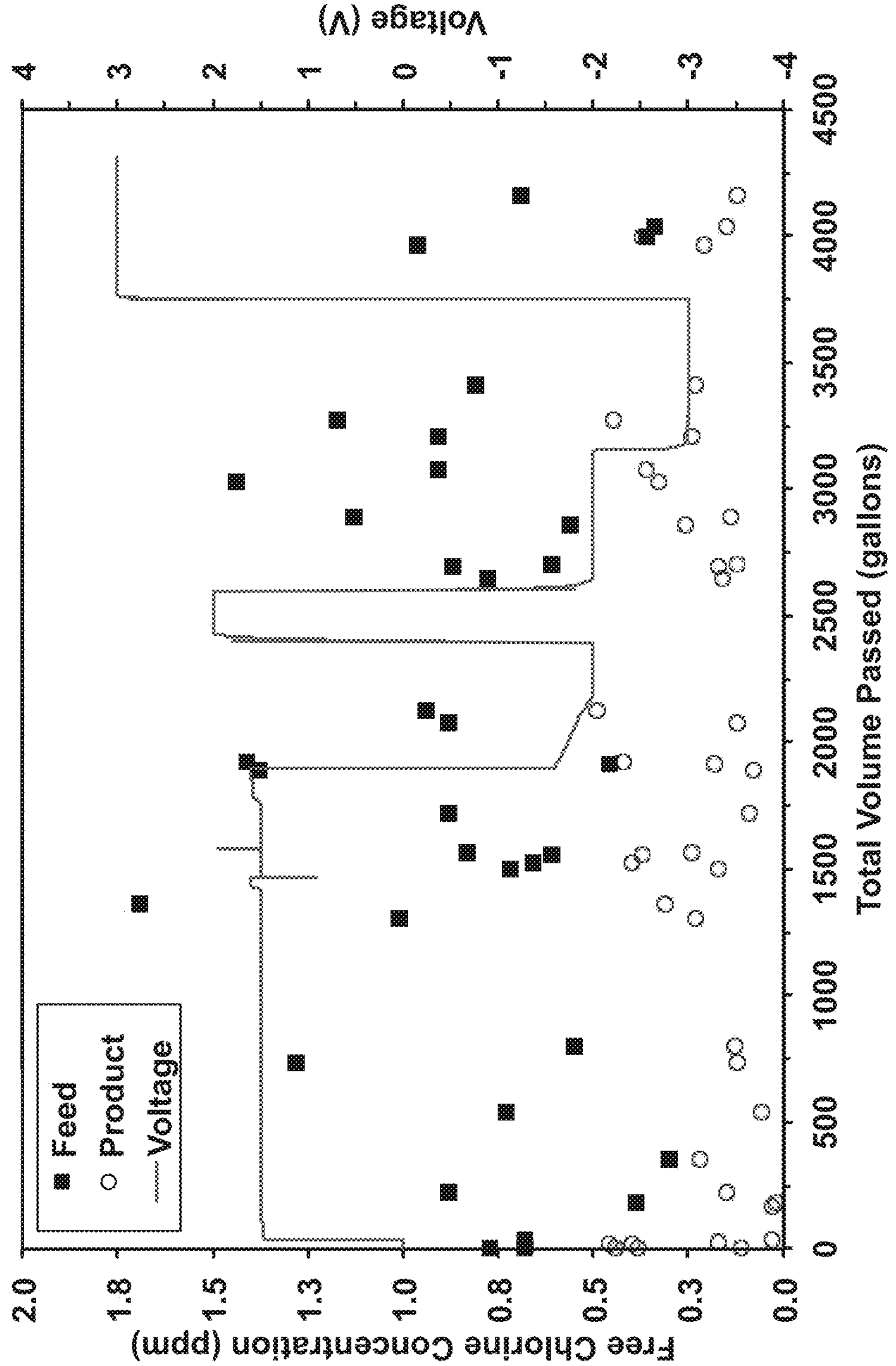
FIG. 39. EDC experiments conducted with Calgon as both electrodes. Concentration of free chlorine in the feed and product stream, and applied voltage, as a function of volume treated at a flow rate of 300-500 ml/min.
Figure 40:
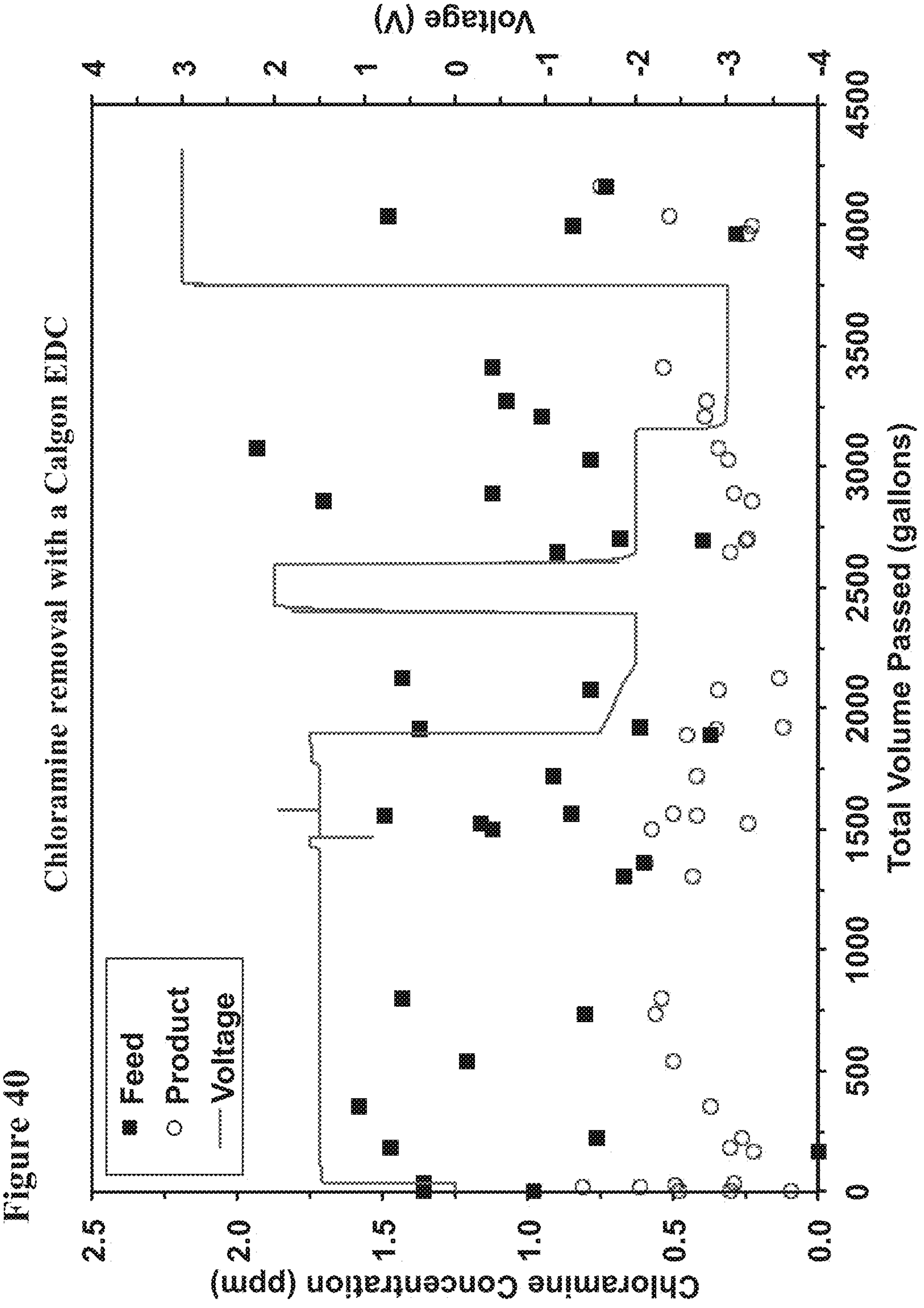
FIG. 40. EDC experiments conducted with Calgon as both electrodes. Concentration of chloramine in the feed and product stream, and applied voltage, as a function of volume treated at a flow rate of 300-500 ml/min.
Figure 41:
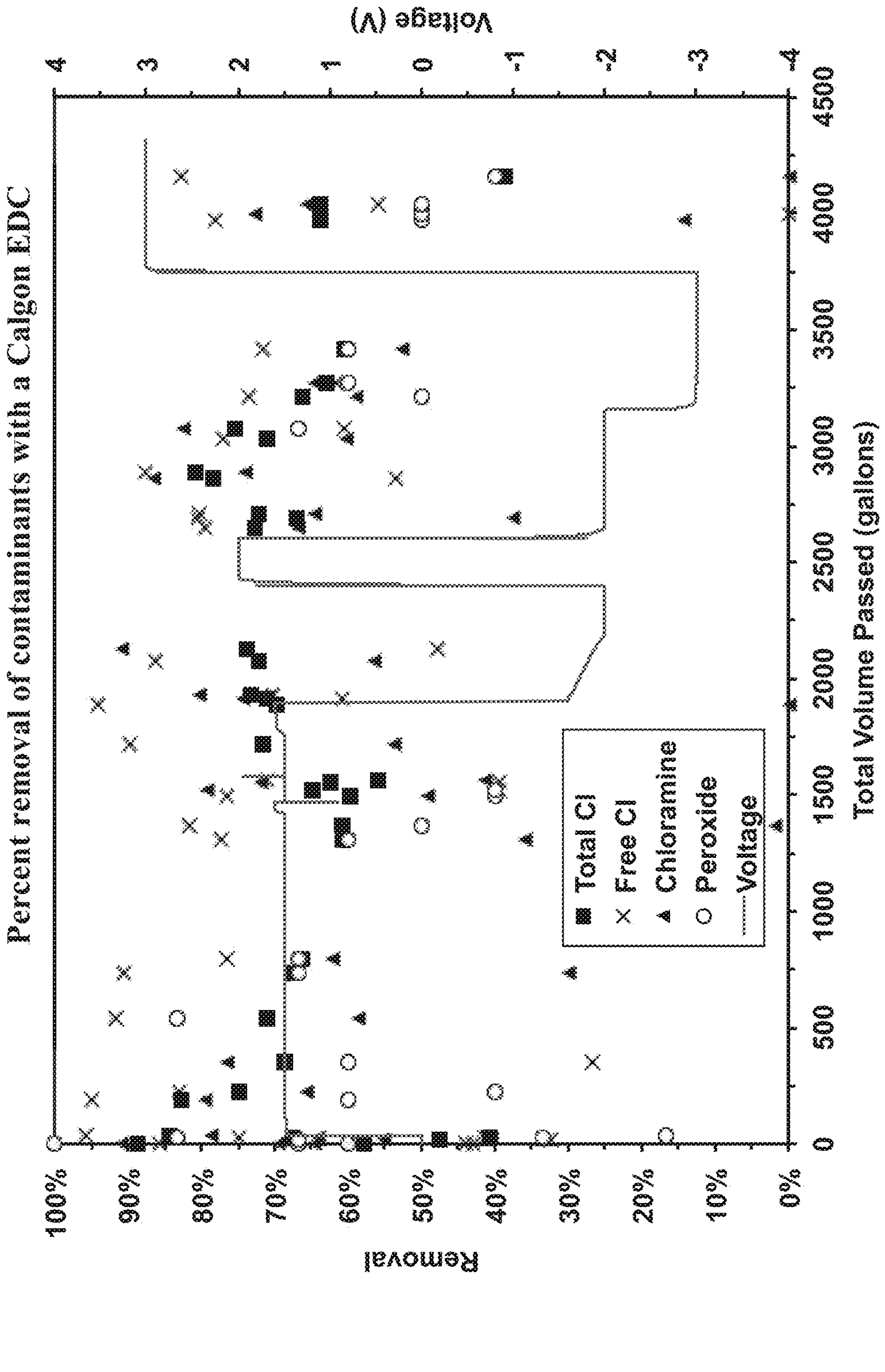
FIG. 41. EDC experiments conducted with Calgon as both electrodes. Percent removal of total chlorine, free chlorine, chloramine, and peroxide after treatment of tap water with the EDC, and applied voltage, as a function of volume treated.

Oxidized Calgon (nitric acid and electrochemical treatment) was used as the anode and pristine Calgon as the cathode when V>0; electrodes are switched when V<0. Total chlorine in the feed and product streams is shown in FIG. 38; a clear reduction of total chlorine in the effluent was observed. FIG. 39 and FIG. 40 show the concentration of free chlorine and chloramine in the feed and product streams, respectively. FIG. 41 shows the % removal of each disinfectant. Free chlorine removal of up to 96% and chloramine removal of ~57% was obtained. Peroxide removal of ~57% was also achieved after treatment with the EDC.

According to one or more embodiments, an electrochemical device for purifying a target ionic species by at least partially removing or reducing the target ionic species from an aqueous solution using faradic immobilization includes at least one first electrode that includes an activated carbon film having a void fraction (void ratio) of about 30% to about 65% and a surface area of about 1200 square meters per gram ($m^2/g$) to about 1400 square meters per gram and at least one second electrode that includes a carbon-based material having a void fraction of about or greater than 95% and a surface area of about 0.1 square meters per gram to about 5 square meters per gram.

According to other embodiments, an electrochemical device for at least partially removing or reducing a target ionic species from an aqueous solution using faradic immobilization includes at least one first electrode that includes an activated carbon film having a void fraction of about 30% to about 65% and a surface area of about 1200 square meters per gram to about 1400 square meters per gram; and at least one second electrode that includes a carbon-based material having a void fraction of about 70% to about 99.9% and a surface area of about 1200 square meters per gram to about 2300 square meters per gram.

According to yet other embodiments, an electrochemical device for at least partially removing or reducing a target ionic species from an aqueous solution using faradic immobilization includes at least one first electrode that includes a carbon-based material having a void fraction of about or greater than 95% and a surface area of about 0.1 square meters per gram to about 5 square meters per gram, and at least one second electrode that includes a carbon-based material having a void fraction of about 65% to about 99.9% and a surface area of about 700 square meters per gram to about 2300 square meters per gram.

Electrochemical devices are used to purify target ionic species by at least partially removing or reducing the target ionic species from the aqueous solution. Non-limiting examples of the target ionic species, e.g., metals, include silver, copper, chromium, lead, manganese, nickel, zinc, chlorine, chloramine, or any combination thereof. In some embodiments, the chromium is Cr (VI) and is reduced to Cr (III).

According to one or more embodiments, the electrochemical device is a rolled device. According to other embodiments, the electrochemical device is a stacked device that includes a plurality of the at least one first electrode and a plurality of the at least one second electrode.

The at least one first and the at least one second electrode are asymmetric. In one or more embodiments with the at least one first electrode having a low void fraction (about 30% to about 65%) and a high surface area (about 1200 square meters per gram ($m^2/g$) to about 1400 square meters per gram). In contrast, the at least one second electrode has either 1) a high void fraction (about or greater than 95%) and a low surface area (about 0.1 square meters per gram to about 5 square meters per gram), or 2) a high void fraction (about 70% to about 99.9%) and a high surface area (about 1200 to about 2300 square meters per gram). While in some other embodiments with the at least one first electrode having a high void fraction (about or greater than 95%) and a low surface area (about 0.1 square meters per gram to about 5 square meters per gram), the at least one second electrode has a high void fraction (about 65% to about 99.9%) and a high surface area (about 700 to about 2300 square meters per gram).

The asymmetry of the electrodes provides a desired voltage distribution across the device, which equates to a different voltage at each electrode, to control the speciation of the target ionic species at the anode and the cathode. As a result, the removal of the target ionic species can be forced to occur predominately at one electrode or the other in some instances. The applied voltage will split between the at least one first electrode (for example, an anode) and the at least one second electrode (for example, cathode) according to the electrodes' material properties, such as mass, area, surface area, resistance, etc.

Voltage is a function of the current and resistance as shown in Equation 1, and current is related to the area to which it is applied:

$$V=IR \text{ and } I=iA \rightarrow V=iAR \quad [1]$$

Wherein in Equation 1, V is voltage, I is current, R is resistance, i is current density, and A is the cross-sectional area.

Therefore, an electrode with a larger area will require less current density to maintain the applied voltage. Likewise, a more resistive electrode will require less current density to maintain the applied voltage.

When there are two electrodes or more involved, the overall voltage can be taken as the sum of the voltage at each electrode and Equation 1 can be expressed as Equation 2, $$V_{tot}=I_{tot}R_{tot} \rightarrow V_{tot}=I_aR_a+I_cR_c+ \dots \quad [2]$$

Wherein in Equation 2, the subscript tot is total, a is anode, and c is cathode.

If we consider two electrodes with different surface areas (or mass, area, resistance, etc.), the voltage will split according to the Equation 2. This translates into less voltage at the higher surface area electrode and more voltage at the lower surface area electrode. For example, between the at least one first electrode having a low void fraction (about 30% to about 65%) and high surface area (about 1200 square meters per gram ($m^2/g$) to about 1400 square meters per gram), and the at least one second electrode having a high void fraction (about or greater than 95%) and low surface area (about 0.1 square meters per gram to about 5 square meters per gram), the at least one second electrode would receive more voltage than the at least one first electrode during device operation because it has the lower surface area of the two. In contrast, in embodiments, with the at least one first electrode having a high void fraction (about or greater than 95%) and low surface area (about 0.1 square meters per gram to about 5 square meters per gram), and the at least one second electrode having a high void fraction (about 65% to about 99.9%) and high surface area (about 700 square meters per gram ($m^2/g$) to about 2300 square meters per gram), the at least one first electrode would receive more voltage than the at least one second electrode during device operation because it has the lower surface area of the two.

Non-limiting examples of activated carbon films for the at least one first electrode (low void fraction (about 30% to about 65%) and high surface area (about 1200 to about 1400 square meters per gram)) include KR-LC, which is carbon film made of Kuraray YC-60F powder with a binder, and Maxwell, which is a carbon film (see Table 48 below for carbon properties). A non-limiting example of a carbon felt for the at least one first electrode (a high void fraction (about or greater than 95%) and low surface area (about 0.1 square meters per gram to about 5 square meters per gram)) includes a Sigracell carbon felt (see Table 48 below for carbon properties).

The at least one second electrode is a carbon based felt, carbon based woven cloth, or activated carbon nonwoven felt. A non-limiting example of a carbon felt for the at least one second electrode (a high void fraction (about or greater than 95%) and low surface area (about 0.1 square meters per gram to about 5 square meters per gram)) includes a Sigracell carbon felt (see Table 48 below for carbon properties). A non-limiting example of a woven cloth for the at least one second electrode (high void fraction (about 70% to about 99.9%) and high surface area (about 1200 to about 2300 square meters per gram)) includes a Kynol (see Table 48 for carbon properties). A non-limiting example of an activated carbon nonwoven felt for the at least one second electrode (high void fraction (about 70% to about 99.9%) and high surface area (about 1200 to about 2300 square meters per gram)) includes a Haycarb (see Table 48 for carbon properties). A non-limiting example of a woven cloth for the at least one second electrode (a high void fraction (about 65% to about 99.9%) and low surface area (about 0.1 square meters per gram to about 5 square meters per gram)) includes a Sigracell (see Table 48 for carbon properties). Non-limiting examples of a woven cloth for the at least one second electrode having a high void fraction (about 65% to about 99.9%) and high surface area (about 700 square meters per gram ($m^2/g$) to about 2300 square meters per gram) include a Calgon and a Kynol (see Table 48 for carbon properties). A non-limiting example of an activated carbon nonwoven felt for the at least one second electrode having a high void fraction (about 65% to about 99.9%) and high surface area (about 700 square meters per gram ($m^2/g$) to about 2300 square meters per gram) includes a Haycarb (see Table 48 for carbon properties).

Void ratio describes the open porosity of a carbon material and how easily an aqueous solution can flow through the carbon material. The void ratio (also referred to as void fraction) is a measurement of the amount of aqueous solution (or water) displaced by a piece of carbon material of known dimensions and mass according to the following equation:

$$\text{Void ratio (\%)} = \frac{V_{carbon} - V_{water\ displaced}}{V_{carbon}}$$

where $V_{carbon}$ is the volume of the carbon, $V_{water\ displaced}$ is the volume of water (or aqueous solution) displaced. The units of $V_{carbon}$ and $V_{water\ displaced}$ are the same, resulting in a void ratio (%).

Due to differences in void fraction (also referred to as void ratio) of the at least one first and the at least one second electrode, water flows through an electrode with a high porosity (about or greater than 95%, about 65% to about 99.9%, or about 70% to about 99.9% void fraction), while the aqueous solution does not flow through an electrode with a low porosity (about 30% to about 65% void fraction).

The at least one first electrode with the activated carbon film is microporous and includes a binder. Non-limiting examples of the binder of the activated carbon film include polyvinylidene fluoride (PVDF), polytetrafluoroethylene (PTFE), sodium alginate, sodium-carboxymethyl cellulose, an ion exchange binder or a combination thereof.

In one or more embodiments, the activated carbon film of the at least one first electrode has a void fraction of about 30% to about 65%. Still yet, in other embodiments, the activated carbon film of the at least one first electrode has a void fraction of about or in any range between about 30%, 35%, 40%, 45%, 50%, 55%, 60%, and 65%. In another embodiment, the activated carbon film of the at least one first electrode has a void fraction of about 30% to about 60%.

In some embodiments, the activated carbon film of the at least one first electrode has a surface area of about 1200 to about 1400 square meters per gram. Still yet, in other embodiments, the activated carbon film of the at least one first electrode has a surface area of about or in any range between about 1200, 1220, 1240, 1260, 1280, 1300, 1320, 1320, 1340, 1360, 1380, and 1400 square meters per gram. In some embodiments, the at least one first electrode (the negative electrode) is a cathode, and the at least one second electrode (the positive electrode) is an anode. In other embodiments, the at least one first electrode is an anode, and the at least one second electrode is a cathode.

In some embodiments, the at least one first electrode that includes the carbon-based material is a carbon felt. In one or more embodiments, the at least one first electrode has a void fraction of about or greater than 95%. In other embodiments, the at least one first electrode has a void fraction of about, greater than, or in any range between about 95%, 96%, 97%, 98%, 99%, and 99.9%, for example about 95% to about 99%, about 95% to about 98%, about 95% to about 97%, and about 95% to about 96%. In some embodiments, the at least one first electrode has a surface area of less than 5 square meters per gram. Still yet, in other embodiments, the at least one first electrode has a surface area of about or in any range between about 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, and 5.0 square meters per gram.

In some embodiments, the at least one second electrode that includes the carbon-based material is a carbon felt. In one or more embodiments, the at least one second electrode has a void fraction of about or greater than 95%. In other embodiments, the at least one second electrode has a void fraction of about, greater than, or in any range between about 95%, 96%, 97%, 98%, 99%, and 99.9%, for example about 95% to about 99%, about 95% to about 98%, about 95% to about 97%, and about 95% to about 96%. In some embodiments, the at least one second electrode has a surface area of less than 5 square meters per gram. Still yet, in other embodiments, the at least one second electrode has a surface area of about or in any range between about 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, and 5.0 square meters per gram.

In other embodiments, the at least one second electrode that includes the carbon-based material is a nonwoven carbon felt or a woven cloth. In one or more embodiments, the at least one second electrode has a void fraction of about 70% to about 99.9%. In other embodiments, the at least one second electrode has a void fraction of about or in any range between about 70%, 72%, 75%, 77%, 80%, 82%, 85%, 87%, 90%, 92%, 95%, 97%, 99%, and 99.9%. In some embodiments, the at least one second electrode has a surface area of about 1200 to about 2300 square meters per gram. Still yet, in other embodiments, the at least one second electrode has a surface area of about or in any range between about 1200, 1250, 1300, 1350, 1400, 1450, 1500, 1550, 1600, 1650, 1700, 1750, 1800, 1850, 1900, 1950, 2000, 2050, 2100, 2150, 2200, 2250, and 2300 square meters per gram.

In some other embodiments, the at least one second electrode that includes the carbon-based material is a non-woven felt or a woven cloth. In one or more embodiments, the at least one second electrode has a void fraction of about 65% to about 99.9%. In other embodiments, the at least one second electrode has a void fraction of about, or in any range between about 65%, 68%, 70%, 72%, 75%, 78%, 80%, 82%, 85%, 88%, 90%, 92%, 95%, 97%, 99%, and 99.9%. In some embodiments, the activated carbon film of the at least one second electrode has a surface area of about 700 to about 2300 square meters per gram. Still yet, in other embodiments, the activated carbon film of the at least one second electrode has a surface area of about or in any range between about 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, and 2300 square meters per gram.

In some embodiments, carbon-based electrodes may include a composite of carbon black, activated carbon, carbon nanotubes, graphene sheets, or any combination thereof, and a polymer binder such as polyvinylidene fluoride (PVDF), polytetrafluoroethylene (PTFE), or any combination thereof.

For the Examples that follow, Table 48 shows properties of the various carbon materials used. The open porosity/void fraction and specific surface area of each electrode are important for maintaining passing charge and are directly related to the lifetime of the electrodes. When the device is operated and a voltage is applied, the cathode gains electrons and is reduced, while the anode loses electrons and is oxidized. As the anode becomes more oxidized, the pores collapse, effectively reducing its specific surface area, and the amount of charge it can pass. Eventually, the anode may completely lose all capacity to hold a charge; the device may drop in performance and ultimately may stop functioning for its intended purpose.

TABLE 48

Properties of carbon materials

| Carbon-based electrode | Carbon type | Density ($g/cm^3$) | Areal density ($g/m^2$) | Resistivity ($\Omega$ * cm) | Void ratio (%) | Specific surface area ($m^2/g$) |
|---|---|---|---|---|---|---|
| KR-LC | Carbon film with binder | 0.4 | 151 | 1.29 | 59 | ~1400 |
| Maxwell | Carbon film | 0.59 | 182.11 | <1 | 32 | >1200 |
| Sigracell GFD 2.5 | Carbon felt | 0.09 | 250 | <0.5 | 97 | 0.4 |
| Kynol ACC-5092-20 | Woven carbon cloth | 0.25 | 135 | 0.8 | 71 | >1800 |
| Haycarb | Activated carbon nonwoven felt | 0.051 | 175 | 2.26 | 98 | 1200 |
| Calgon FM100 ST2 | Woven carbon cloth | 0.26 | 150.56 | 5 | 66 | ~700 |

Silver (Ag) Removal

Table 49 shows the results of specific silver removal from water. The electrodes used in this study were Kynol (cathode) and Sigracell (anode) using an applied potential of 1.2 volt (V). The electrodes were selected to keep the cathode potential from entering a Cut reduction region, which would happen if the electrodes chosen were Sigracell (cathode) and KR-LC (anode). An analysis on the raw and treated product waters are shown in Table 49. Silver was removed selectively from a highly concentrated copper sulfate solution (starting concentration of 69.2 g/L). While the Cu concentration was relatively unchanged around 69 grams per liter (g/L), the Ag concentration was reduced from either 0.07 milligrams per liter (mg/L) or 0.58 mg/L to <0.05 mg/L, demonstrating the selectivity of removal.

TABLE 49

Analysis on the raw and treated product waters for selective silver (Ag) removal

| Description | Raw water As Received | Treated product waste Through ElectraMet | 0.5 PPM spike With Ag | treated 0.5 PPM spike w Ag Through ElectraMet |
|---|---|---|---|---|
| Ag | 0.07 mg/L | <0.05 mg/L | 0.58 mg/L | <0.05 mg/L |
| Co | <0.03 | <0.03 mg/L | <0.03 mg/L | <0.03 mg/L |
| Cr | <0.05 mg/L | <0.05 mg/L | <0.05 mg/L | 0.05 mg/L |
| Cu | 69.2 G/L | 69.4 G/L | 69.3 G/L | 68.9 G/L |
| Mn | <0.050 mg/L | <0.050 mg/L | <0.050 mg/L | <0.050 mg/L |
| Ni | <0.05 mg/L | <0.05 mg/L | <0.05 mg/L | <0.05 mg/L |
| Sn | <0.20 mg/L | <0.20 mg/L | <0.20 mg/L | <0.20 mg/L |
| pH | 2.69 | 2.69 | 2.69 | 2.66 |
| Specific Gravity | 1.1665 | 1.687 | 1.1685 | 1.1673 |

Copper Removal $Cu^{2+}$ removal was examined using ElectraMet cartridges operating at 1.2 V with Cu spiked into tap water; the results are shown in Table 50. Both porous carbon cathodes and porous carbon anodes were used. When a high surface area microporous carbon cathode (Kynol) and a mesoporous carbon anode (Calgon) were used, approximately 60% removal was found. When a low surface area porous carbon cathode (Sigracell) was combined with a dense carbon anode (Maxwell), >99% removal was found, the highest of these separations. When a low surface area carbon cathode (Sigracell) was combined with a mesoporous carbon anode (Calgon), the lowest removal was found of ~27%.

TABLE 50

Copper removal with asymmetric electrodes

| Cathode | Anode | Voltage/ V | Cu Feed/ ppm | Cu Effluent/ ppm | Cu Removed/ ppm | Removal % |
|---|---|---|---|---|---|---|
| Kynol | Calgon | 1.2 | 0.54 | 0.215 | 0.325 | 60.19% |
| Sigracell | Calgon | 1.2 | 0.54 | 0.391 | 0.149 | 27.59% |
| Sigracell | Maxwell | 1.2 | 0.54 | 0.005 | 0.535 | 99.07% |

Hexavalent chromium (Cr(VI)) reduction to trivalent chromium (Cr(III)) Cr(VI) reduction is also preferentially carried out in a Sigracell (cathode)/KR-LC (anode) ElectraMet cartridge over $Cu^{2+}$ reduction, when present as well as at voltages of 1.2 V and below. In an industrial wastewater sample, the reduction of both Cr(VI) and $Cu^{2+}$ was examined. The starting concentration of Cr(VI) was 115 mg/L while the starting concentration of Cu was 135 mg/L. As shown in Table 51, reduction was evaluated using ElectraMet cartridge mentioned herein containing a Sigracell cathode and KR-LC anode at applied voltages of 0.4, 0.6, 0.8, 1.0, and 1.2 V. Effluent concentrations from the ElectraMet cartridges were examined using Cr(VI) test strips as well as ICP-MS. Reduction of Cr(VI) is evident at cell voltages as low as 0.6 V, while no Cu removal is seen. As the cell voltage is increased towards 1.2 V, Cr(VI) reduction increases.

TABLE 51

Hexavalent chromium (Cr(VI)) reduction to trivalent chromium (Cr(III)) with asymmetric electrodes

| Description | Concentration/mg $L^{-1}$ Cr | Cu |
|---|---|---|
| Raw Feed Water | 115.00 | 135.00 |
| Feed to ElectraMet | >50 | 143.00 |
| After 0.4 V ElectraMet | >50 | 146.00 |
| After 0.6 V ElectraMet | 25.00 | 148.00 |
| After 0.8 V ElectraMet | 10.00 | 157.00 |
| After 1.0 V ElectraMet | 5.00 | 131.00 |
| After 1.2 V ElectraMet | 2.50 | 137.00 |
| After 1.2 V ElectraMet, pH 8, Filtered 1.5 μm | 0.292 | 3.59 |

Lead (Pb) Removal

Table 52 shows the results of removing lead using asymmetric carbon electrodes. Cathode/anode combinations included Kynol/Sigracell, Kynol/Calgon, and Haycarb/Kynol. As shown, the Kynol cathode/Sigracell anode combination resulted in 94.98% lead removal.

TABLE 52

Lead removal with asymmetric electrodes

| Cathode | Anode | Voltage/ V | Pb Feed/ ppm | Pb Effluent/ ppm | Pb Removed/ ppm | Removal % |
|---|---|---|---|---|---|---|
| Kynol | Sigracell | 1.2 | 2.29 | 0.115 | 2.175 | 94.98% |
| Kynol | Calgon | 1.2 | 2.87 | 0.513 | 2.357 | 82.13% |
| Haycarb | Kynol | 1.2 | 2.88 | 0.679 | 2.201 | 76.42% |

Manganese Removal

Manganese removal from ground water and spiked tap water was examined at concentrations<1 ppm. Shown in Table 53 are the results of separation testing using a Maxwell (cathode)/Sigracell (anode) as well as one test using a Sigracell (cathode)/Maxwell (anode). The operating voltage was 1.0 V in all instances in Table 53. As shown in Table 53, when a porous carbon anode (Sigracell) and dense carbon cathode (Maxwell) were used, >95% Mn removal was achieved in all cases. When a dense carbon anode (Maxwell) and porous carbon cathode (Sigracell) were used, Mn removal dropped to <5%, demonstrating the importance of flow path and carbon implementation on removal.

TABLE 53

Manganese (Mn) removal with asymmetric electrodes

| Anode | Cathode | Voltage/ V | Mn Feed/ ppm | Mn Effluent/ ppm | Mn Removed/ ppm | Removal % |
|---|---|---|---|---|---|---|
| Max | Sigracell | 1 | 0.293 | 0.283 | 0.01 | 3% |
| Sigracell | Max | 1 | 0.293 | 0.011 | 0.282 | 96% |
| Sigracell | Max | 1 | 0.291 | 0.016 | 0.275 | 95% |
| Sigracell | Max | 1 | 0.291 | 0.006 | 0.285 | 98% |
| Sigracell | Max | 1 | 0.303 | 0.008 | 0.295 | 97% |
| Sigracell | Max | 1 | 0.298 | 0.009 | 0.289 | 97% |
| Sigracell | Max | 1 | 0.298 | 0.005 | 0.293 | 98% |
| Sigracell | Max | 1 | 0.298 | 0.005 | 0.293 | 98% |
| Sigracell | Max | 1 | 0.28 | 0.006 | 0.274 | 98% |
| Sigracell | Max | 1 | 0.284 | 0.007 | 0.277 | 98% |
| Sigracell | Max | 1 | 0.288 | 0.01 | 0.278 | 97% |

In addition to the spiked tap water studies shown in Table 53, Mn removal from groundwater was also examined as shown in Table 54. In this case, three different ElectraMet cartridge types were examined for the removal of Mn from a raw groundwater stream: (1) Kynol (cathode)/Sigracell (anode) showed 80K90y Mn removal; (2) KR-LC (cathode)/Sigracell (anode) showed >990 Mn removal; Sigracell (cathode)/KR-LC (anode) showed <20% Mn removal. Cell voltages of 0.8-1.5 V were used.

TABLE 54

Manganese (Mn) removal from a raw groundwater stream

| Anode | Cathode | Voltage/ V | Mn Feed/ ppm | Mn Effluent/ ppm | Mn Removed/ ppm | Removal % |
|---|---|---|---|---|---|---|
| Kynol | Sigracell | 1.2 | 0.276 | 0.08 | 0.196 | 71% |
| Kynol | Sigracell | 1.2 | 0.276 | 0.066 | 0.21 | 76% |
| Kynol | Sigracell | 1.2 | 0.276 | 0.047 | 0.229 | 83% |
| Kynol | Sigracell | 1.5 | 0.276 | 0.06 | 0.216 | 78% |
| Kynol | Sigracell | 1.5 | 0.276 | 0.077 | 0.199 | 72% |
| Kynol | Sigracell | 1.5 | 0.276 | 0.058 | 0.218 | 79% |
| Kynol | Sigracell | 1 | 0.276 | 0.049 | 0.227 | 82% |
| Kynol | Sigracell | 1 | 0.276 | 0.052 | 0.224 | 81% |
| Kynol | Sigracell | 1 | 0.276 | 0.055 | 0.221 | 80% |
| Kynol | Sigracell | 0.8 | 0.276 | 0.05 | 0.226 | 82% |

TABLE 54-continued

| Manganese (Mn) removal from a raw groundwater stream | | | | | | |
|---|---|---|---|---|---|---|
| Anode | Cathode | Voltage/ V | Mn Feed/ ppm | Mn Effluent/ ppm | Mn Removed/ ppm | Removal % |
| Maxwell | Sigracell | 1.2 | 0.253 | 0 | 0.253 | 100% |
| Maxwell | Sigracell | 1.2 | 0.253 | 0 | 0.253 | 100% |
| Maxwell | Sigracell | 1 | 0.253 | 0 | 0.253 | 100% |
| Maxwell | Sigracell | 1 | 0.253 | 0 | 0.253 | 100% |
| Sigracell | Maxwell | 1.2 | 0.253 | 0.213 | 0.04 | 16% |

Nickel (Ni) Removal

Nickel removal was examined using ElectraMet cartridges built using a variety of porous carbon electrodes showing varying degrees of removal from Ni-spiked tap water. As shown in Table 55, the best removal achieved was with a low surface area porous carbon cathode (Sigracell) and a mesoporous carbon anode (Calgon) at 2.0 V, where nearly 80% of Ni was removed.

TABLE 55

| Nickel removal with asymmetric electrodes | | | | | | |
|---|---|---|---|---|---|---|
| Cathode | Anode | Voltage/ V | Ni Feed/ ppm | Ni Effluent/ ppm | Ni Removed/ ppm | Removal % |
| Kynol | Calgon | 1.2 | 8.84 | 7.34 | 1.5 | 16.97% |
| | | 1.6 | 8.84 | 7.25 | 1.59 | 17.99% |
| | | 2 | 8.84 | 6.48 | 2.36 | 26.70% |
| Sigracell | Calgon | 1.2 | 4.88 | 3.73 | 1.15 | 23.57% |
| | | 1.6 | 4.88 | 2.5 | 2.38 | 48.77% |
| | | 2 | 4.88 | 1.03 | 3.85 | 78.89% |
| Calgon | Sigracell | 2.5 | 4.88 | 2.86 | 2.02 | 41.39% |

Zinc (Zn) Removal

Zinc removal was examined using ElectraMet cartridges built using a variety of porous and dense carbon electrodes showing varying degrees of removal from Zn-spiked tap water, as shown in Table 56. When a porous carbon cathode (Kynol, Haycarb, Sigracell) was combined with a dense carbon anode (Maxwell), the best results were achieved. Using cell voltages of 1.5-2.5 V, up to 95% removal of Zn was found. When a dense carbon cathode was combined with a porous carbon anode, the best removal was achieved at 2.5 V of approximately 65%. At lower cell voltages, the overall percent removal of Zn was much lower, between 22-55% removal.

TABLE 56

| Zn removal with asymmetric electrodes | | | | | | |
|---|---|---|---|---|---|---|
| Cathode | Anode | Voltage/ V | Zn Feed/ ppm | Zn Effluent/ ppm | Zn Removed/ ppm | Re-moval % |
| Kynol | Maxwell | 1.5 | 12.2 | 0.6 | 11.6 | 95.08% |
| | | 2 | 12.2 | 1.96 | 10.24 | 83.93% |
| | | 2.5 | 12.2 | 0.56 | 11.64 | 95.41% |
| Maxwell | Kynol | 1.5 | 12.2 | 9.4 | 2.8 | 22.95% |
| | | 2 | 12.2 | 5.6 | 6.6 | 54.10% |
| | | 2.5 | 12.2 | 4.2 | 8 | 65.57% |
| Haycarb | Maxwell | 1.5 | 2.23 | 0.15 | 2.08 | 93.27% |
| | | 2 | 2.23 | 0.12 | 2.11 | 94.62% |
| | | 2.5 | 2.23 | 0.08 | 2.15 | 96.41% |
| Maxwell | Sigracell | 1.5 | 10.2 | 7.52 | 2.68 | 26.27% |
| | | 2 | 10.2 | 7.6 | 2.6 | 25.49% |
| | | 2.5 | 10.2 | 7.48 | 2.72 | 26.67% |
| Sigracell | Maxwell | 1.5 | 10.2 | 2.06 | 8.14 | 79.80% |
| | | 2 | 10.2 | 1.62 | 8.58 | 84.12% |
| | | 2.5 | 10.2 | 0.68 | 9.52 | 93.33% |

Chlorine/Chloramine Reduction

Chlorine/chloramine removal was carried out with cathode/anodes of Sigracell/Maxwell, Kynol/Maxwell, Kynol/Sigracell, Haycarb/Maxwell, and Haycarb/2× Maxwell (wherein 2× means 2 layers of Maxwell were stacked to increase the mass of the anode).

Figure 42:
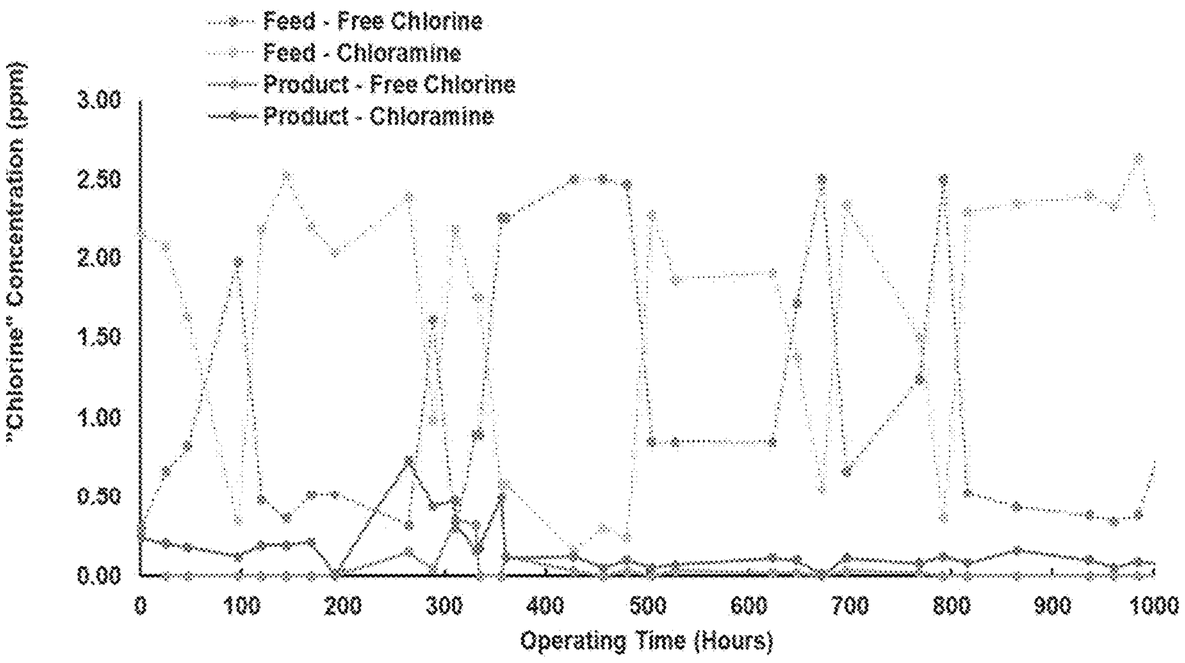
FIG. 42. EDC experiments conducted with Haycarb cathode and 2× Maxwell anode. Concentration of free chlorine and chloramine in the feed and product streams are shown.
Figure 43:
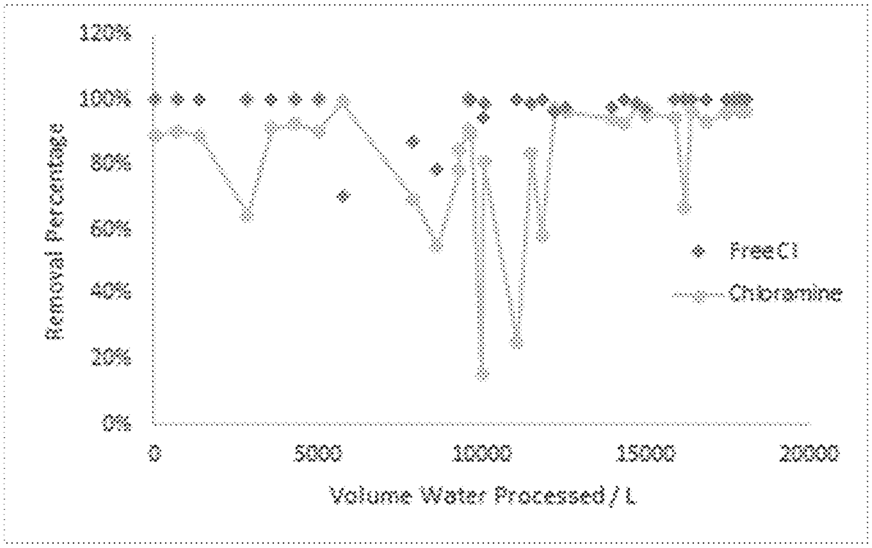
FIG. 43. EDC experiments conducted with Haycarb cathode and 2× Maxwell anode. Percent removal of total chlorine and chloramine are shown.

Table 57 and FIGS. 42 and 43 show the testing results that were carried out with a Haycarb cathode and 2× Maxwell anode. In Table 57, the feed is the starting concentrations, the product is after purification, and the removal is the % removed.

Average feed total chlorine was 2.73 parts per million (ppm). The average product free chlorine concentration was 0.01 ppm with an average product chloramine concentration of 0.12 ppm.

TABLE 57

| Chlorine/chloramine removal with asymmetric electrodes | | | | | | | | |
|---|---|---|---|---|---|---|---|---|
| Feed | | | Product | | | Removal | | |
| Total Cl (ppm) | Free Cl (ppm) | Chloramine (ppm) | Total Cl (ppm) | Free Cl (ppm) | Chloramine (ppm) | Total Cl (ppm) | Free Cl (ppm) | Chloramine (ppm) |
| 2.46 | 0.30 | 2.16 | 0.24 | 0 | 0.24 | 90% | 100% | 89% |
| 2.73 | 0.66 | 2.07 | 0.2 | 0 | 0.2 | 93% | 100% | 90% |
| 2.45 | 0.82 | 1.63 | 0.18 | 0 | 0.18 | 93% | 100% | 89% |
| 2.31 | 1.97 | 0.34 | 0.12 | 0 | 0.12 | 95% | 100% | 65% |
| 2.67 | 0.48 | 2.19 | 0.19 | 0 | 0.19 | 93% | 100% | 91% |
| 2.88 | 0.36 | 2.52 | 0.19 | 0 | 0.19 | 93% | 100% | 92% |
| 2.72 | 0.51 | 2.21 | 0.21 | 0 | 0.21 | 92% | 100% | 90% |
| 2.54 | 0.51 | 2.03 | 0.16 | 0.15 | 0.01 | 94% | 71% | 100% |
| 2.71 | 0.32 | 2.39 | 0.77 | 0.04 | 0.73 | 72% | 88% | 69% |
| 2.59 | 1.61 | 0.98 | 0.78 | 0.34 | 0.44 | 70% | 79% | 55% |
| 2.49 | 0.30 | 2.19 | 0.83 | 0.36 | 0.47 | 67% | −20% | 79% |
| 2.49 | 0.30 | 2.19 | 0.65 | 0.32 | 0.33 | 74% | −7% | 85% |
| 2.64 | 0.89 | 1.75 | 0.16 | 0 | 0.16 | 94% | 100% | 91% |

TABLE 57-continued

| Chlorine/chloramine removal with asymmetric electrodes | | | | | | | | |
|---|---|---|---|---|---|---|---|---|
| Feed | | | Product | | | Removal | | |
| Total Cl (ppm) | Free Cl (ppm) | Chloramine (ppm) | Total Cl (ppm) | Free Cl (ppm) | Chloramine (ppm) | Total Cl (ppm) | Free Cl (ppm) | Chloramine (ppm) |
| 2.64 | 0.89 | 1.75 | 0.18 | 0 | 0.18 | 93% | 100% | 90% |
| 2.84 | 2.26 | 0.58 | 0.61 | 0.12 | 0.49 | 79% | 95% | 16% |
| 2.84 | 2.26 | 0.58 | 0.14 | 0.03 | 0.11 | 95% | 99% | 81% |
| 2.66 | 2.50 | 0.16 | 0.12 | 0 | 0.12 | 95% | 100% | 25% |
| 2.80 | 2.50 | 0.30 | 0.08 | 0.03 | 0.05 | 97% | 99% | 83% |
| 2.71 | 2.47 | 0.24 | 0.1 | 0 | 0.1 | 96% | 100% | 58% |
| 3.13 | 0.85 | 2.28 | 0.08 | 0.03 | 0.05 | 97% | 96% | 98% |
| 2.71 | 0.85 | 1.86 | 0.09 | 0.02 | 0.07 | 97% | 98% | 96% |
| 2.76 | 0.85 | 1.91 | 0.13 | 0.02 | 0.11 | 95% | 98% | 94% |
| 3.09 | 1.71 | 1.38 | 0.1 | 0 | 0.1 | 97% | 100% | 93% |
| 3.04 | 2.50 | 0.54 | 0.04 | 0.03 | 0.01 | 99% | 99% | 98% |
| 3.00 | 0.66 | 2.34 | 0.13 | 0.02 | 0.11 | 96% | 97% | 95% |
| 2.74 | 1.24 | 1.50 | 0.08 | 0 | 0.08 | 97% | 100% | 95% |
| 2.86 | 2.50 | 0.36 | 0.12 | 0 | 0.12 | 96% | 100% | 67% |
| 2.82 | 0.52 | 2.30 | 0.08 | 0 | 0.08 | 97% | 100% | 97% |
| 2.78 | 0.43 | 2.35 | 0.16 | 0 | 0.16 | 94% | 100% | 93% |
| 2.78 | 0.38 | 2.40 | 0.1 | 0 | 0.1 | 96% | 100% | 96% |
| 2.67 | 0.34 | 2.33 | 0.05 | 0 | 0.05 | 98% | 100% | 98% |
| 3.02 | 0.38 | 2.64 | 0.09 | 0 | 0.09 | 97% | 100% | 97% |
| 2.94 | 0.84 | 2.1 | 0.07 | 0 | 0.07 | 98% | 100% | 97% |

SUMMARY

In summary, the present invention is directed to an electrochemical device for at least partially removing or reducing a target ionic species from an aqueous solution using faradic immobilization, the electrochemical device including: at least one first electrode including an activated carbon film having a void fraction of about 30% to about 65% and a surface area of about 1200 square meters per gram (ma/g) to about 1400 square meters per gram; and at least one second electrode including a carbon-based material having a void fraction of about or greater than 9500 and a surface area of about 0.1 square meters per gram to about 5 square meters per gram.

Another aspect of invention is directed to an electrochemical device for at least partially removing or reducing a target ionic species from an aqueous solution using faradic immobilization, the electrochemical device including: at least one first electrode including an activated carbon film having a void fraction of about 30% to about 65% and a surface area of about 1200 square meters per gram to about 1400 square meters per gram; and at least one second electrode including a carbon-based material having a void fraction of about 70% to about 99.9% and a surface area of about 1200 square meters per gram to about 2300 square meters per gram.

Yet another aspect of invention is directed to an electrochemical device for at least partially removing or reducing a target ionic species from an aqueous solution using faradic immobilization, the electrochemical device including: at least one first electrode including a carbon-based material having a void fraction of about or greater than 95% and a surface area of about 0.1 square meters per gram to about 5 square meters per gram; and at least one second electrode comprising a carbon-based material having a void fraction of about 65% to about 99.9% and a surface area of about 700 square meters per gram to about 2300 square meters per gram.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

Other advantages and capabilities of the invention will become apparent from the description above taken in conjunction with the accompanying drawings showing the embodiments and aspects of the present invention.

BIBLIOGRAPHY

Smith, A. (2014, December 13). *Health Problems Associated with Impure Tap Water*. Retrieved from: www.macrohealth.net/health-problems-associated-with-impure-tap-water/

White, J. (2017, November 16) *Nearly* 4,000 *US communities have higher rates oflead poisoning than Flint*. Retrieved from: www.wsws.org/en/articles/2017/11/16/lead-ni6.html Schneyer, J. (2017, November 17). *Reuters finds* 3,810 *U.S. areas with lead poisoning double Flint's*. Retrieved from: www.reuters.com/article/us-usa-lead-map/reuters-finds-3810-u-s-areas-with-lead-poisoning-double-flints-idUSKBN1DE1H2

(2017, March 12). *Test Your School's Drinking Water for Lead*. Retrieved from: tapwaterwatch.com/school-drinking-water/

Pure Water Technology SD. (2016, July 7). 5,300 *U.S. water systems are in violation of lead rules*. Retrieved from: www.purewatertechsandiego.com/5300-u-s-water-systems-violation-lead-rules/

Siegel, J. (2018, February 5). *Pruitt asks Cabinet to help him with 'war on lead' in drinking water*. Washington Examiner. Retrieved from: www.washingtonexaminer.com/pruitt-asks-cabinet-to-help-him-with-war-on-lead-in-drinking-water/article/2648158

Akshay P. (2018, January 19). *Water Treatment Systems (PoE) Market by technology (Water Softeners, Filtration Methods, Reverse Osmosis, Distillation Systems, Disinfection Methods and Others), by Application (Residential and Non-Residential)—Global Forecast to* 2020, *MarketsandMarkets™ Report*. Retrieved from MarketandMarket™ database. www.linkedin.com/pulse/point-of-entry-water-treatment-systems-market-worth-569-akshay-p/

Nilesh R. (2016, June). *Point-of-Entry Water Treatment Systems Market by Technology (Water Softening, Filtration, Reverse Osmosis (RO), Disinfection, Sedimentation, Distillation) and Application (Residential, Commercial, Industrial)—Global Opportunity Analysis and Industry Forecast,* 2015-2022. AlliedMarket Research Report. Retrieved from Allied Market Research Database. www.alliedmarketresearch.com/water-treatment-systems-point-of-entry-market Point of Use Water Treatment Systems Market Analysis, By Technology (RO, Distillation, Disinfection, Filtration), By Device (Pitchers, Faucet Filters, Countertop), By Region, And Segment Forecasts, 2018-2025. (2017, October) Retrieved from: www.grandviewresearch.com/industry-analysis/point-of-use-water-treatment-systems-market Suh, R. (2016, June 28). *Our Drinking-Water Crisis Goes Far Beyond Flint. Natural Resources Defense Council*. Retrieved from: www.nrdc.org/experts/rhea-suh/our-drinking-water-crisis-goes-far-beyond-flint Environmental Protection Agency. *Lead and Copper Rule*. Retrieved from: www.epa.gov/dwreginfo/lead-and-copper-rule R. Levin et al. (2008). Lead Exposures in U.S. Children, 2008: Implications for Prevention, *Environ. Health Perspect.* 116(10), 1285-1293.

T. A. Jusko et al. (2008). Blood lead concentrations<10 microg/dL and child intelligence at 6 years of age. *Environ. Health Perspect.* 116(2): 243-248.

Olsen, E. D. and Fedinick, K. P. (2016, June 28). *What's in Your Water?Flint and Beyond. Natural Resources Defense Council*. Retrieved from: www.nrdc.org/resources/whats-your-water-flint-and-beyond U. S. Environmental Protection Agency Office of Water. (2016, October). *Lead and Copper Rule Revisions White Paper*, Washington, DC 20460.

Torrice, M. (2018, January 15). *A 'war on lead' may be on the horizon*. Chemical & Engineering News. A Retrieved from: cen.acs.org/articles/96/i3/us-policy-outlook-for-2018.html Pattani, A. (2018, March 6). *NYC Lags in Reinstating Public School Water Fountains Ager Finding Lead*. WNYC News. Retrieved from: www.wnyc.org/story/nyc-lags-repairing-water-fountains-lead-public-schools/

Seewer, J. (2018, January 1). *Hundreds of water fixtures in Ohio schools founds with lead*. The News-Herald Available: www.news-herald.com/article/HR/20180108/NEWS/180109566

CBS SF Bay Area. (2018, January 25). *High lead Levels Found in Water Fountains at Berkeley Schools*. Retrieved from: sanfrancisco.cbslocal.com/2018/01/25/lead-found-in-drinking-water-at-berkeley-schools/

Girardi, L. (2017, March 28). *Elevated lead levels found at some Geneva school water fountains*. Chicago Tribune, Beacon News. Retrieved from: www.chicagotribune.com/suburbs/aurora-beacon-news/news/ct-abn-geneva-water-st-1214-20171213-story.html Brown, R., McTigue, N., and Cornwall, D. (2015). *Controlling Lead in Drinking Water*. American Waterworks Association and Water Research Foundation. Newport News, VA.

Schock, M. R., Hyland, R. N., and Welch, M. M. (2008). Occurrence of contaminant accumulation in lead pipe scales from domestic drinking-water distribution systems. *Environ. Sci. Technol.* 42(12), 4285-4291.

Xie, Y. (2010). *Dissolution, Formation, and Transformation of the Lead Corrosion Product $PbO_2$: Rates and Mechanisms of Reactions that Control Lead Release in Drinking Water Distribution Systems*, PhD Thesis, Washington University in St. Louis, St. Louis, Missouri.

Edwards, M. and McNeill, L. S. (2002). Effect of phosphate inhibitors on lead release from pipes. *J. Am. Water Works Assoc.* 94(1), 79-90.

Siegel, J. (2018, February 5). *Pruitt asks Cabinet to help him with 'war on lead' in drinking water*. Washington Examiner. Retrieved from: www.washingtonexaminer.com/pruitt-asks-cabinet-to-help-him-with-war-on-lead-in-drinking-water/article/2648158

Shekinah, P., Kadirvelu, K., Kanmani, P., Senthilkumar, P., and Subburam, V. (2002). Adsorption of lead(II) from aqueous solution by activated carbon prepared from. *J. Chem. Technol. Biotechnol.* 77, 458-464.

Swiatkowski, A., Pakula, M., Biniak, S., and Walczyk, M. (2004). Influence of the surface chemistry of modified activated carbon on its electrochemical behaviour in the presence of lead(II) ions. *Carbon.* 42, 3057-3069.

El-Wakil, A. M., Abou El-Maaty, W. M., and Awad, F. S. (2014). Removal of Lead from Aqueous Solution on Activated Carbon and Modified Activated Carbon Prepared from Dried Water Hyacinth Plant. *J Anal. Bioanal. Tech.* 5(2), 1000187.

Holubowitch, N., Omosebi, A., Gao, X., Landon, J. and Liu, K. (2017). Quasi-Steady-State Polarization Reveals the Interplay of Capacitive and Faradaic Processes in Capacitive Deionization. ChemElectroChem. 4, 2404-2413.

Avraham, E., Noked, E. M., Soffer, A. and Aurbach, D. (2011). The feasibility of boron removal from water by capacitive deionization. *Electrochimica Acta.* 56, 6312-6317.

Tang, W., He, D., Zhang, C., Kovalsky, P., and Waite, T. D. (2017). Comparison of Faradaic reactions in capacitive deionization (CDI) and membrane capacitive deionization (MCDI) water treatment processes. *Water Research.* 120, 229 237.

Edwards, M. and Dudi, A. (2004). Role of chlorine and chloramine in corrosion of lead-bearing plumbing materials. *J Am Water Works Assoc.* 96, 10, 69-81.

The invention claimed is:

1. An electrochemical device for at least partially removing or reducing a target ionic species from an aqueous solution, the electrochemical device comprising:

a faradic porosity cell including:

at least one first electrode including an activated carbon film having a void fraction of about 30 percent to about 65 percent and a surface area of about 1200 square meters per gram to about 1400 square meters per gram;

at least one second electrode including a carbon felt having a void fraction of about or greater than 95 percent and a surface area of about 0.1 square meters per gram to about 5 square meters per gram;

a current collector in contact with the at least one first electrode; and a current collector in contact with the at least one second electrode, wherein a target ionic species is immobilized onto the at least one first electrode or the at least one second electrode such that the target ionic species is not desorbed into a waste stream without application of an external voltage.

2. The electrochemical device of claim 1, further comprising an ion exchange membrane, wherein the ion exchange membrane is an anion exchange membrane or a cation exchange membrane.

3. The electrochemical device of claim 1, further comprising a membrane disposed on the at least one first electrode or the at least one second electrode, wherein the membrane is in a form of a film, a layer, a sheet, a coating, or a combination thereof.

4. The electrochemical device of claim 1, wherein the current collector comprises graphite, titanium, stainless steel, aluminum, copper, nickel, or a combination thereof.

5. The electrochemical device of claim 1, wherein the current collector is in a form of a film, a layer, a metal sheet, a foil sheet, a mesh sheet, or a combination thereof.

6. The electrochemical device of claim 1, wherein the electrochemical device further comprises a separator arranged between the at least one first electrode and the at least one second electrode.

7. The electrochemical device of claim 6, wherein the separator comprises a dielectric material.

8. The electrochemical device of claim 7, wherein the dielectric material comprises a cellulosic material, a silica containing material, or a combination thereof.

9. The electrochemical device of claim 1, wherein the activated carbon film of the at least one first electrode is microporous.

10. The electrochemical device of claim 1, wherein the activated carbon film of the at least one first electrode comprises a binder.

11. The electrochemical device of claim 10, wherein the binder comprises polyvinylidene fluoride (PVDF), polytetrafluoroethylene (PTFE), sodium alginate, sodium-carboxymethyl cellulose, an ion exchange binder, or a combination thereof.

12. The electrochemical device of claim 1, wherein the at least one first electrode is a cathode.

13. The electrochemical device of claim 1, wherein the at least one first electrode is an anode.

14. The electrochemical device of claim 1, wherein the at least one second electrode is a cathode.

15. The electrochemical device of claim 1, wherein the at least one second electrode is an anode.

16. The electrochemical device of claim 1, wherein the aqueous solution flows through the at least one second electrode.

17. The electrochemical device of claim 1, wherein the electrochemical device is a stacked device comprising a plurality of the at least one first electrode and a plurality of the at least one second electrode.

18. The electrochemical device of claim 1, wherein the target ionic species is silver, copper, chromium, lead, manganese, nickel, zinc, chlorine, chloramine, or any combination thereof.

19. The electrochemical device of claim 18, wherein the chromium is Cr (VI) and is reduced to Cr (Ill).

20. An electrochemical device for at least partially removing or reducing a target ionic species from an aqueous solution, the electrochemical device comprising:

a faradic porosity cell including:

at least one first electrode comprising a carbon felt having a void fraction of about or greater than 95 percent and a surface area of about 0.1 square meters per gram to about 5 square meters per gram;

at least one second electrode comprising a carbonaceous material having a void fraction of about 65 percent to about 99.9 percent and a surface area of about 700 square meters per gram to about 2300 square meters per gram;

a current collector in contact with the at least one first electrode; and a current collector in contact with the at least one second electrode, wherein a target ionic species is immobilized on the at least one first electrode or the at least one second electrode such that the target ionic species is not desorbed into a waste stream without application of an external voltage.

21. The electrochemical device of claim 20, further comprising an ion exchange membrane, wherein the ion exchange membrane is an anion exchange membrane or a cation exchange membrane.

22. The electrochemical device of claim 20, further comprising a membrane disposed on the at least one first electrode or the at least one second electrode, wherein the membrane is in a form of a film, a layer, a sheet, a coating, or a combination thereof.

23. The electrochemical device of claim 20, wherein the current collector comprises graphite, titanium, stainless steel, aluminum, copper, nickel, or a combination thereof.

24. The electrochemical device of claim 20, wherein the current collector is in a form of a film, a layer, a metal sheet, a foil sheet, a mesh sheet, or a combination thereof.

25. The electrochemical device of claim 20, wherein the electrochemical device further comprises a separator arranged between the at least one first electrode and the at least one second electrode.

26. The electrochemical device of claim 25, wherein the separator comprises a dielectric material.

27. The electrochemical device of claim 26, wherein the dielectric material comprises a cellulosic material, a silica containing material, or a combination thereof.

28. The electrochemical device of claim 20, wherein the carbonaceous material of the at least one second electrode is a woven cloth.

29. The electrochemical device of claim 20, wherein the carbonaceous material of the at least one second electrode is an activated carbon nonwoven felt.

30. The electrochemical device of claim 20, wherein the at least one first electrode is a cathode.

31. The electrochemical device of claim 20, wherein the at least one first electrode is an anode.

32. The electrochemical device of claim 20, wherein the at least one second electrode is a cathode.

33. The electrochemical device of claim 20, wherein the at least one second electrode is an anode.

34. The electrochemical device of claim 20, wherein the aqueous solution flows through the at least one second electrode.

35. The electrochemical device of claim 20, wherein the electrochemical device is a stacked device comprising a plurality of the at least one first electrode and a plurality of the at least one second electrode.

36. The electrochemical device of claim 20, wherein the target ionic species is silver, copper, chromium, lead, manganese, nickel, zinc, chlorine, chloramine, or any combination thereof.

37. The electrochemical device of claim 36, wherein the chromium is Cr (VI) and is reduced to Cr (Ill).

* * * * *